(12) United States Patent
Aoyama

(10) Patent No.: US 9,177,728 B2
(45) Date of Patent: Nov. 3, 2015

(54) SOLID ELECTROLYTIC CAPACITOR, AND METHOD OF MANUFACTURING THE SAME

(71) Applicant: ROHM CO., LTD., Kyoto-shi, Kyoto (JP)

(72) Inventor: Makoto Aoyama, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 14/306,806

(22) Filed: Jun. 17, 2014

(65) Prior Publication Data

US 2014/0290018 A1 Oct. 2, 2014

Related U.S. Application Data

(62) Division of application No. 13/090,769, filed on Apr. 20, 2011, now Pat. No. 8,780,529.

(30) Foreign Application Priority Data

Apr. 22, 2010 (JP) .................................. 2010-098417
Mar. 22, 2011 (JP) .................................. 2011-062847

(51) Int. Cl.
*H01G 9/00* (2006.01)
*H01G 9/048* (2006.01)
*H01G 9/15* (2006.01)

(52) U.S. Cl.
CPC ........... *H01G 9/0032* (2013.01); *H01G 9/0029* (2013.01); *H01G 9/048* (2013.01); *H01G 9/15* (2013.01); *Y10T 29/417* (2015.01)

(58) Field of Classification Search
CPC .............................. H01G 9/012; H01G 9/022
See application file for complete search history.

(56) References Cited

U.S. PATENT DOCUMENTS

| 4,571,664 A | 2/1986 | Hyland |
| 6,423,103 B1 | 7/2002 | Araki et al. |
| 6,808,541 B2 | 10/2004 | Maeda |
| 6,819,546 B2 | 11/2004 | Kuriyama |
| 7,514,174 B2 | 4/2009 | Nanno et al. |
| 8,179,667 B2 | 5/2012 | Ibata et al. |
| 8,780,529 B2 * | 7/2014 | Aoyama ....................... 361/523 |

FOREIGN PATENT DOCUMENTS

JP     2007-305930     11/2007

* cited by examiner

*Primary Examiner* — Seahvosh Nikmanesh
(74) *Attorney, Agent, or Firm* — Hamre, Schumann, Mueller & Larson, P.C.

(57) ABSTRACT

Provided is a method of manufacturing a solid electrolytic capacitor that suppresses spreading up of a solution. The method includes forming a porous sintered body made of a valve metal and having an anode wire sticking out therefrom; forming an insulating layer made of a fluorine resin, so as to surround the anode wire; and forming a dielectric layer on the porous sintered body; forming a solid electrolyte layer on the dielectric layer, after forming the insulating layer. The process of forming the insulating layer includes melting granular particles made of a fluorine resin.

7 Claims, 52 Drawing Sheets

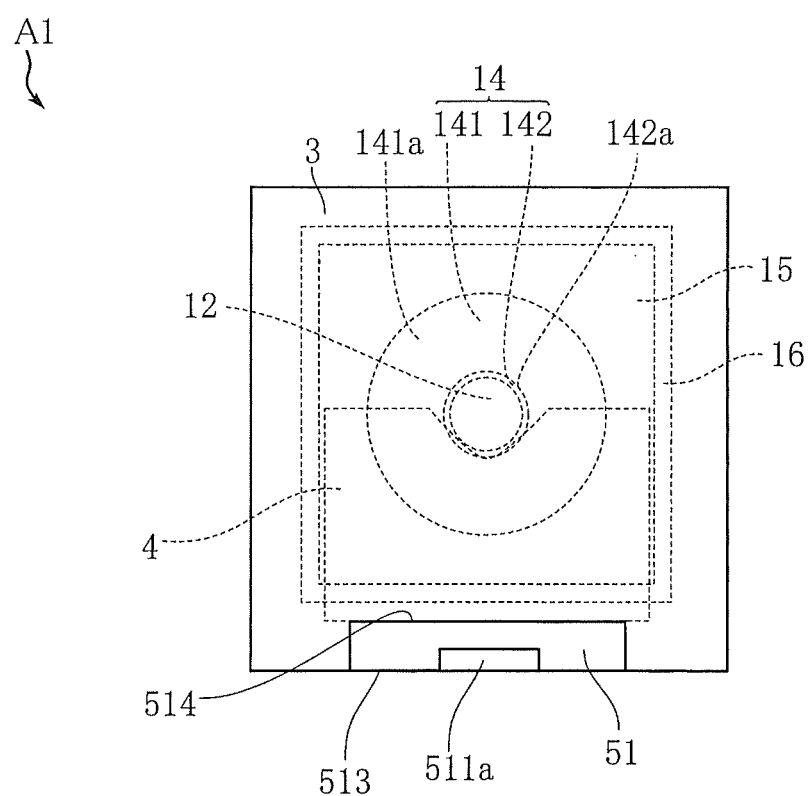

SOLID ELECTROLYTIC CAPACITOR, AND METHOD OF MANUFACTURING THE SAME

This application is a Continuation of U.S. Ser. No. 13/090,769, filed Apr. 20, 2011, and issued as U.S. Pat. No. 8,780,529, which application is incorporated herein by reference.

BACKGROUND OF THE INVENTION

1. Field of the Invention

The present invention relates to a solid electrolytic capacitor, and to a method of manufacturing the solid electrolytic capacitor.

2. Description of the Related Art

In electronic circuits, capacitors have conventionally been popularly employed. In particular, solid electrolytic capacitors are widely employed in electronic circuits, because of their relatively small size and large capacitance.

Conventional solid electrolytic capacitors include a porous sintered body with an anode wire sticking out therefrom. On a surface of the porous sintered body, a dielectric layer and a solid electrolyte layer are stacked. A washer is fitted to a base portion of the anode wire. The washer is made of an insulative material such as a fluorine resin. The washer includes a hole for the anode wire to pass therethrough. Description of such a solid electrolytic capacitor can be found, for example, in Japanese Patent Application Laid-open No. 2007-305930.

In a manufacturing process of the solid electrolytic capacitor, the porous sintered body is soaked, for example, in aqueous solution of manganese nitrate, to form the solid electrolyte layer. In such an instance, if the anode wire is put into the manganese nitrate aqueous solution without a washer fitted thereto, the manganese nitrate aqueous solution will spread up along the anode wire. Such upward spreading leads to emergence of a leak current in the solid electrolytic capacitor made up as a finished product. Conventionally, to prevent the upward spreading, a washer is fitted around the anode wire before the porous sintered body is soaked in the manganese nitrate aqueous solution.

In the conventional solid electrolytic capacitor, however, there may be a small gap formed between the washer and the anode wire. Such a gap may induce the manganese nitrate aqueous solution to spread up owing to capillary action.

SUMMARY OF THE INVENTION

The present invention has been proposed under the foregoing situation, and provides a solid electrolytic capacitor than can suppress the undesired upward spreading, and a method of manufacturing such a solid electrolytic capacitor.

A first aspect of the present invention provides a method of manufacturing a solid electrolytic capacitor. The method includes forming a porous sintered body made of a valve metal and having an anode wire sticking out therefrom; forming an insulating layer made of a fluorine resin, so as to surround the anode wire; forming a dielectric layer on the porous sintered body; forming a solid electrolyte layer on the dielectric layer, after forming the insulating layer; and the process of forming the insulating layer includes melting a resin material made of a fluorine resin.

A second aspect of the present invention provides the method according to the first aspect, wherein the resin material includes a plurality of granular particles.

A third aspect of the present invention provides the method according to the second aspect, wherein the process of forming the insulating layer further includes depositing the plurality of granular particles to the anode wire, before melting the resin material.

A fourth aspect of the present invention provides the method according to the third aspect, wherein the process of forming the insulating layer further includes depositing the plurality of granular particles to the porous sintered body, at the same time as depositing the granular particles to the anode wire.

A fifth aspect of the present invention provides the method according to the third aspect, wherein the process of depositing the plurality of granular particles to the anode wire includes depositing the granular particles only to a portion of the anode wire spaced from the porous sintered body.

A sixth aspect of the present invention provides the method according to any one of the third to fifth aspects, wherein the process of depositing the plurality of granular particles to the anode wire includes applying aqueous dispersion containing the granular particles to the anode wire.

A seventh aspect of the present invention provides the method according to any one of the first to sixth aspects, wherein the process of forming the insulating layer is performed before forming the dielectric layer.

An eighth aspect of the present invention provides a solid electrolytic capacitor. The solid electrolytic capacitor includes a porous sintered body constituted essentially of a valve metal; an anode wire sticking out from the porous sintered body; a dielectric layer provided on the porous sintered body; an insulating layer constituted essentially of a fluorine resin and including a first film portion pierced with the anode wire; and a solid electrolyte layer provided on the dielectric layer and including a portion elevated with respect to the first film portion in a direction in which the anode wire sticks out.

A ninth aspect of the present invention provides another solid electrolytic capacitor. This solid electrolytic capacitor includes a porous sintered body constituted essentially of a valve metal; an anode wire sticking out from the porous sintered body; a dielectric layer provided on the porous sintered body; an insulating layer constituted essentially of a fluorine resin and including a first film portion pierced with the anode wire; and a solid electrolyte layer provided on the dielectric layer; and a periphery of the first film portion includes a proximal portion and a distal portion, and a distance between the proximal portion and the anode wire is smaller than a distance between the distal portion and the anode wire.

A tenth aspect of the present invention provides still another solid electrolytic capacitor. This solid electrolytic capacitor includes a porous sintered body constituted essentially of a valve metal; an anode wire sticking out from the porous sintered body; a dielectric layer provided on the porous sintered body; an insulating layer constituted essentially of a fluorine resin and including a first film portion pierced with the anode wire; and a solid electrolyte layer provided on the dielectric layer; and the first film portion is of an asymmetrical shape with respect to a line passing the anode wire, in view in a direction in which the anode wire sticks out.

An eleventh aspect of the present invention provides still another solid electrolytic capacitor. This solid electrolytic capacitor includes a porous sintered body constituted essentially of a valve metal; an anode wire sticking out from the porous sintered body; a dielectric layer provided on the porous sintered body; an insulating layer constituted essentially of a fluorine resin and including a first film portion pierced with the anode wire; and a solid electrolyte layer provided on the dielectric layer; and the insulating layer is disposed in close contact with the anode wire.

A twelfth aspect of the present invention provides the solid electrolytic capacitor according to any one of the eighth to tenth aspects, wherein the solid electrolyte layer is disposed so as to surround the first film portion.

A thirteenth aspect of the present invention provides the solid electrolytic capacitor according to any one of the eighth to tenth aspects, wherein the insulating layer further includes a second film portion extending from the first film portion in the direction in which the anode wire sticks out, and disposed so as to cover the anode wire.

A fourteenth aspect of the present invention provides the solid electrolytic capacitor according to any one of the eighth to tenth aspects, wherein the porous sintered body includes pores, and a part of the first film portion is provided in the pores.

A fifteenth aspect of the present invention provides the solid electrolytic capacitor according to any one of the eighth to fourteenth aspects, wherein the porous sintered body includes a first lateral surface oriented in a direction perpendicular to the direction in which the anode wire sticks out, and the insulating layer includes a first lateral film portion disposed so as to cover the first lateral surface and connected to the first film portion.

A sixteenth aspect of the present invention provides the solid electrolytic capacitor according to the fifteenth aspect, wherein the porous sintered body includes a second lateral surface oriented in a direction intersecting with both of the direction in which the anode wire sticks out and the direction in which the first lateral surface is oriented, and the insulating layer includes a second lateral film portion disposed so as to cover the second lateral surface and connected to the first film portion.

A seventeenth aspect of the present invention provides the solid electrolytic capacitor according to the sixteenth aspect, wherein the porous sintered body includes a third lateral surface oriented in a direction opposite the direction in which the first lateral surface is oriented, and the insulating layer includes a third lateral film portion disposed so as to cover the third lateral surface and connected to the first film portion.

An eighteenth aspect of the present invention provides still another solid electrolytic capacitor. This solid electrolytic capacitor includes a porous sintered body constituted essentially of a valve metal; an anode wire sticking out from the porous sintered body; a dielectric layer provided on the porous sintered body; an insulating layer constituted essentially of a fluorine resin and disposed so as to cover the anode wire; and a solid electrolyte layer provided on the dielectric layer and the anode wire, and including a portion elevated with respect to the insulating layer in a radial direction of the anode wire.

A nineteenth aspect of the present invention provides the solid electrolytic capacitor according to any one of the eighth to eighteenth aspects, wherein the insulating layer is disposed in close contact with the anode wire.

A twentieth aspect of the present invention provides the solid electrolytic capacitor according to any one of the eighth to nineteenth aspects, further comprising a pillow electrode extending in the direction in which the anode wire sticks out and supporting the anode wire; and an anode mounting terminal that supports the pillow electrode, the anode mounting terminal being electrically connected to the anode wire.

A twenty-first aspect of the present invention provides the solid electrolytic capacitor according to the twentieth aspect, wherein the anode mounting terminal includes a mounting surface, a supporting surface that supports the pillow electrode, the supporting surface being located on an opposite side of the mounting surface, and a recessed surface located on the opposite side of the mounting surface and at an end portion thereof opposite the direction in which the anode wire sticks out; and a distance between the recessed surface and the mounting surface is smaller than a distance between the supporting surface and the mounting surface.

A twenty-second aspect of the present invention provides the solid electrolytic capacitor according to the twenty-first aspect, wherein the anode mounting terminal includes a fillet portion formed at an end portion in the direction in which the anode wire sticks out, so as to recede from the mounting surface toward the supporting surface.

A twenty-third aspect of the present invention provides the solid electrolytic capacitor according to the twenty-first aspect, further comprising an insulating layer provided on the recessed surface.

A twenty-fourth aspect of the present invention provides the solid electrolytic capacitor according to any one of the twentieth to twenty-third aspects, further comprising a resin package that covers the anode wire and the pillow electrode, wherein the anode wire and the pillow electrode each include a facet exposed from the resin package and flush with each other, and the resin package includes a facet that is flush with a facet of the anode wire.

A twenty-fifth aspect of the present invention provides the solid electrolytic capacitor according to the twenty-fourth aspect, wherein the insulating layer includes a facet exposed from the resin package and flush with the facet of the anode wire.

A twenty-sixth aspect of the present invention provides the solid electrolytic capacitor according to any one of the twentieth to twenty-fourth aspects, wherein the pillow electrode is connected to a portion of the anode wire spaced from the insulating layer.

A twenty-seventh aspect of the present invention provides the solid electrolytic capacitor according to any one of the twentieth to twenty-fifth aspects, wherein the pillow electrode is disposed in contact with the insulating layer.

A twenty-eighth aspect of the present invention provides the solid electrolytic capacitor according to any one of the twentieth to twenty-third aspects, wherein the insulating layer includes an opening, and the pillow electrode is connected to a portion of the anode wire exposed through the opening.

A twenty-ninth aspect of the present invention provides the solid electrolytic capacitor according to any one of the twentieth to twenty-fourth aspects, further comprising a base member including a first surface directed to the anode wire and a second surface located on an opposite side of the first surface; a mounting anode layer provided on the second surface the base member and electrically connected to the anode wire; and a mounting cathode layer provided on the second surface of the base member and electrically connected to the solid electrolyte layer.

A thirtieth aspect of the present invention provides the solid electrolytic capacitor according to the twenty-ninth aspect, further comprising a surface anode layer provided on the first surface of the base member and electrically connected to the mounting anode layer; and a surface cathode layer provided on the first surface of the base member and electrically connected to the mounting cathode layer.

A thirty-first aspect of the present invention provides the solid electrolytic capacitor according to the thirtieth aspect, wherein the base member includes a stepped portion formed on an end portion in the direction in which the anode wire sticks out, so as to recede from the second surface toward the first surface.

A thirty-second aspect of the present invention provides the solid electrolytic capacitor according to the thirtieth or thirty-first aspect, further comprising a pillow electrode extending in a direction intersecting with the direction in which the anode wire sticks out and supporting the anode wire; wherein the surface anode layer supports the pillow electrode.

A thirty-third aspect of the present invention provides the solid electrolytic capacitor according to the thirty-second aspect, further comprising a resin package that covers the anode wire and the pillow electrode, wherein the anode wire and the pillow electrode each include a facet exposed from the resin package and flush with each other, and the resin package includes a facet flush with a facet of the anode wire.

A thirty-fourth aspect of the present invention provides the solid electrolytic capacitor according to the thirty-third aspect, wherein the insulating layer includes a facet exposed from the resin package and flush with the facet of the anode wire.

A thirty-fifth aspect of the present invention provides the solid electrolytic capacitor according to any one of the twenty-fourth to thirty-third aspects, wherein the pillow electrode is connected to a portion of the anode wire spaced from the insulating layer.

A thirty-sixth aspect of the present invention provides the solid electrolytic capacitor according to any one of the thirty-second to thirty-fourth aspects, wherein the pillow electrode is disposed in contact with the insulating layer.

A thirty-seventh aspect of the present invention provides the solid electrolytic capacitor according to the thirty-second aspect, wherein the insulating layer includes an opening, and the pillow electrode is connected to a portion of the anode wire exposed through the opening.

A thirty-eighth aspect of the present invention provides the solid electrolytic capacitor according to the twenty-ninth aspect, further comprising a resin package that covers the anode wire; wherein the anode wire includes a facet exposed from the resin package, and the resin package, the base member, and the mounting anode layer each include a facet that is flush with the facet of the anode wire.

A thirty-ninth aspect of the present invention provides the solid electrolytic capacitor according to any one of the thirty-eighth aspect, further comprising a lateral anode layer that covers the respective facet of the anode wire, the resin package, the base member, and the mounting anode layer.

A fortieth aspect of the present invention provides the solid electrolytic capacitor according to the thirty-ninth aspect, wherein the lateral anode layer is formed by plating.

A forty-first aspect of the present invention provides the solid electrolytic capacitor according to the thirty-eighth aspect, wherein the insulating layer includes a facet exposed from the resin package and flush with the facet of the anode wire.

A forty-second aspect of the present invention provides the solid electrolytic capacitor according to any one of the eighth to forty-first aspects, wherein the porous sintered body includes a surface from which the anode wire sticks out, and the anode wire sticks out from the surface at a position deviated from a center thereof.

A forty-third aspect of the present invention provides the solid electrolytic capacitor according to any one of the fifteenth to seventeenth aspects, further comprising an anode mounting terminal electrically connected to the anode wire, wherein the anode mounting terminal is spaced, as viewed in a direction in which the anode wire sticks out, from the anode wire in a direction in which the first lateral surface faces.

A forty-fourth aspect of the present invention provides the solid electrolytic capacitor according to any one of the eighth to forty-third aspects, wherein the fluorine resin only contains at least one selected from the group consisting of polytetrafluoroethylene (PTFE), tetrafluoroethylene-perfluoroalkylvinylether copolymer (PFA), fluorinated ethylene polypropylene copolymer (FEP), tetrafluoroethylene-ethylene copolymer (ETFE), and polyvinylidene fluoride (PVDF).

Other features and advantages of the present invention will become more apparent through detailed description given below referring to the accompanying drawings.

BRIEF DESCRIPTION OF THE DRAWINGS

FIG. 2 shows the solid electrolytic capacitor of FIG. 1, viewed in a direction indicated by an arrow II in FIG. 1;

DETAILED DESCRIPTION OF THE PREFERRED EMBODIMENT

Figure 1:
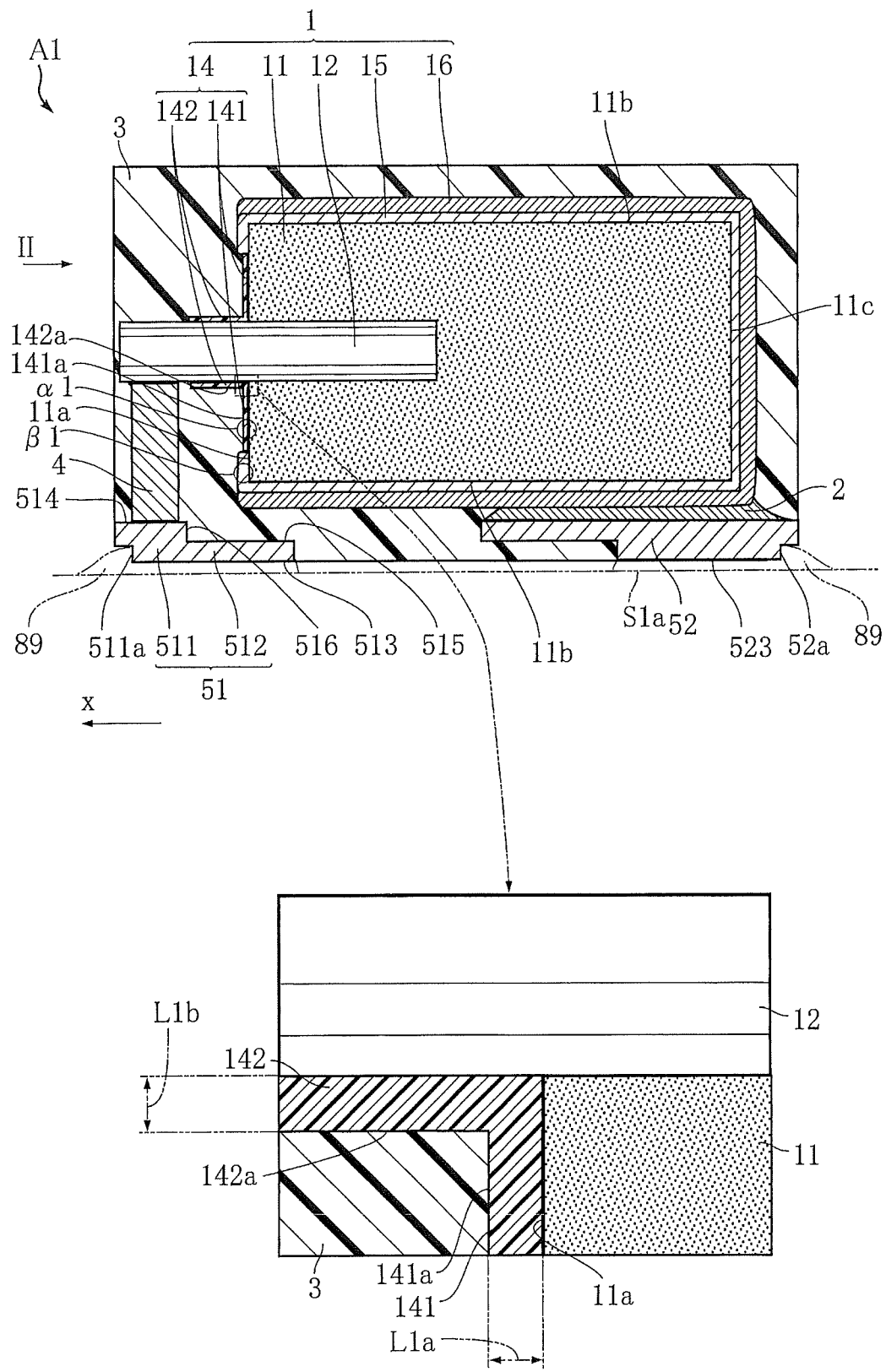
FIG. 1 is a cross-sectional view of a solid electrolytic capacitor according to a first embodiment of the present invention, including an enlarged fragmentary view thereof.

Embodiments of the present invention will be described below referring to the drawings.

First Embodiment

Figure 3A:
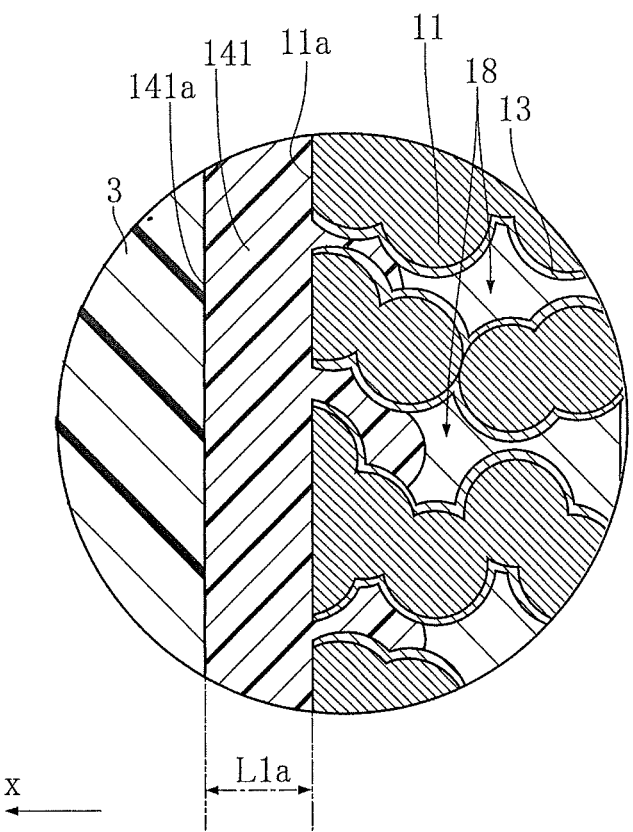
FIGS. 3A and 3B are enlarged cross-sectional views of circled portions α1 and β1 in FIG. 1, respectively.
Figure 3B:
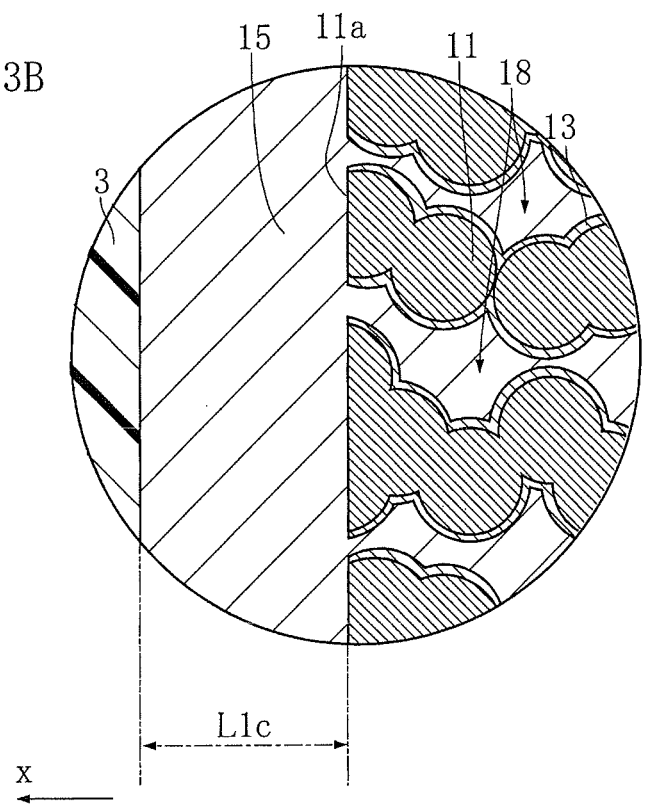

A first embodiment of the present invention will be described referring to FIG. 1 to FIG. 12B. FIG. 1 is a cross-sectional view of a solid electrolytic capacitor according to this embodiment. FIG. 2 shows the solid electrolytic capacitor of FIG. 1, viewed in a direction indicated by an arrow II in FIG. 1. FIGS. 3A and 3B are enlarged cross-sectional views of circled portions α1 and β1 in FIG. 1, respectively. FIGS. 3A and 3B are schematically drawn for easier understanding of the description.

The solid electrolytic capacitor A1 shown in these drawings includes a capacitor element 1, a conductive adhesion layer 2, a resin package 3, a pillow electrode 4, an anode mounting terminal 51, and a cathode mounting terminal 52. In use, the solid electrolytic capacitor A1 is surface-mounted, for example, on a circuit substrate S1a. The solid electrolytic capacitor A1 has, for example, a height of 0.8 mm, a width of 1.6 mm, and a depth of 0.85 mm, as in the position shown in FIG. 1.

The capacitor element 1 includes a porous sintered body 11, an anode wire 12, a dielectric layer 13 (see FIGS. 3A and 3B), an insulating layer 14, a solid electrolyte layer 15, and a conductive layer 16. The porous sintered body 11 is of a rectangular solid shape, and made of a valve metal such as tantalum or niobium. As shown in FIGS. 3A and 3B, the porous sintered body 11 includes a multitude of pores 18. The porous sintered body 11 includes a surface 11a oriented in a direction x, a surface 11c oriented in an opposite direction of the x-direction, and four surfaces 11b each connected to both of the surface 11a and the surface 11c (FIG. 1 shows only two of the surfaces 11b). The surfaces 11a, 11b, and 11c are of a rectangular shape. The anode wire 12 is made of a valve metal such as tantalum or niobium. The anode wire 12 sticks out from the surface 11a of the porous sintered body 11, in the x-direction. The anode wire 12 has a diameter of, for example, 0.15 mm.

As shown in FIGS. 3A and 3B, the dielectric layer 13 is provided on the porous sintered body 11. The dielectric layer 13 is made of an oxide of the valve metal constituting the porous sintered body 11. Examples of the oxide of the valve metal include tantalum pentoxide and niobium pentoxide.

Referring again to FIG. 1, the insulating layer 14 covers the porous sintered body 11 and the anode wire 12. The insulating layer 14 is made of a fluorine resin. In this embodiment, the fluorine resin only contains at least one selected from the group consisting of polytetrafluoroethylene (PTFE), tetrafluoroethylene-perfluoroalkylvinylether copolymer (PFA), fluorinated ethylene polypropylene copolymer (FEP), tetrafluoroethylene-ethylene copolymer (ETFE), and polyvinylidene fluoride (PVDF). The insulating layer 14 serves to suppress the upward spreading of a solution that is to form the solid electrolyte layer 15, along the anode wire 12.

As is apparent from an enlarged fragmentary view in FIG. 1 and from FIG. 2, the insulating layer 14 includes a first film portion 141 and a second film portion 142. As will be subsequently described, the insulating layer 14 is formed by melting a resin material containing fluorine (granular particles made of the fluorine resin). The first film portion 141 is pierced with the anode wire 12, and is in close contact with an entire circumference of the anode wire 12. The first film portion 141 extends along the surface 11a of the porous sintered body 11. The first film portion 141 is not provided in the vicinity of a periphery of the surface 11a, but only in a region of the surface 11a close to the anode wire 12. The first film portion 141 includes a flat surface 141a oriented in the x-direction. The surface 141a is uniformly spaced from the surface 11a, over the entirety of the surface 141a. In other words, the first film portion 141 has a uniform thickness $L1a$ over the entirety thereof. The thickness $L1a$ is, for example, 50 μm or less, and in this embodiment the thickness $L1a$ is 2 μm to 4 μm. It is preferable that the thickness $L1a$ is smaller, because thus the volume of the capacitor element 1 can be increased. As shown in FIG. 3A, part of the first film portion 141 may be formed in pores 18. In such a state, the first film portion 141 may be described as being formed into the porous sintered body 11. It should be noted, however, that the thickness $L1a$ here is defined as the distance between the surface 11a (forward portion of the porous sintered body 11 in the x-direction) and the surface 141a.

As is apparent from the enlarged fragmentary view in FIG. 1, the second film portion 142 extends in the x-direction from the first film portion 141. As shown in FIG. 2, the second film portion 142 covers the anode wire 12, and is in close contact with an entire circumferential surface of the anode wire 12. As shown in the enlarged fragmentary view in FIG. 1, the second film portion 142 includes a surface 142a oriented outward in a radial direction of the anode wire 12. The surface 142a is uniformly spaced from the surface of the anode wire 12, over the entirety of the surface 142a. In other words, the second film portion 142 has a uniform thickness $L1b$ over the entirety thereof. The thickness $L1b$ is, for example, 50 μm or less, and in this embodiment the thickness $L1b$ is 2 μm to 4 μm. The thickness $L1b$ herein referred to is defined as a distance between the surface of the anode wire 12 and the surface 142a. The thickness $L1b$ of the second film portion 142 may be equal to the thickness $L1a$ of the first film portion 141.

As shown in FIG. 3B, the solid electrolyte layer 15 is provided on the dielectric layer 13. A part of the solid electrolyte layer 15 is located in the pores 18. As shown in FIG. 1, another part of the solid electrolyte layer 15 is provided on the surfaces 11a, 11b, and 11c of the porous sintered body 11. The solid electrolyte layer 15 is not provided in a region of the surface 11a close to the anode wire 12, but only in the vicinity of a periphery of the surface 11a. The solid electrolyte layer 15 is in close contact with the first film portion 141. As shown in FIG. 2, the solid electrolyte layer 15 is disposed so as to surround the first film portion 141, on the surface 11a.

Referring to FIG. 1, the solid electrolyte layer 15 includes a portion elevated in the x-direction with respect to the first film portion 141. A maximum thickness $L1c$ of the elevated portion of the solid electrolyte layer 15 (see FIG. 3B) is, for example, 2 μm to 100 μm. Although a part of the solid electrolyte layer 15 is located in the pores 18 as stated above, the maximum thickness $L1c$ herein referred to is defined as a distance in the x-direction between the surface 11a (forwardmost portion of the porous sintered body 11 in the x-direction) and a most elevated portion of the solid electrolyte layer 15. The solid electrolyte layer 15 is made of, for example, manganese dioxide or a conductive polymer. When the solid electrolytic capacitor A1 is put to practical use, electric charge is stored in an interface between the solid electrolyte layer 15 and the dielectric layer 13.

The conductive layer 16 covers the solid electrolyte layer 15, and is electrically connected thereto. The conductive layer 16 has a layered structure including, for example, a graphite layer and a silver layer.

The conductive adhesion layer 2 is made of, for example, silver paste. The resin package 3 is made of, for example, an epoxy resin. The resin package 3 serves to protect the capacitor element 1.

The pillow electrode 4 serves to support the anode wire 12 in a process of attaching the anode mounting terminal 51 and the cathode mounting terminal 52 (to be described later) to the capacitor element 1. The pillow electrode 4 extends in a direction intersecting with the x-direction, for example in a vertical direction in FIG. 1 as in this embodiment. The pillow electrode 4 is connected to a portion of the anode wire 12 spaced from the second film portion 142, and electrically connected with the anode wire 12. The pillow electrode 4 is made of, for example, a Ni—Fe alloy such as a 42 alloy, plated with copper.

The anode mounting terminal 51 and the cathode mounting terminal 52 are utilized for mounting the solid electrolytic capacitor A1 on the circuit substrate S1a. The anode mounting terminal 51 and the cathode mounting terminal 52 are both made of, for example, a Ni—Fe alloy such as a 42 alloy, plated with copper.

The anode mounting terminal 51 serves to support the pillow electrode 4, and is electrically connected to the anode wire 12 through the pillow electrode 4. A portion of the anode mounting terminal 51 is exposed from the resin package 3. The portion of the anode mounting terminal 51 exposed from the resin package 3 constitutes a mounting surface 513 for mounting the solid electrolytic capacitor A1 on the circuit substrate S1a. The solid electrolytic capacitor A1 can be mounted on the circuit substrate S1a by bonding the mounting surface 513 to the circuit substrate S1a by means of a solder 89.

The anode mounting terminal 51 includes a thicker portion 511 and a thinner portion 512 having a smaller thickness (size in a vertical direction in FIG. 1) than the thicker portion 511. A surface of the thicker portion 511 on an opposite side of the mounting surface 513 serves as a supporting surface 514 that supports the pillow electrode 4. The supporting surface 514 is parallel to the mounting surface 513. The thicker portion 511 includes a fillet portion 511a formed at a front end portion thereof in the x-direction, and recessed from the mounting surface 513 toward the supporting surface 514. Accordingly, a portion of the solder 89 bonding the mounting surface 513 and the circuit substrate S1a constitutes a solder fillet.

The thinner portion 512 serves to prevent the anode mounting terminal 51 from contacting the conductive layer 16 or the solid electrolyte layer 15. A surface of the thinner portion 512 on the opposite side of the mounting surface 513 constitutes a recessed surface 515. The recessed surface 515 is parallel to the mounting surface 513. The recessed surface 515 is located on an end portion of the anode mounting terminal 51 opposite the fillet portion 511a in the x-direction. Since the recessed surface 515 is included in the thinner portion 512, a distance between the recessed surface 515 and the mounting surface 513 is smaller than a distance between the supporting surface 514 and the mounting surface 513. It is not mandatory that the recessed surface 515 is parallel to the mounting surface 513, but the recessed surface 515 may be formed in a slope so as to get closer to the mounting surface 513 at a position farther away from supporting surface 514 in the x-direction. In this embodiment, the recessed surface 515 is connected to the supporting surface 514 through a rising surface 516. The rising surface 516 is vertical with respect to the recessed surface 515, and extends from the recessed surface 515 to the supporting surface 514.

The cathode mounting terminal 52 is electrically connected to the solid electrolyte layer 15 through the conductive adhesion layer 2 and the conductive layer 16. A portion of the cathode mounting terminal 52 is exposed from the resin package 3. The portion of the cathode mounting terminal 52 exposed from the resin package 3 constitutes a mounting surface 523 for mounting the solid electrolytic capacitor A1 on the circuit substrate S1a. The solid electrolytic capacitor A1 can be mounted on the circuit substrate S1a by bonding the mounting surface 523 to the circuit substrate S1a by means of the solder 89. Forming the mounting surface 523 and the mounting surface 513 in an equal area is advantageous for self alignment. The cathode mounting terminal 52 includes a fillet portion 52a as that of the anode mounting terminal 51, formed at a rear end portion of the cathode mounting terminal 52 in the x-direction. It is preferable to form a surface of the cathode mounting terminal 52 on the opposite side of the mounting surface 523 in a larger area, from the viewpoint of improving an equivalent series resistance (ESR).

Figure 4:
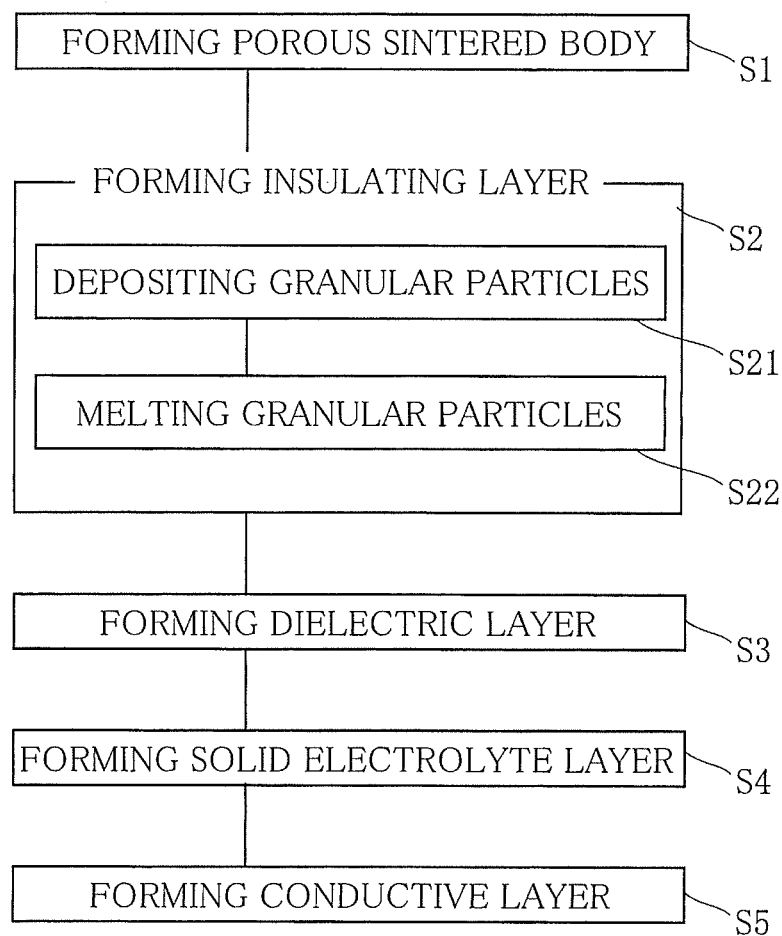
FIG. 4 is a flowchart showing a manufacturing process of the solid electrolytic capacitor.

Referring now to FIGS. 4 to 10, a method of manufacturing the solid electrolytic capacitor A1 will be described. To start with, a manufacturing method of the capacitor element 1 will be described. FIG. 4 shows a flow of the manufacturing process of the capacitor element 1.

Figure 5A:
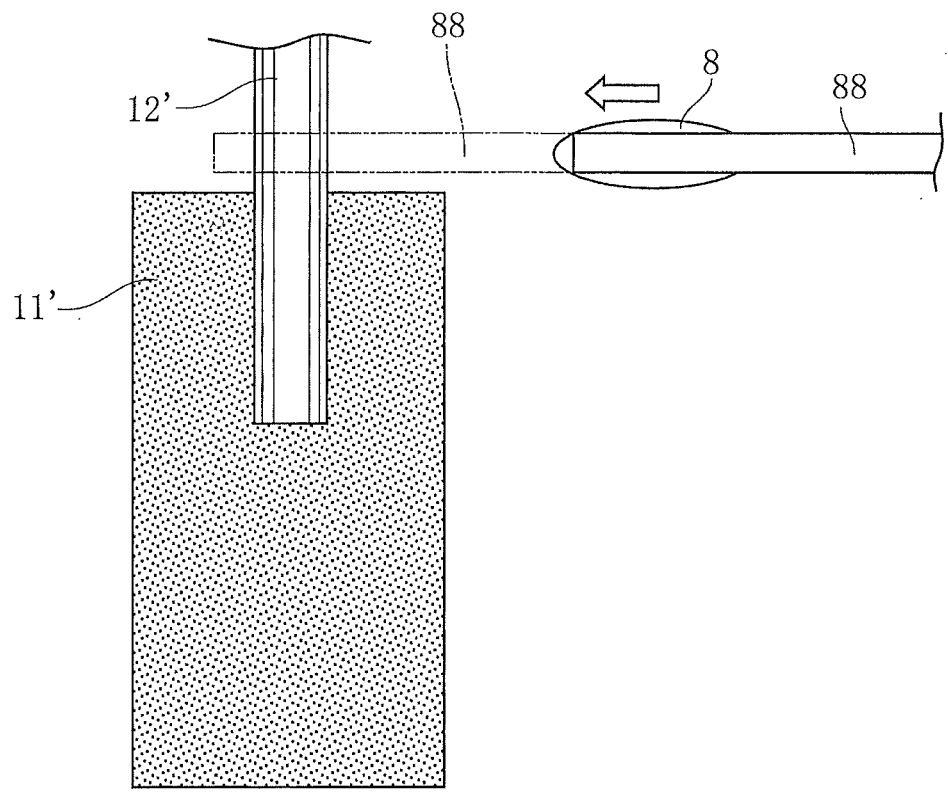
FIG. 5A is a cross-sectional view for explaining the manufacturing process of the solid electrolytic capacitor.

First, a step S1 is performed in which a porous sintered body 11' shown in FIG. 5A is formed. In the step S1, fine powder of a valve metal such as tantalum or niobium is press-formed, with a portion of an anode wire 12' inserted therein. The compact obtained by the press-forming process is subjected to a sintering process. Through the sintering process, the fine powder of the valve metal is combined and the porous sintered body 11' containing a multitude of pores is obtained.

Figure 6:
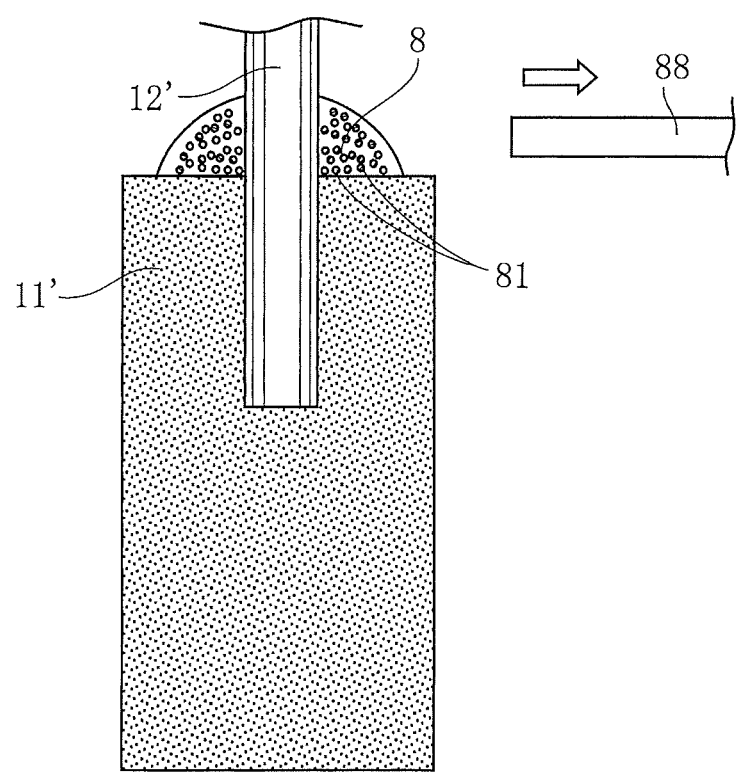
FIG. 6 is another cross-sectional view for explaining the manufacturing process of the solid electrolytic capacitor.
Figure 7:
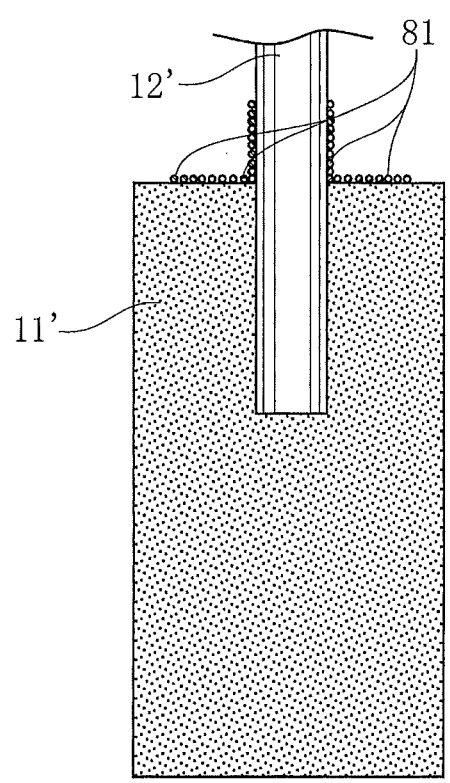
FIG. 7 is still another cross-sectional view for explaining the manufacturing process of the solid electrolytic capacitor.
Figure 8:
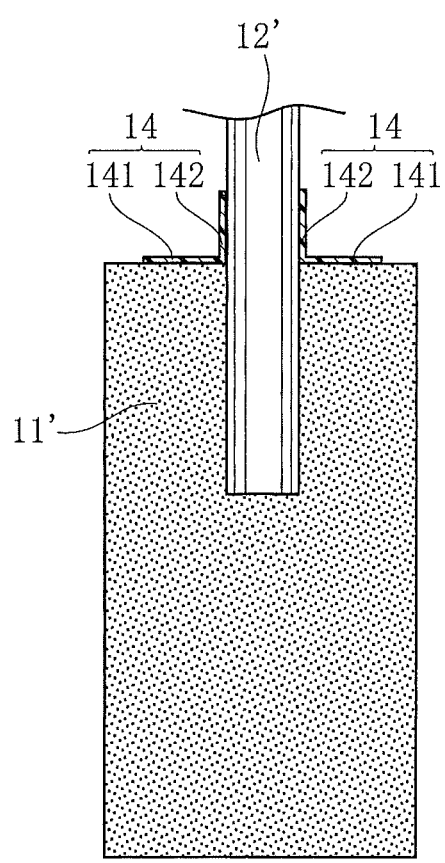
FIG. 8 is still another cross-sectional view for explaining the manufacturing process of the solid electrolytic capacitor.

Referring then to FIGS. 5A to 8, a step S2 is performed in which the insulating layer 14 (see FIG. 8) is formed. The step S2 includes a step 21 of depositing the plurality of granular particles 81 made of a fluorine resin to the anode wire 12' (FIGS. 5A to 7), and a step S22 of melting the plurality of granular particles 81 (FIG. 8). In this embodiment, the plurality of granular particles 81 is also deposited to the porous sintered body 11', at the same time as performing the step S21. Details of such a process are as described below. Here, the plurality of granular particles 81 exemplifies the resin material.

Figure 5B:
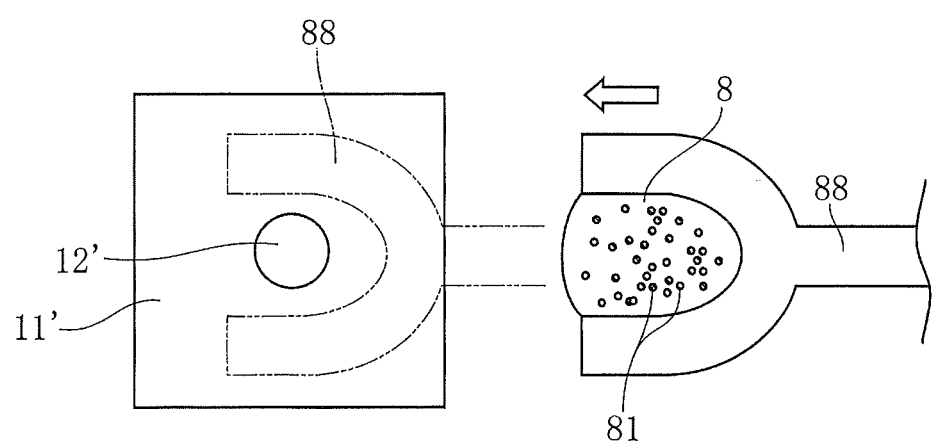
FIG. 5B is a plan view for explaining the manufacturing process of the solid electrolytic capacitor.

As shown in FIGS. 5A and 5B, aqueous dispersion 8 is retained by a retention member 88 at a branched front end portion thereof, in the step S21 of depositing the granular particles 81 to the anode wire 12'. The aqueous dispersion 8 can be obtained by stabilizing the granular particles 81 with a surfactant.

Then the retention member 88 is brought close to the anode wire 12' as indicated by imaginary lines in FIGS. 5A and 5B, and the branched portion of the retention member 88 is fitted to a portion of the anode wire 12' close to the porous sintered body 11'. As a result, the aqueous dispersion 8 retained by the retention member 88 is deposited to the anode wire 12' and the porous sintered body 11'. In this process, the aqueous dispersion 8 porous may be unevenly deposited to the sintered body 11'. Also, the spreading action of the aqueous dispersion 8 over the porous sintered body 11' varies depending on the surface condition thereof. Accordingly, the first film portion 141 is prone to assume a state shown in FIGS. 11A to 11D to be subsequently described.

Proceeding to FIG. 6, the retention member 88 is moved away from the anode wire 12'. At this stage, the aqueous dispersion 8 becomes deposited to the anode wire 12' and the porous sintered body 11'. Then as shown in FIG. 7, in several seconds after applying the aqueous dispersion 8 to the porous sintered body 11' and the anode wire 12', liquid component in the aqueous dispersion 8 infiltrates into the porous sintered body 11'. As a result, the granular particles 81 remain deposited to the porous sintered body 11' and the anode wire 12'. In the step S21, the plurality of granular particles 81 is thus deposited to the anode wire 12'.

In this embodiment, for example an article No. D-210C of PTFE D-series (manufactured by Daikin Industries, Ltd.) may be employed as the aqueous dispersion 8. In the case of employing such aqueous dispersion 8, parameters may be specified as follows. The mass of the aqueous dispersion 8 to be applied to the anode wire 12' and the porous sintered body 11' may be approximately 0.2 g. The concentration of the granular particles 81 with respect to the aqueous dispersion 8 may be approximately 60 mass %. The particle diameter of the granular particles 81 may be, for example, 0.15 μm to 0.30 μm. The concentration of the surfactant with respect to the aqueous dispersion 8 may be approximately 6 mass %/p. The viscosity of the aqueous dispersion 8 may be 15 to 35 (cp, 25° C.). The specific weight aqueous dispersion 8 may be 1.51 to 1.54 (25° C.). The pH of the aqueous dispersion 8 may be 9 to 10.

Suitable examples of the aqueous dispersion 8 include the articles No. D-1E, No. D-311, and No. ND-110 of the PTFE D-series (manufactured by Daikin Industries, Ltd.).

Referring now to FIG. 8, the granular particles 81 are molten by heat in a step S22. Melting the granular particles 81 leads to formation of the insulating layer 14. The step S22 may be performed, for example, in a heating furnace at a temperature higher than the melting point of the granular particles 81. In the case where the granular particles 81 are PTFE, the melting point of the granular particles 81 is 327° C. and hence it is preferable to set the heating furnace at approximately 340° C. in the step S22. In the case where the granular particles 81 are PFA, the melting point of the granular particles 81 is 304 to 310° C. and hence it is preferable to set the heating furnace at approximately 340° C. in the step S22. In the case where the granular particles 81 are FEP, the melting point of the granular particles 81 is 280° C. and hence it is preferable to set the heating furnace at approximately 300° C. in the step S22.

In the step S22, it is preferable to heat the anode wire 12 for a short time, to prevent oxidation of the anode wire 12. It is preferable to employ heat blocks that hold the granular particles 81 and the porous sintered body 11' therebetween when melting the granular particles 81 in the step S22. Such an arrangement allows the granular particles 81 to be molten without applying much heat to the anode wire 81.

In this embodiment, the insulating layer 14 is provided on the porous sintered body 11' and the anode wire 12'. A portion of the insulating layer 14 formed on the porous sintered body 11' constitutes the first film portion 141. Another portion of the insulating layer 14 formed on the anode wire 12' constitutes the second film portion 142. The insulating layer 14 is formed by melting the granular particles 81. Accordingly, the first film portion 141 and the second film portion 142 are formed in close contact with the anode wire 12'. Also, the molten resin may slightly intrude into the porous sintered body 11' upon melting the granular particles 81. Accordingly, a part of the first film portion 141 may be formed inside the pores in the porous sintered body 11'.

Here, the step S2 of forming the insulating layer 14 may be repeated, for increasing the thickness thereof. On the contrary, in order to make the insulating layer 14 thinner, the aqueous dispersion 8 may be diluted by water and applied to the anode wire 12', in the step S21.

The foregoing is followed by a step S3, in which the dielectric layer 13 is formed. The step S3 includes oxidizing the anode, with the porous sintered body 11' soaked in, for example, aqueous solution of phosphoric acid.

Figure 9:
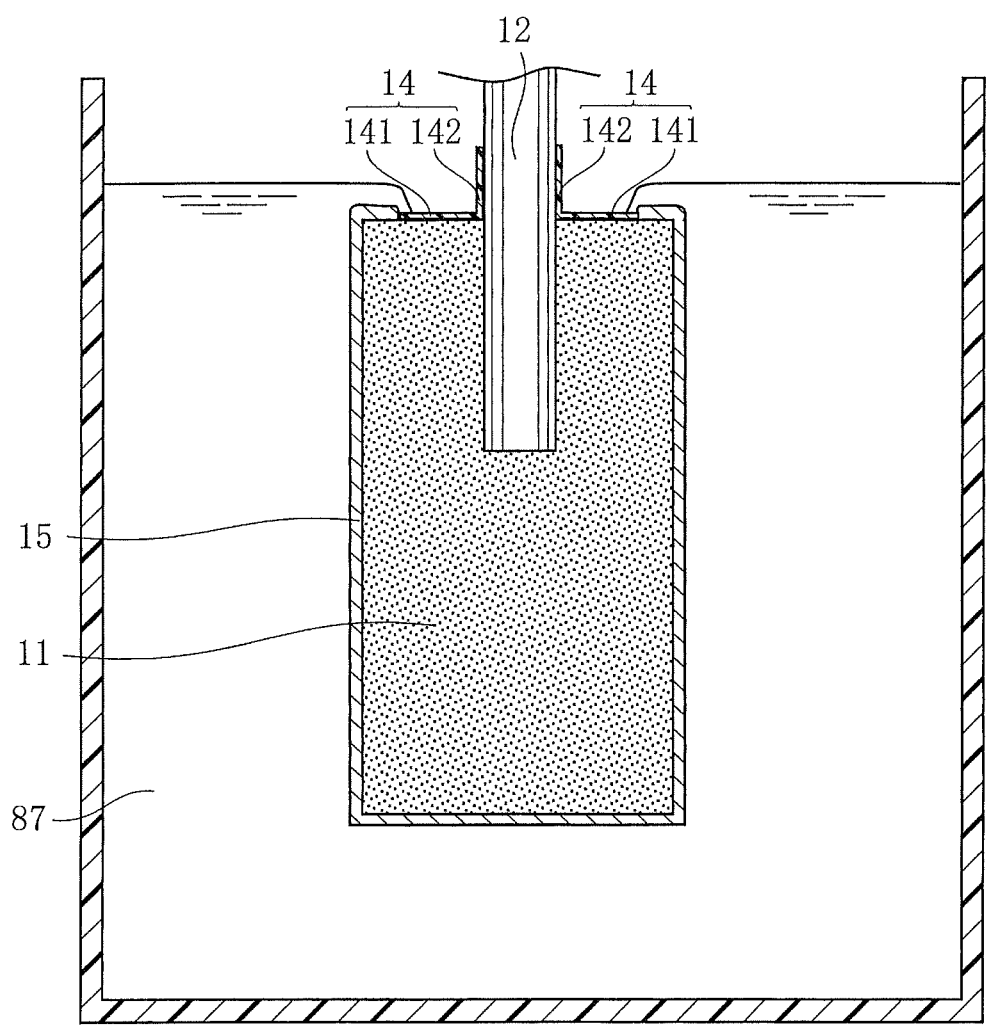
FIG. 9 is still another cross-sectional view for explaining the manufacturing process of the solid electrolytic capacitor.

Referring now to FIG. 9, a step S4 is performed in which the solid electrolyte layer 15 is formed. In the step S4, the porous sintered body 11 with the dielectric layer 13 formed thereon is soaked in aqueous solution 87. The aqueous solution 87 may be manganese nitrate aqueous solution or conductive polymer aqueous solution, for example. It is preferable that the porous sintered body 11 is soaked in the aqueous solution 87 such that the surface of the aqueous solution 87 does not surpass the insulating layer 14. Because of the surface tension of the aqueous solution 87 with respect to the insulating layer 14, the aqueous solution 87 does not stick to the insulating layer 14. Even though the aqueous solution 87 temporarily sticks to the insulating layer 14, the aqueous solution 87 flows off from the insulating layer 14 when later the porous sintered body 11 is taken out from the aqueous solution 87. The porous sintered body 11 is subjected to a sintering process, after being taken out from the aqueous solution 87. Repeating the steps of soaking the porous sintered body 11 in the aqueous solution 87 and then sintering the porous sintered body 11 leads to formation of the solid electrolyte layer 15.

FIGS. 11A to 11D are scanning electron microscope (SEM) images of the capacitor element that has undergone the step S4 of forming the solid electrolyte layer 15.

Figure 11A:
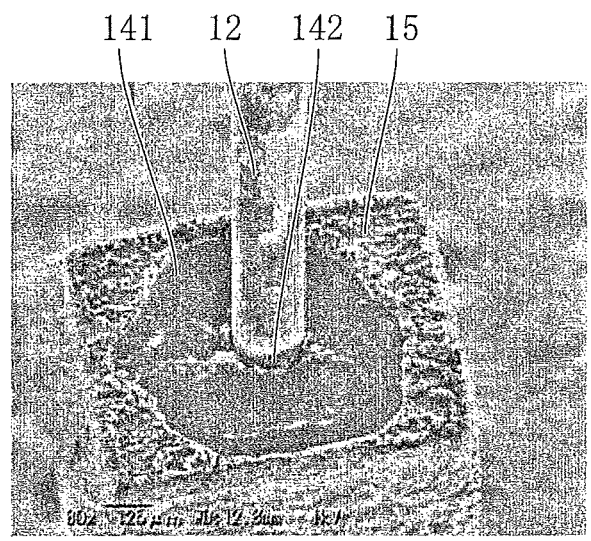
FIGS. 11A to 11D are scanning electron microscope (SEM) images of a capacitor element that has undergone a formation process of a solid electrolyte layer.
Figure 11B:
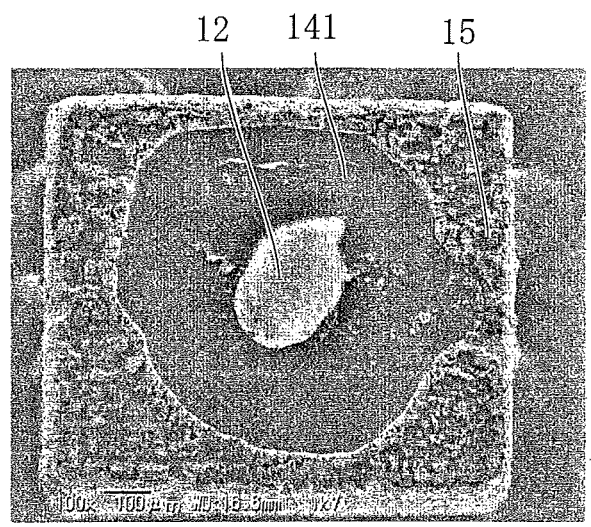
Figure 11C:
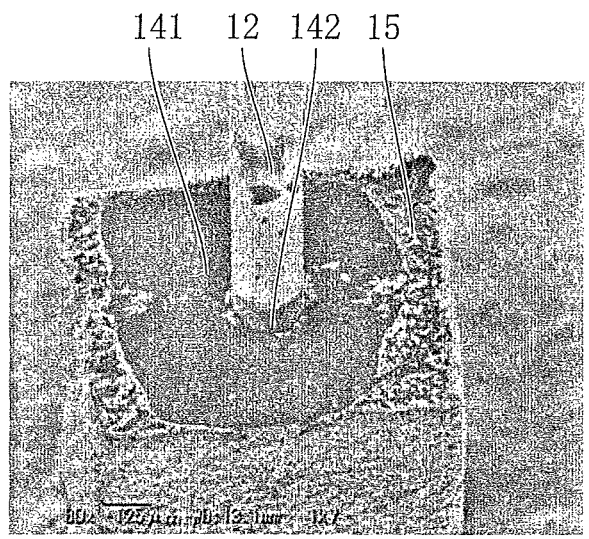
Figure 11D:
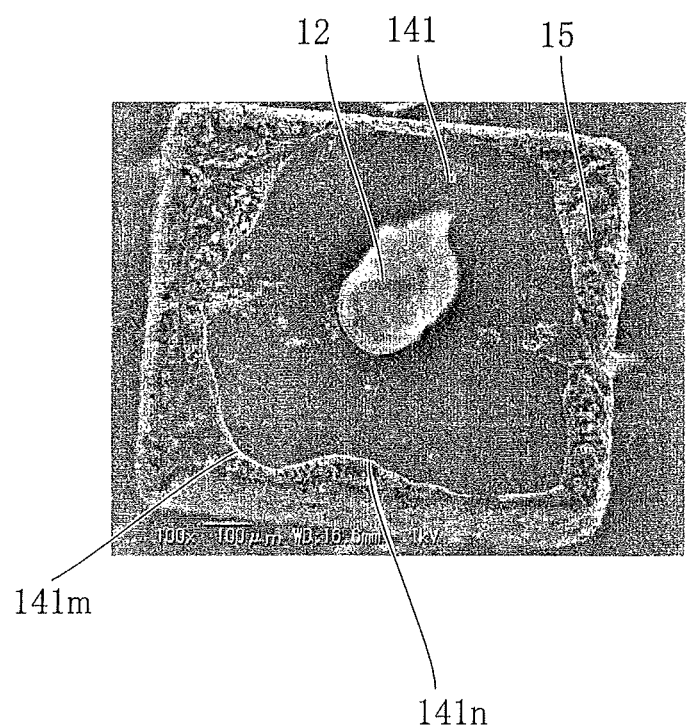

As shown in these drawings, the solid electrolyte layer 15 is formed so as to surround the first film portion 141. The periphery of the first film portion 141 presents a distorted shape, not circular. In other words, the first film portion 141 is of an asymmetrical shape with respect to a line (not shown) passing the anode wire 12, when viewed in the x-direction. Also, as shown in FIG. 11D, the periphery of the first film portion includes a proximal portion 141n and a distal portion 141m. A distance between the proximal portion 141n and the anode wire 12 is smaller than a distance between the distal portion 141m and the anode wire 12. The periphery of the first film portion 141 may be formed in a circular shape, though not shown in FIGS. 11A to 11D. The second film portion 142 of the capacitor element shown in FIGS. 11A to 11D is different in size in the x-direction, from the second film portion 142 shown in FIG. 1. The size of the second film portion 142 in the x-direction can be controlled as desired by adjusting the amount of the aqueous dispersion 8 applied to the anode wire 12' in the step S2.

Figure 10:
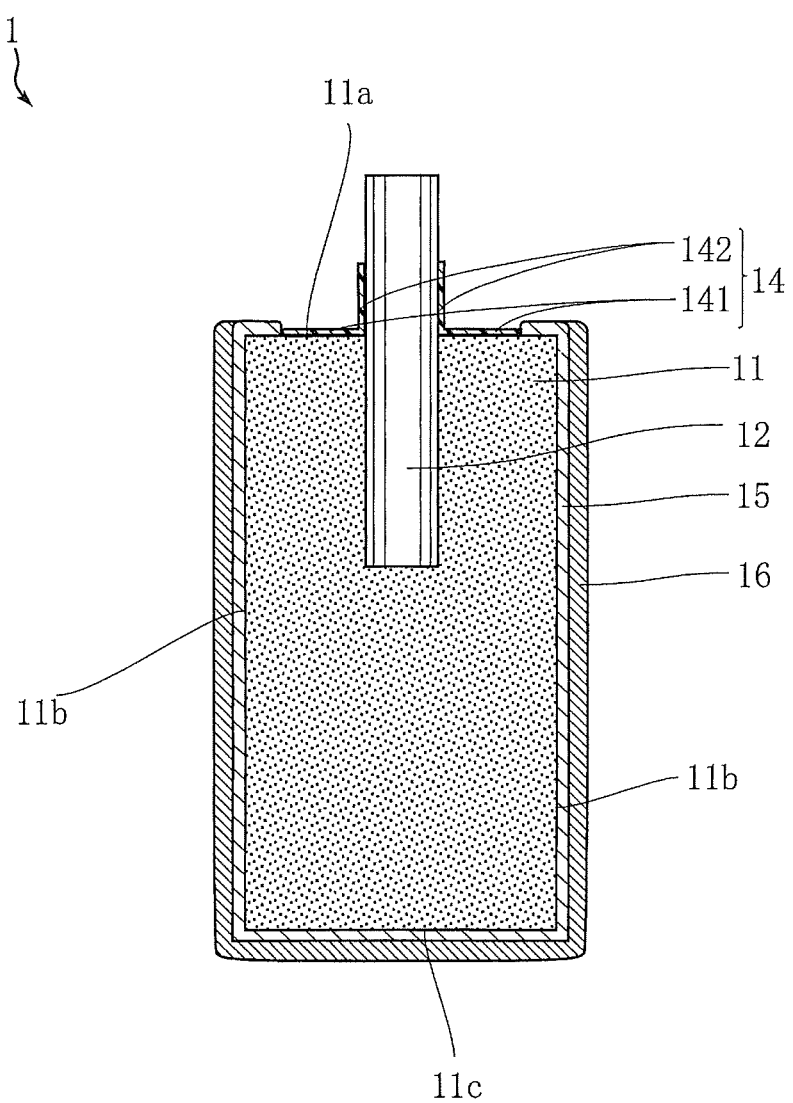
FIG. 10 is a cross-sectional view of a capacitor element obtained through the foregoing manufacturing process.

Referring now to FIG. 10, a step S5 is performed in which the conductive layer 16, for example made of a graphite layer and a silver layer, is formed. Through the foregoing steps S1 to S5, the capacitor element 1 can be obtained.

Thereafter, the conductive layer 16 and the cathode mounting terminal 52 are bonded by means of the conductive adhesion layer 2. Also, the pillow electrode 4 and the anode mounting terminal 51 are connected to the anode wire 12, for example by welding. Then the resin package 3 is formed by molding so as to cover the capacitor element 1. The solid electrolytic capacitor A1 shown in FIG. 1 can thus be obtained.

Advantages of this embodiment will now be described hereunder.

In the solid electrolytic capacitor A1, the insulating layer 14 is formed by melting the granular particles 81. Such a method assures that the insulating layer 14 achieves close contact with the anode wire 12. Accordingly, in the step S4 of forming the solid electrolyte layer 15, the aqueous solution 87 can be suppressed from spreading up through between the anode wire 12 and the insulating layer 14 due to capillary action.

Figure 12A:
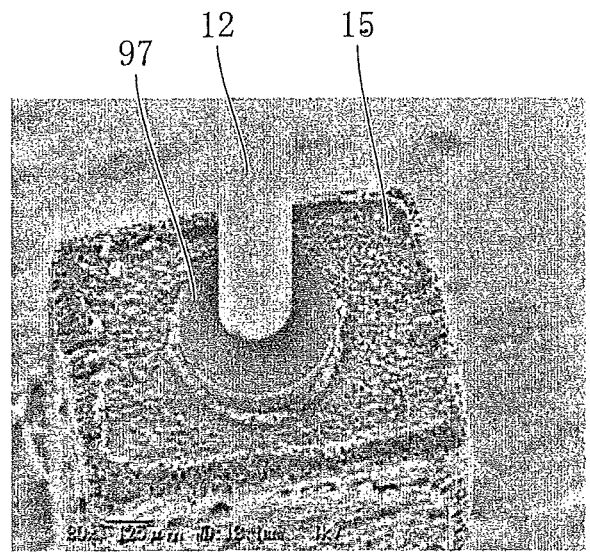
FIGS. 12A and 12B are SEM images of the capacitor element that has undergone the formation process of the solid electrolyte layer.
Figure 12B:
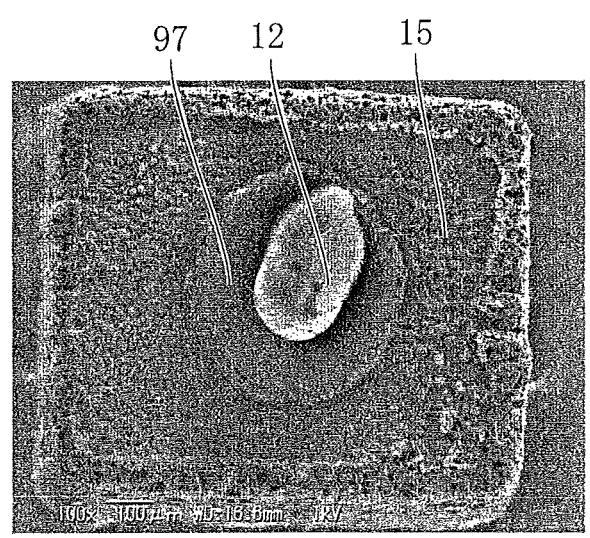

Conventionally, a washer formed by perforating a plate made of an insulating resin is employed for preventing the upward spreading of the aqueous solution 87. Such an arrangement may provoke a drawback in that the washer cannot be properly fitted to the anode wire 12. In the solid electrolytic capacitor A1 according to this embodiment, however, the insulating layer 14 is formed by melting the granular particles 81, which eliminates the need to employ the washer for preventing the upward spreading of the aqueous solution 87. Thus, the solid electrolytic capacitor A1 can avoid the foregoing drawback arising from employing the washer. FIGS. 12A and 12B are SEM images of a conventional element with the washer, shown as comparative examples with respect to FIGS. 11A to 11D.

As stated earlier, the diameter of the granular particles 81 is 0.15 μm to 0.30 μm. Such a size is far smaller than the thickness of a conventionally employed washer 97 (see FIGS. 12A and 12B), which is approximately 150 μm. Accordingly, in comparison with employing the washer, the method of melting the granular particles 81 thereby forming the first film portion 141 according to this embodiment is advantageous for reducing the thickness L1a of the first film portion 141. Reducing the thickness L1a of the first film portion 141 allows the porous sintered body 11 to be made larger in the x-direction, while maintaining the overall size of the solid electrolytic capacitor A1 in the x-direction. The manufacturing method according to this embodiment is, therefore, advantageous for increasing the capacitance of the solid electrolytic capacitor A1. Conversely, reducing the thickness L1a of the first film portion 141 allows the solid electrolytic capacitor A1 to be made smaller in the x-direction, while maintaining the capacitance of the solid electrolytic capacitor A1. The manufacturing method according to this embodiment is, therefore, advantageous for reducing the size of the solid electrolytic capacitor A1.

In this embodiment, the step S21 of depositing the granular particles 81 to the anode wire 12' is performed through applying the aqueous dispersion 8 to the anode wire 12' and the porous sintered body 11'. The granular particles 81 are dispersed in the aqueous dispersion 8. Therefore, the method according to this embodiment is advantageous for depositing the granular particles 81 to the anode wire 12' in the dispersed state.

Figure 13:
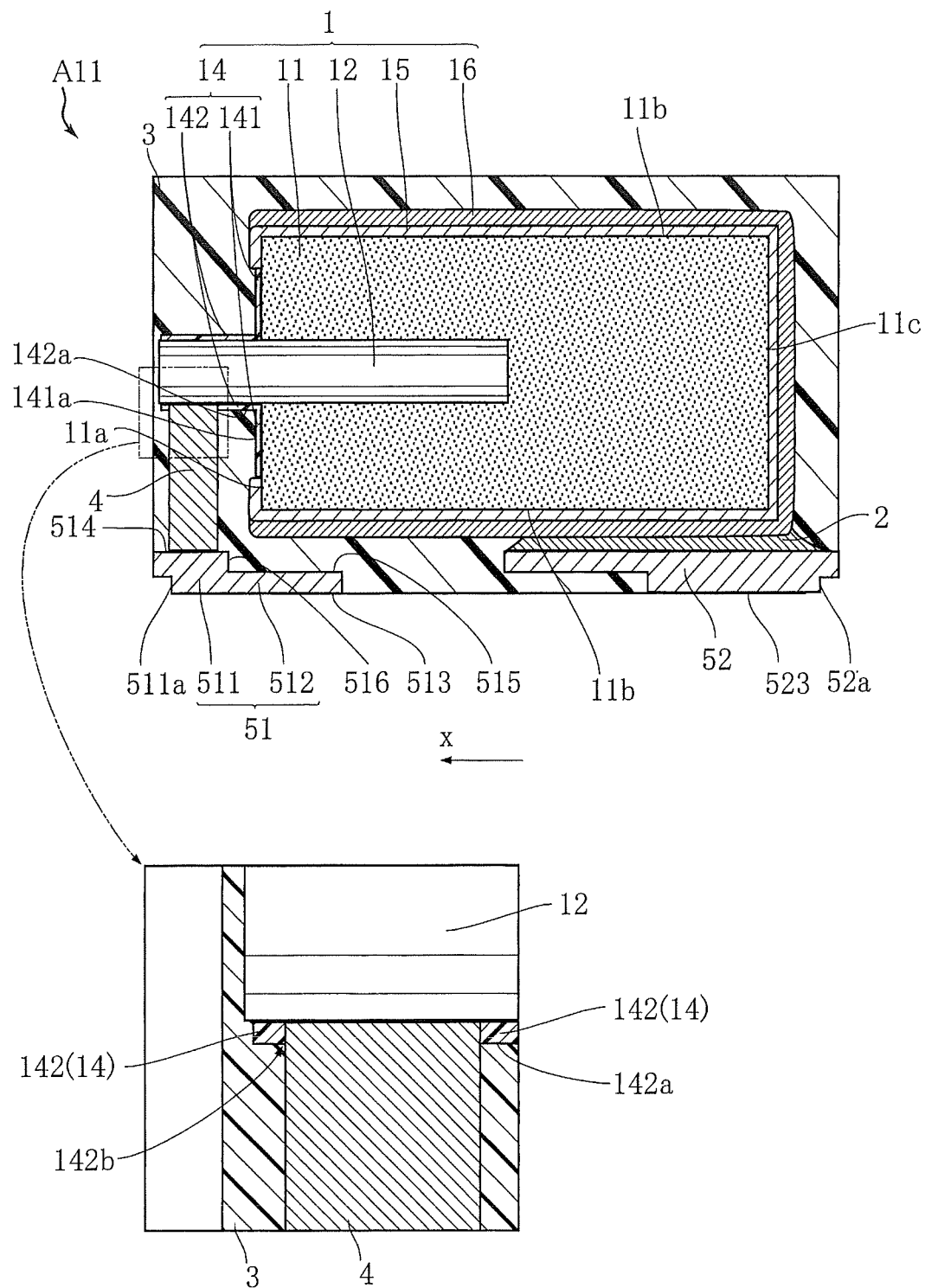
FIG. 13 is a cross-sectional view of a solid electrolytic capacitor according to a first variation of the first embodiment.
Figure 14:
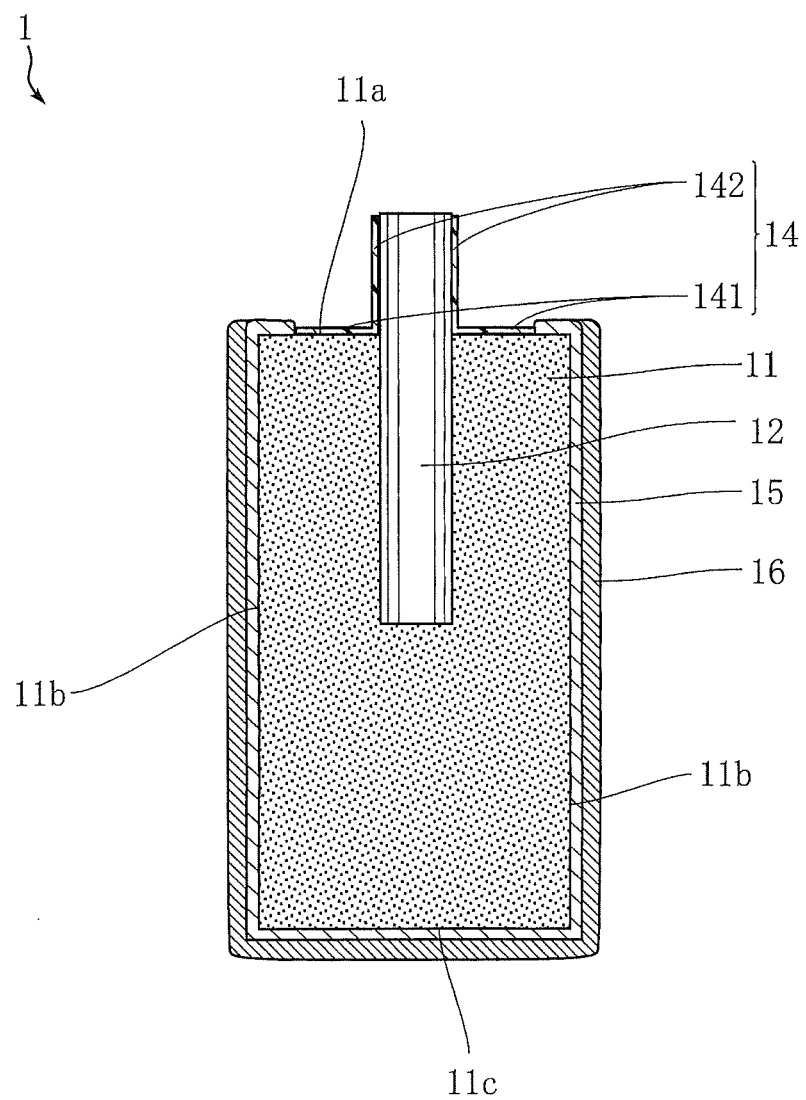
FIG. 14 is a cross-sectional view of a capacitor element obtained through the foregoing manufacturing process.

Referring now to FIGS. 13 and 14, a first variation of the first embodiment will be described hereunder. FIG. 13 is a cross-sectional view of a solid electrolytic capacitor according to this variation.

The solid electrolytic capacitor A11 shown in FIG. 13 is different from the solid electrolytic capacitor A1 in that the size of the second film portion 142 in the x-direction is larger than the size of the second film portion 142 of the solid electrolytic capacitor A1 in the x-direction.

In the solid electrolytic capacitor A11, the pillow electrode 4 is disposed in contact with the second film portion 142. The second film portion 142 includes an opening 142b. The pillow electrode 4 is connected to a portion of the anode wire 12 exposed through the opening 142b.

To manufacture the solid electrolytic capacitor A11, the steps S1 to S5 are performed as in the case of manufacturing the solid electrolytic capacitor A1, to form the capacitor element 1 shown in FIG. 14. In this variation, the second film portion 142 is also provided on a portion of the anode wire 12' relatively spaced from the porous sintered body 11'.

Then the same process as that for forming the solid electrolytic capacitor A1 is performed, so that the solid electrolytic capacitor A11 shown in FIG. 13 can be obtained. In this variation, a portion of the second film portion 142 is cut away so as to form the opening 142b, in the welding process to bond the pillow electrode 4 to the anode wire 12.

Figure 15:
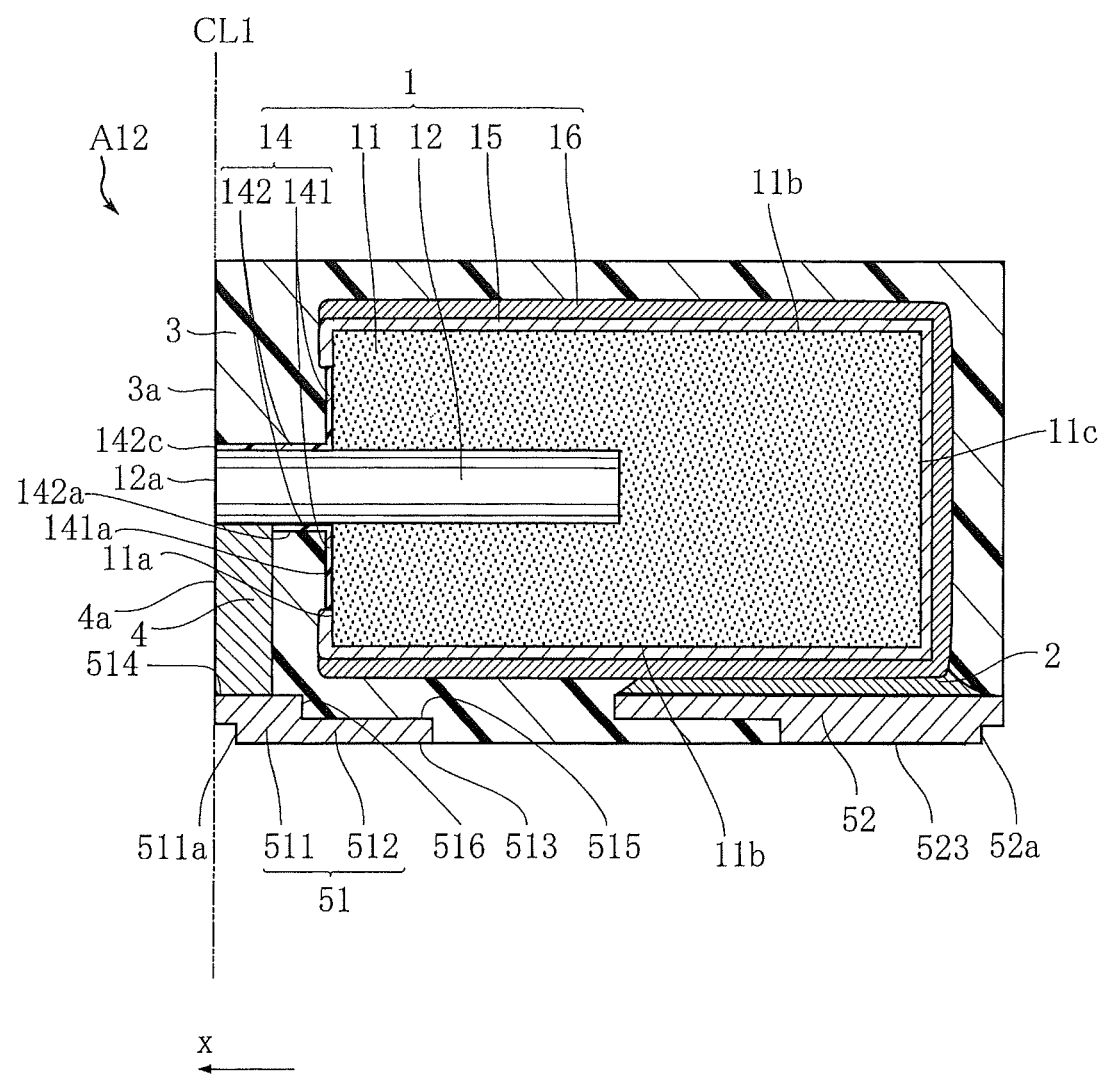
FIG. 15 is a cross-sectional view of a solid electrolytic capacitor according to a second variation of the first embodiment.
Figure 16:
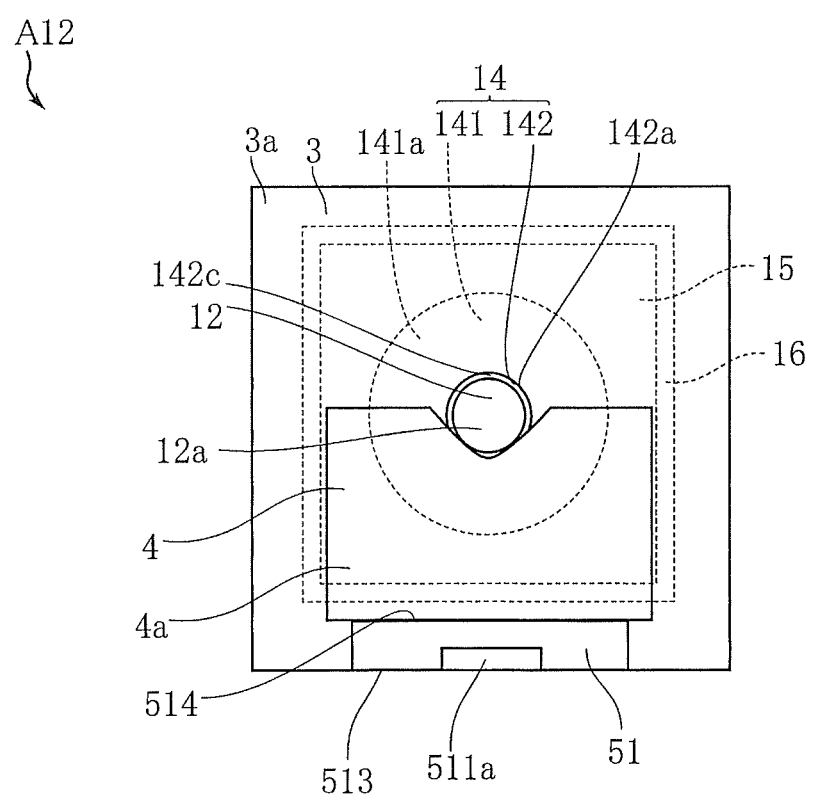
FIG. 16 is a left side view of the solid electrolytic capacitor shown in FIG. 15.

FIG. 15 is a cross-sectional view of a solid electrolytic capacitor according to a second variation of the first embodiment. FIG. 16 is a left side view of the solid electrolytic capacitor shown in FIG. 15. The solid electrolytic capacitor A12 shown in these drawings is different from the solid electrolytic capacitor A11 in that the anode wire 12, the second film portion 142, and the pillow electrode 4 are exposed from the resin package 3. A facet 12a of the anode wire 12, a facet 142c of the second film portion 142, a facet 4a of the pillow electrode 4, and a facet 3a of the resin package 3 are flush with each other. The solid electrolytic capacitor A12 thus configured can be obtained by cutting along a cutting line CL1.

Figure 17:
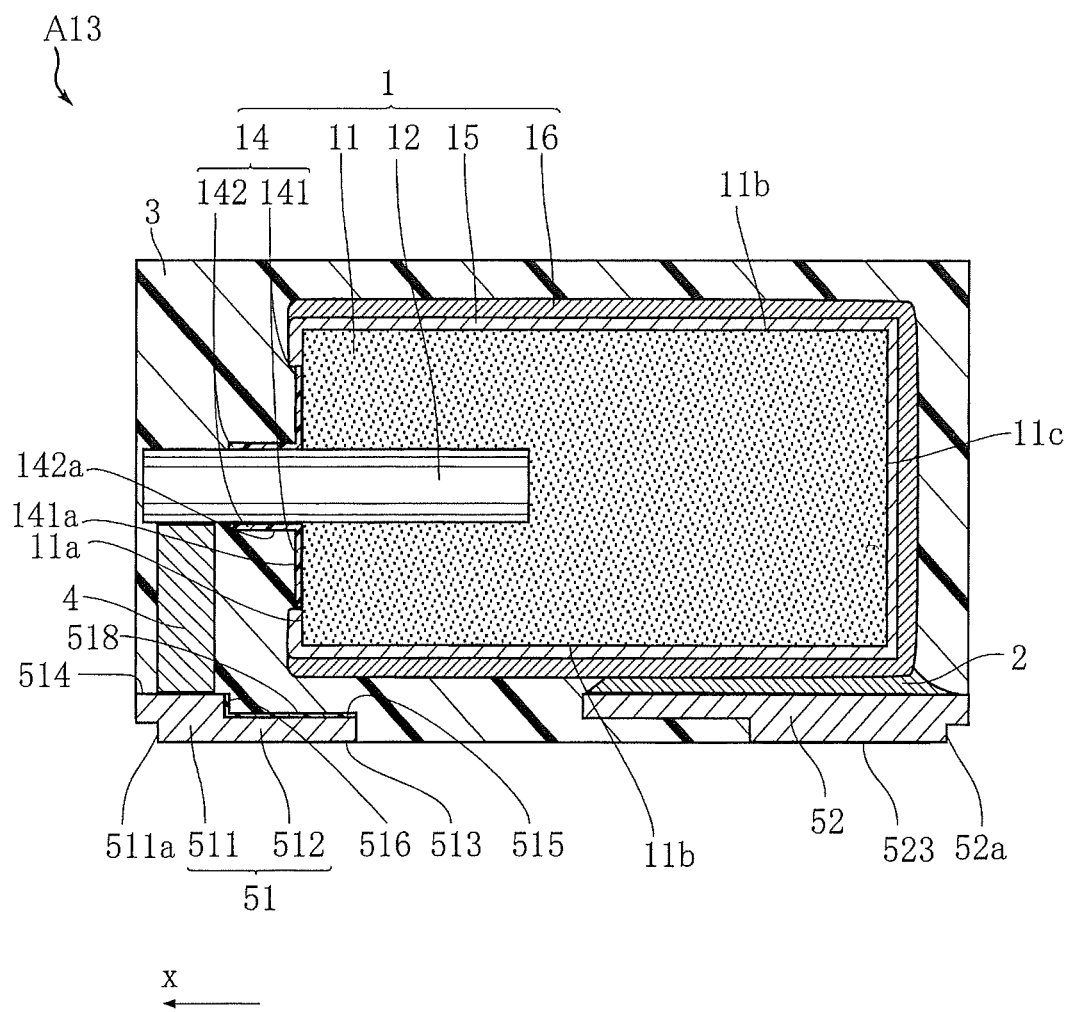
FIG. 17 is a cross-sectional view of a solid electrolytic capacitor according to a third variation of the first embodiment.

FIG. 17 is a cross-sectional view of a solid electrolytic capacitor according to a third variation of the first embodiment. The solid electrolytic capacitor A13 shown in FIG. 17 is different from the solid electrolytic capacitor A1 in further including an insulating layer 518 formed on the recessed surface 515 and the rising surface 516. Such a configuration allows the anode mounting terminal 51 to be prevented from contacting the conductive layer 16 or the solid electrolyte layer 15, and from being thus electrically connected thereto. The structure including the insulating layer 518 according to this variation is also applicable to the solid electrolytic capacitors A11 and A12.

Figure 18:
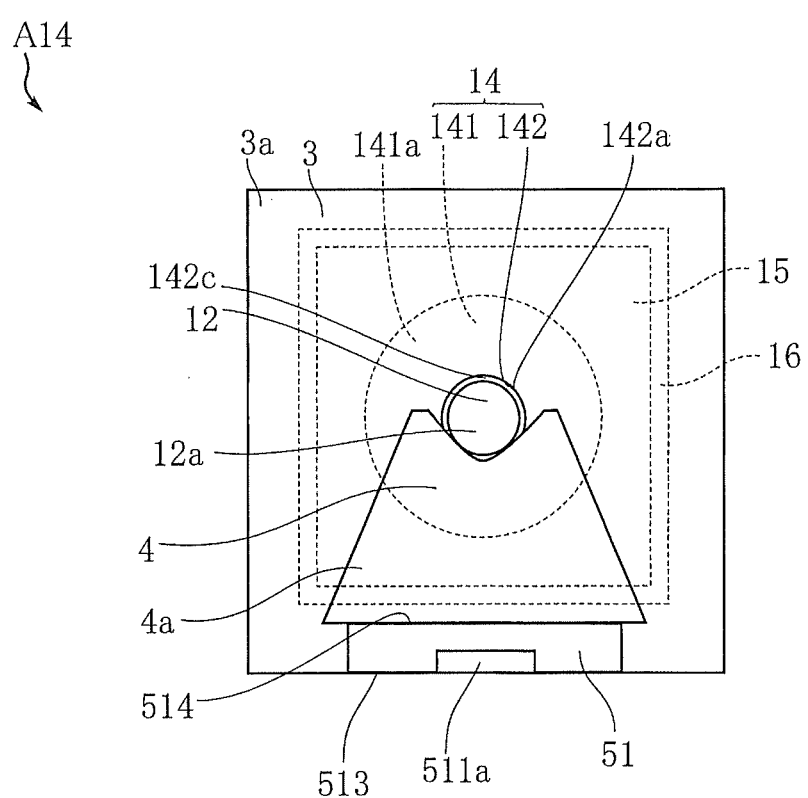
FIG. 18 is a cross-sectional view of a solid electrolytic capacitor according to a fourth variation of the first embodiment.

FIG. 18 is a side view of a solid electrolytic capacitor according to a fourth variation of the first embodiment. The solid electrolytic capacitor A14 shown in FIG. 18 is different from the solid electrolytic capacitor A12 in that the pillow electrode 4 is of a trapezoidal shape having a width decreasing toward the anode wire 12. With such a configuration, a greater amount of current is supplied to the narrower portion of the pillow electrode 4 in the process of welding the pillow electrode 4 to the anode wire 12, and hence higher heating efficiency is attained. Accordingly, in the process of bonding the pillow electrode 4 to the anode wire 12 by welding, a portion of the pillow electrode 4 closer to the anode wire 12 can be more readily molten. Therefore, the configuration according to this variation facilitates the anode wire 12 and the pillow electrode 4 to be more efficiently bonded by welding.

Hereafter, further embodiments of the present invention will be described. For the description of the following embodiments, constituents that are the same as or similar to those of the first embodiment will be given the same numeral, and the description thereof will not be repeated.

Second Embodiment

Figure 19:
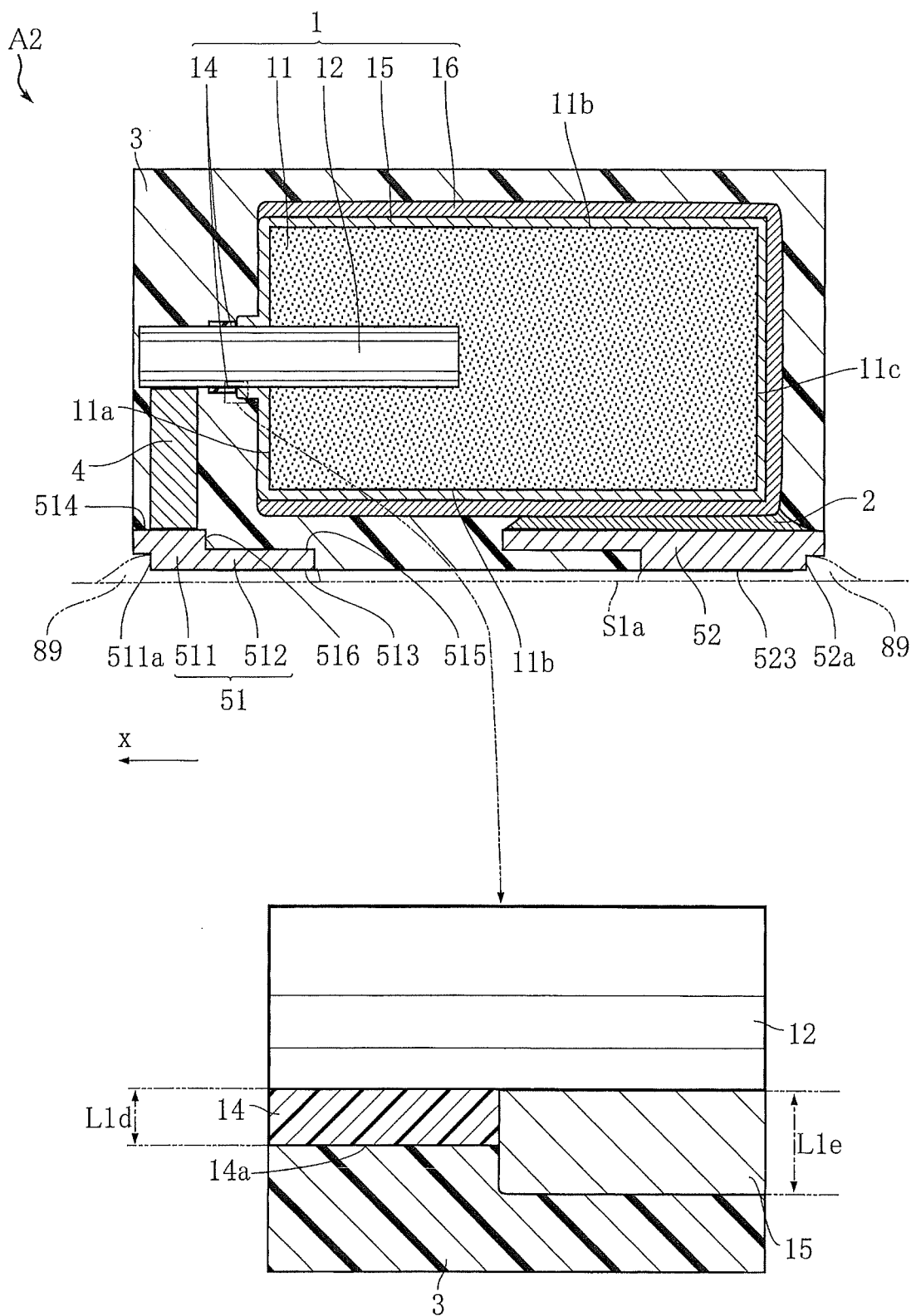
FIG. 19 is a cross-sectional view of a solid electrolytic capacitor according to a second embodiment of the present invention, including an enlarged fragmentary view thereof.

Referring to FIGS. 19 to 23, a second embodiment of the present invention will be described. FIG. 19 is a cross-sectional view of a solid electrolytic capacitor according to this embodiment.

The solid electrolytic capacitor A2 shown therein is different from the solid electrolytic capacitor A1 essentially in that the insulating layer 14 is not provided on the porous sintered body 11, but only on a portion of the anode wire 12 spaced from the porous sintered body 11. The structure of the solid electrolytic capacitor A2 is the same as that of the solid electrolytic capacitor A1, except for the insulating layer 14 and the solid electrolyte layer 15. In the following passages, description of the structure same as that of the solid electrolytic capacitor A1 will not be repeated.

The insulating layer 14 is spaced from the porous sintered body 11 and extends in the x-direction. The insulating layer 14 covers the anode wire 12, and is in close contact with the anode wire 12 over the entire circumferential surface thereof. The insulating layer 14 includes a surface 14a oriented outward in a radial direction of the anode wire 12. The surface 14a is uniformly spaced from the surface of the anode wire 12, over the entirety of the surface 14a. In other words, the insulating layer 14 has a uniform thickness $L1d$ over the entirety thereof. The thickness $L1d$ may be, for example, 50 µm or less, and is 2 µm to 4 µm in this embodiment. The thickness $L1d$ herein referred to is defined as a distance between the surface of the anode wire 12 and the surface 14a.

The solid electrolyte layer 15 is provided also on the anode wire 12, in addition to the pores, as well as the surfaces 11a, 11b, and 11c of the porous sintered body 11. The solid electrolyte layer 15 covers the entirety of the surface 11a.

As shown in an enlarged fragmentary view in FIG. 19, the solid electrolyte layer 15 includes a portion elevated from the insulating layer 14 in a radial direction of the anode wire 12. A maximum thickness $L1e$ of such an elevated portion of the solid electrolyte layer 15 is, for example, 10 µm to 100 µm. The maximum thickness $L1e$ herein referred to is defined as a distance in the radial direction between the surface of the anode wire 12 and a most elevated portion of the solid electrolyte layer 15.

Referring to FIGS. 20 to 23, a method of manufacturing the solid electrolytic capacitor A2 will be described. In this embodiment also, the steps S1 to S5 are performed as in the first embodiment.

Figure 20:
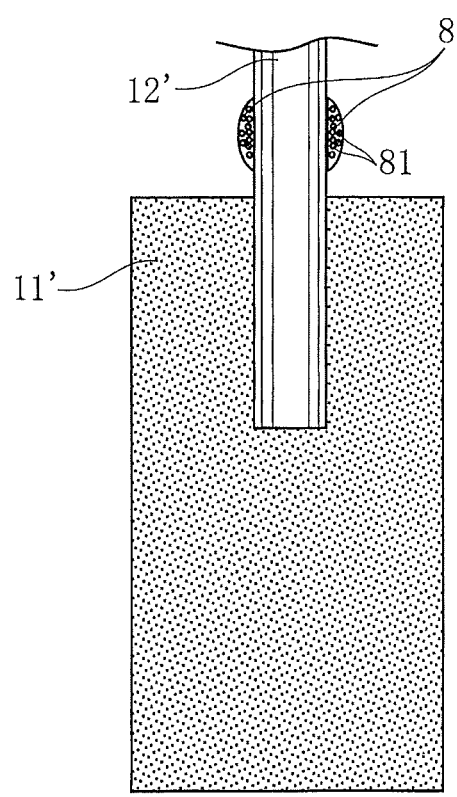
FIG. 20 is a cross-sectional view for explaining a manufacturing process of the solid electrolytic capacitor according to the second embodiment.

First, the step S1 is performed in which the porous sintered body 11' shown in FIG. 20 is formed.

Figure 21:
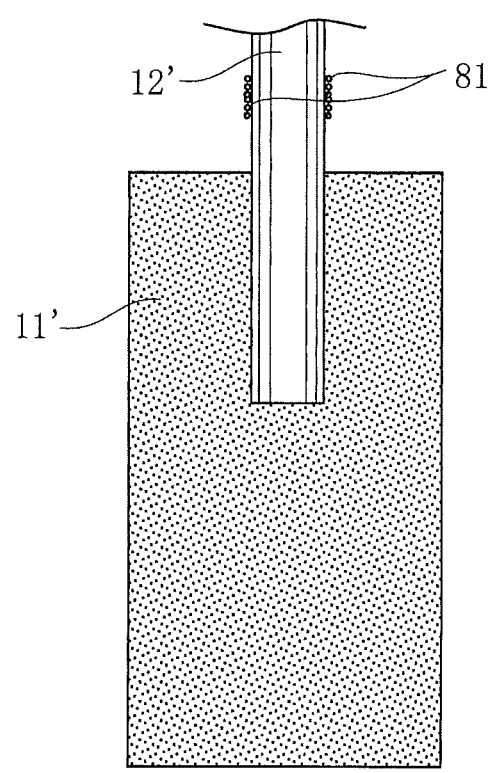
FIG. 21 is another cross-sectional view for explaining a manufacturing process of the solid electrolytic capacitor according to the second embodiment.
Figure 22:
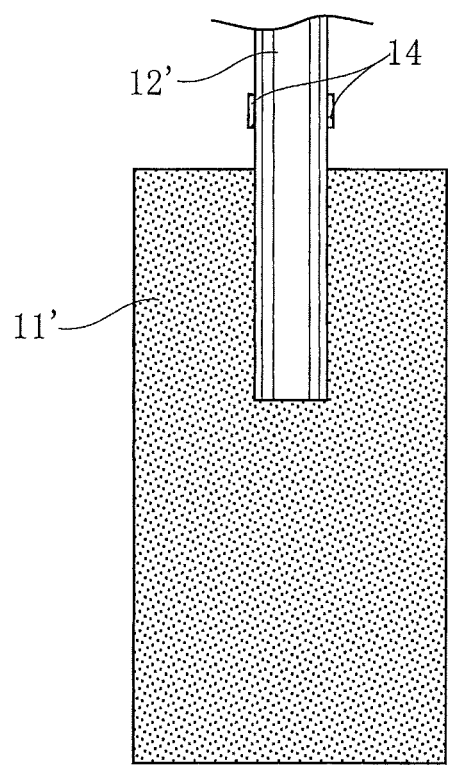
FIG. 22 is still another cross-sectional view for explaining a manufacturing process of the solid electrolytic capacitor according to the second embodiment.

Referring then to FIGS. 20 to 22, the step S2 is performed in which the insulating layer 14 (see FIG. 22) is formed. In this embodiment, the aqueous dispersion 8 is applied only to the anode wire 12' as shown in FIG. 20. As a result, the plurality of granular particles 81 is deposited only to the anode wire 12', and not to the porous sintered body 11', as shown in FIG. 21. The step S21 is thus performed for depositing the granular particles 81 to the anode wire 12'. Then the step S22 is performed in which the granular particles 81 are heated thus to be molten, as shown in FIG. 22. At this stage, the insulating layer 14 is formed.

The foregoing is followed by the step S3 in which the dielectric layer 13 is formed. The step S3 of forming the dielectric layer 13 includes, for example, oxidizing the anode with the porous sintered body 11' soaked in a phosphoric acid aqueous solution.

Figure 23:
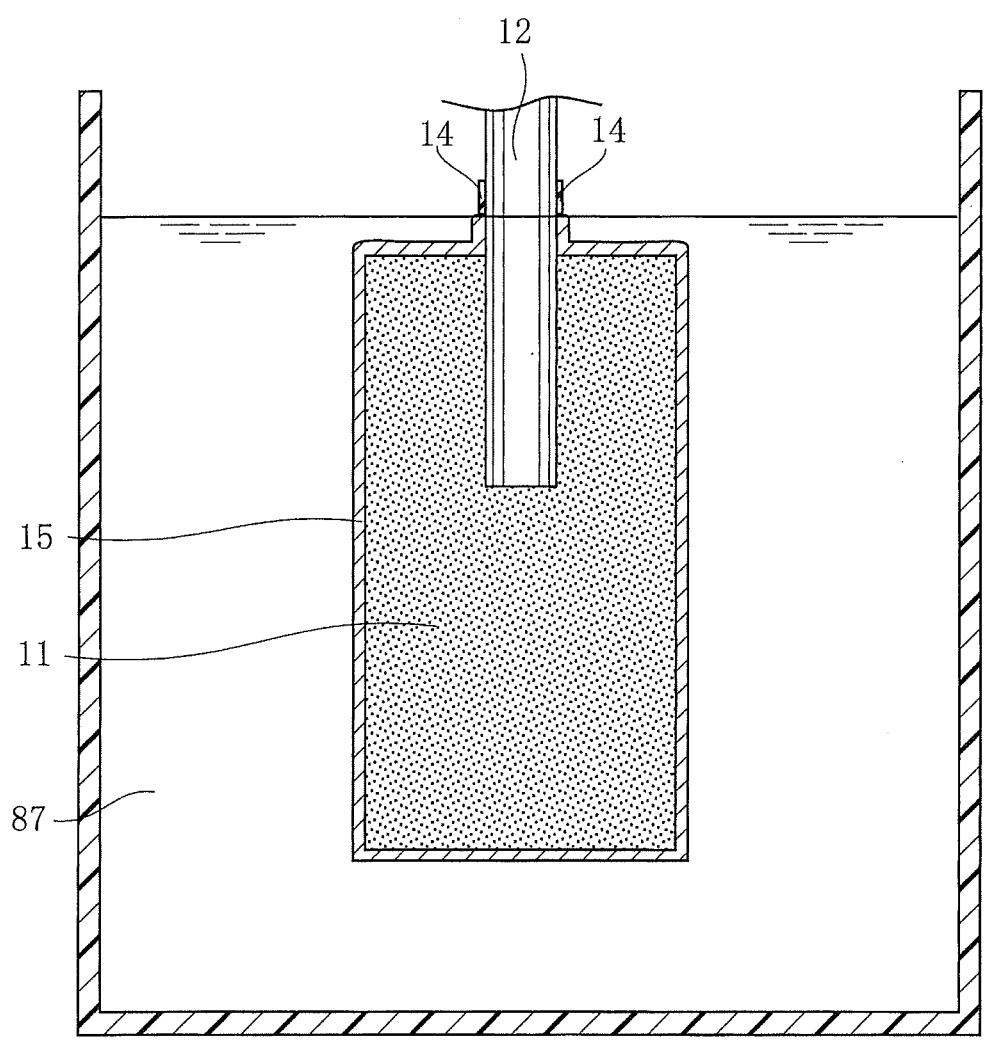
FIG. 23 is still another cross-sectional view for explaining a manufacturing process of the solid electrolytic capacitor according to the second embodiment.

Referring now to FIG. 23, the step S4 is performed in which the solid electrolyte layer 15 is formed. In the step S4, the porous sintered body 11 with the dielectric layer 13 formed thereon is soaked in the aqueous solution 87. It is preferable that the porous sintered body 11 is soaked in the aqueous solution 87 such that the surface of the aqueous solution 87 does not surpass the insulating layer 14.

Thereafter, the step S5 is performed in which the conductive layer 16 is formed. Further, upon forming the pillow electrode 4, the anode mounting terminal 51, the cathode mounting terminal 52, and the resin package 3, the solid electrolytic capacitor A2 shown in FIG. 19 can be obtained.

Advantages of this embodiment will now be described hereunder.

In the solid electrolytic capacitor A2, the insulating layer 14 is formed by melting the plurality of granular particles 81. Such a method assures that the insulating layer 14 achieves close contact with the anode wire 12. Accordingly, in the step S4 of forming the solid electrolyte layer 15, the aqueous solution 87 can be suppressed from spreading up through between the anode wire 12 and the insulating layer 14 due to capillary action.

In the solid electrolytic capacitor A2 according to this embodiment, the insulating layer 14 is formed by melting the granular particles 81, which eliminates the need to employ a washer for preventing the upward spreading of the aqueous solution 87. Therefore, the solid electrolytic capacitor A2 can avoid the drawback arising from employing the washer, described with reference to the first embodiment.

In this embodiment, the step S21 of depositing the granular particles 81 to the anode wire 12' is performed through applying the aqueous dispersion 8 to the anode wire 12'. The granular particles 81 are dispersed in the aqueous dispersion 8. Therefore, the method according to this embodiment is advantageous for depositing the granular particles 81 to the anode wire 12' in the dispersed state.

Figure 24:
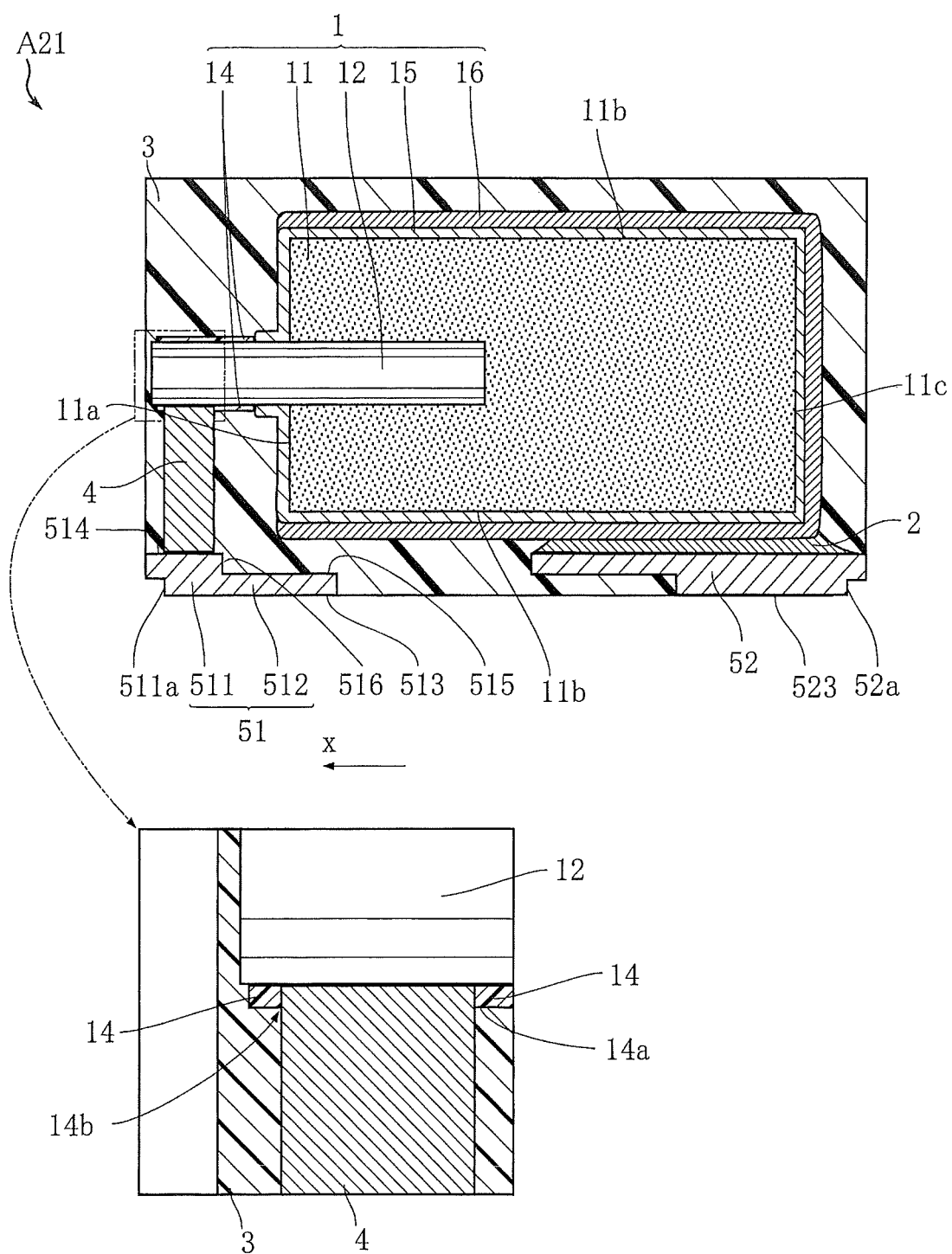
FIG. 24 is a cross-sectional view of a solid electrolytic capacitor according to a first variation of the second embodiment.

FIG. 24 is a cross-sectional view of a solid electrolytic capacitor according to a first variation of the second embodiment. The solid electrolytic capacitor A21 shown therein is different from the solid electrolytic capacitor A2 in the shape of the insulating layer 14.

In the solid electrolytic capacitor A21, the pillow electrode 4 is disposed in contact with the insulating layer 14. The insulating layer 14 includes an opening 14b. The pillow electrode 4 is connected to a portion of the anode wire 12 exposed through the opening 14b.

Figure 25:
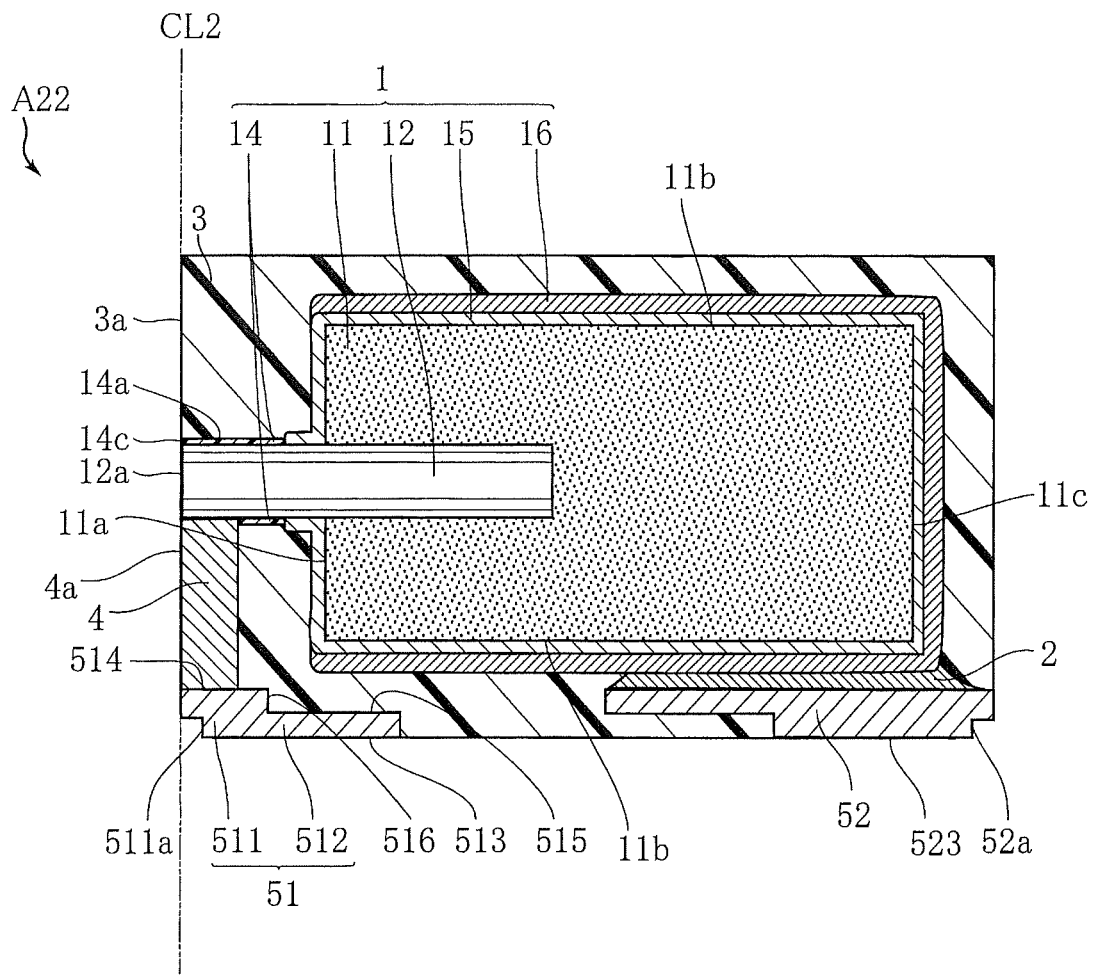
FIG. 25 is a cross-sectional view of a solid electrolytic capacitor according to a second variation of the second embodiment.

FIG. 25 is a cross-sectional view of a solid electrolytic capacitor according to a second variation of the second embodiment. The solid electrolytic capacitor A22 shown therein is different from the solid electrolytic capacitor A21 in that the anode wire 12, the insulating layer 14, and the pillow electrode 4 are exposed from the resin package 3. The facet 12a of the anode wire 12, a facet 14c of the insulating layer 14, the facet 4a of the pillow electrode 4, and the facet 3a of the resin package 3 are flush with each other. The solid electrolytic capacitor A22 thus configured can be obtained by cutting along a cutting line CL2.

The structure including the insulating layer according to the third variation of the first embodiment is also applicable to the solid electrolytic capacitors A2, A21, and A22.

Third Embodiment

Figure 26:
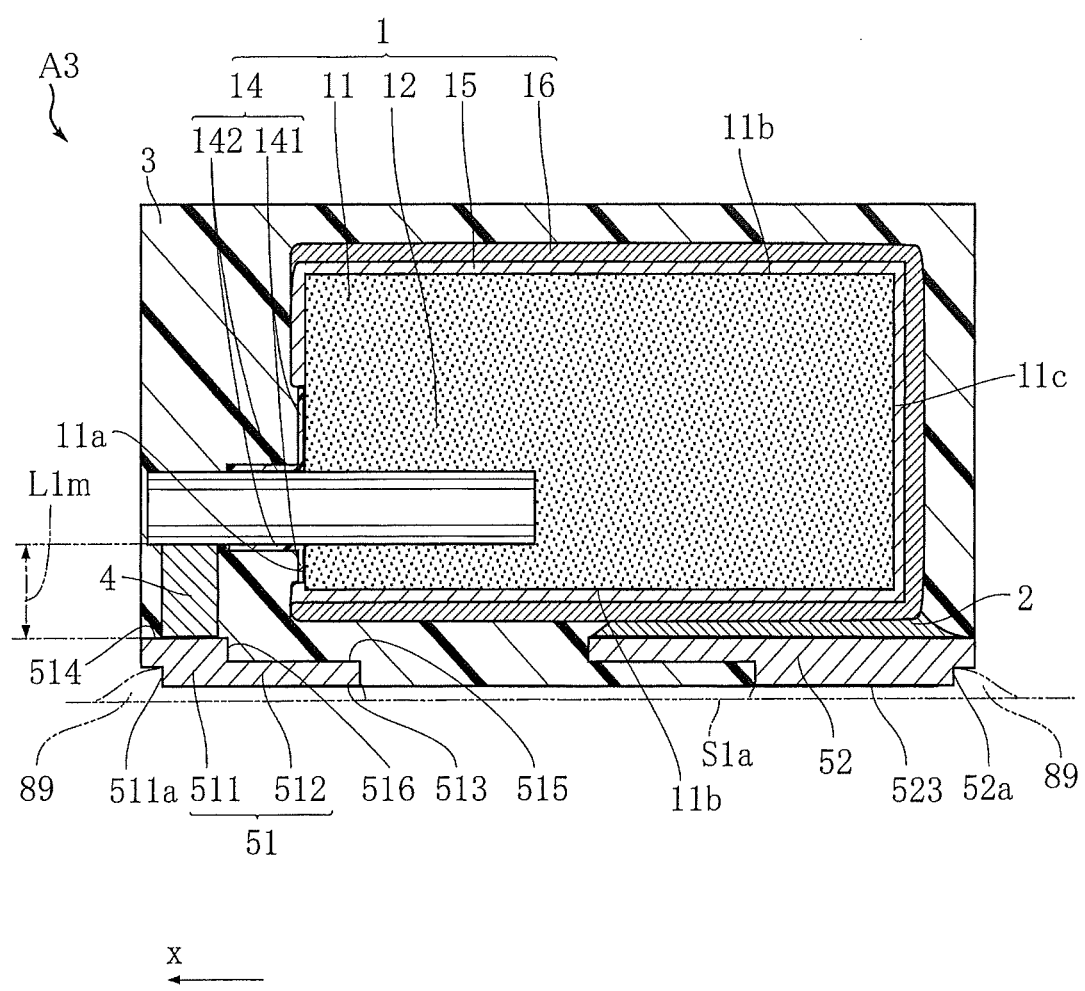
FIG. 26 is a cross-sectional view of a solid electrolytic capacitor according to a third embodiment of the present invention.

FIG. 26 is a cross-sectional view of a solid electrolytic capacitor according to a third embodiment of the present invention. The solid electrolytic capacitor A3 shown therein is different from the solid electrolytic capacitor A1 according to the first embodiment, in that the anode wire 12 is not located at a center of the surface 11a of the porous sintered body 11, but at a position deviated from the center of the surface 11a.

The solid electrolytic capacitor A3 can be manufactured through the same process as that for manufacturing the solid electrolytic capacitor A1.

Hereunder, advantages of this embodiment will be described.

In the solid electrolytic capacitor A3, the insulating layer 14 is formed by melting the plurality of granular particles 81. Such a method assures that the insulating layer 14 achieves close contact with the anode wire 12. Accordingly, in the step S4 of forming the solid electrolyte layer 15, the aqueous solution 87 can be suppressed from spreading up through between the anode wire 12 and the insulating layer 14 due to capillary action.

In the solid electrolytic capacitor A3 according to this embodiment, the insulating layer 14 is formed by melting the granular particles 81, which eliminates the need to employ a washer for preventing the upward spreading of the aqueous solution 87. Thus, the solid electrolytic capacitor A3 can avoid the drawback arising from employing the washer, as described with reference to the first embodiment.

The solid electrolytic capacitor A3 is advantageous for increasing the capacitance and reducing the size thereof, for the same reason mentioned with reference to the solid electrolytic capacitor A1.

Further, the solid electrolytic capacitor A3 allows a size L1m of the pillow electrode 4 in a vertical direction in FIG. 26 to be made smaller. Reducing the size L1m makes it difficult for the pillow electrode 4 to be deformed in the bonding process to the anode wire 12. Such a configuration of the solid electrolytic capacitor A3 suppresses such a drawback that deformation of the pillow electrode 4 disables the pillow electrode 4 and the anode mounting terminal 51 to be properly connected.

The solid electrolytic capacitor A3 does not include a washer, which is a solid material. The insulating layer 14 in the solid electrolytic capacitor A3 is formed utilizing the aqueous dispersion 8 which is a liquid. Accordingly, even in the case where the anode wire 12 is located at a position deviated from the center of the surface 11a, there is no need to modify a component such as the washer for forming the insulating layer 14. Consequently, the design of the solid electrolytic capacitor A3 can be modified without incurring an increase in manufacturing cost.

Here, the structure in which the anode wire 12 is located at a position deviated from the center of the surface 11a according to this embodiment is also applicable to the solid electrolytic capacitors A11, A12, A13, A2, A21, and A22.

Fourth Embodiment

Figure 27:
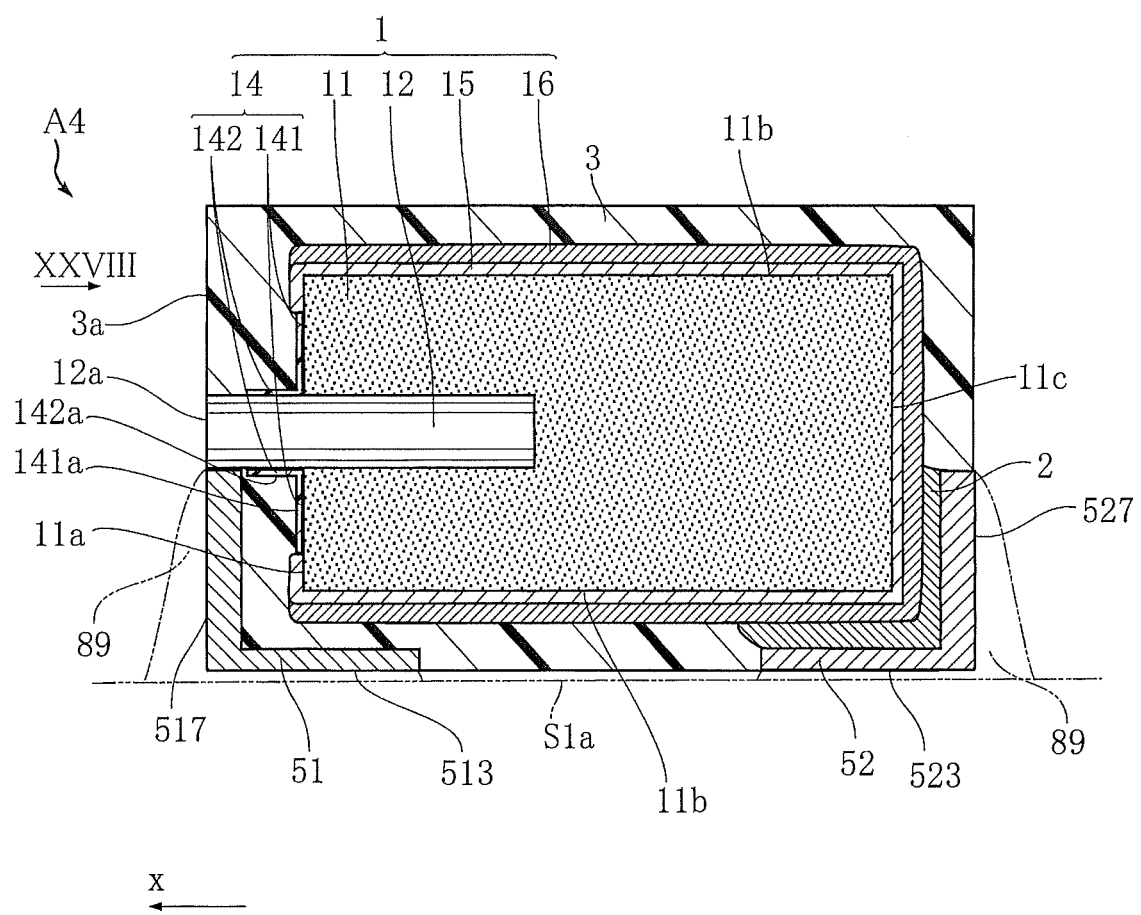
FIG. 27 is a cross-sectional view of a solid electrolytic capacitor according to a fourth embodiment of the present invention.
Figure 28:
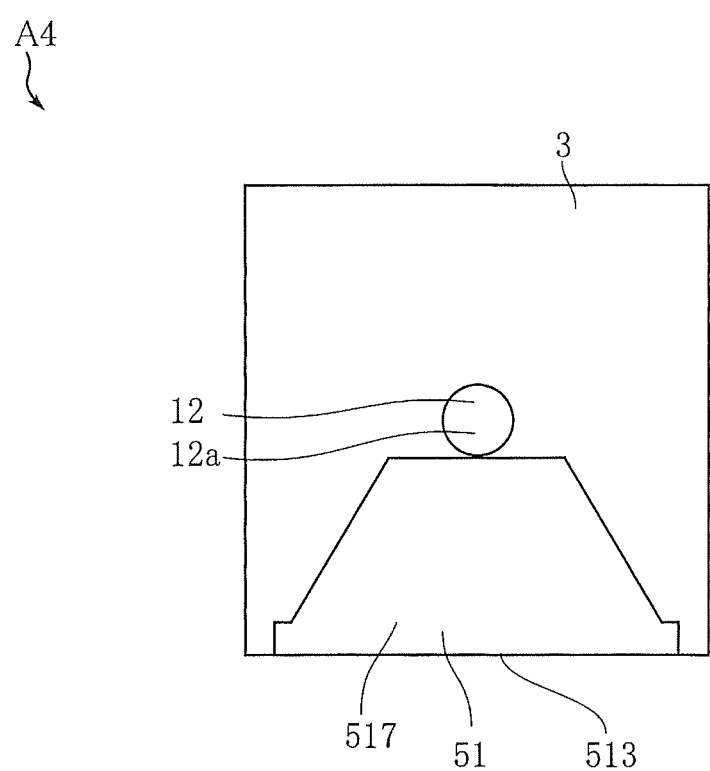
FIG. 28 shows the solid electrolytic capacitor of FIG. 27, viewed in a direction indicated by an arrow XXVIII in FIG. 27.
Figure 29:
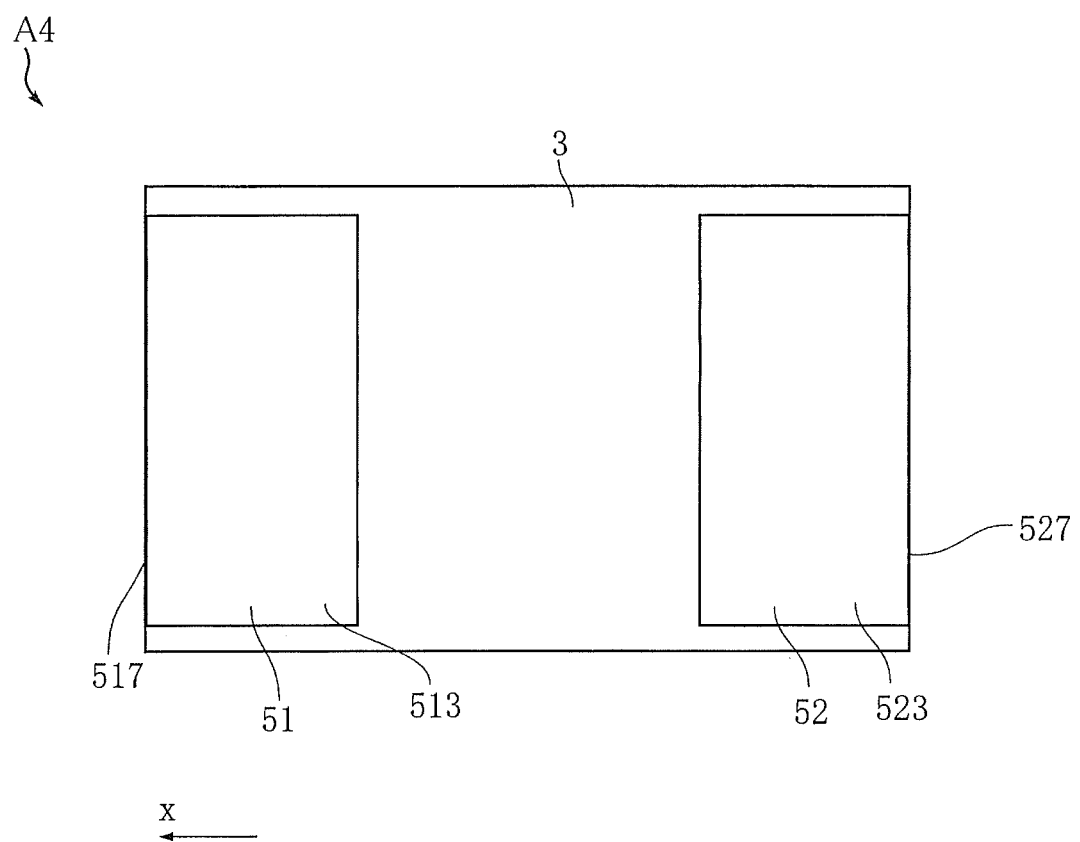
FIG. 29 is a bottom view of the solid electrolytic capacitor shown in FIG. 27.

Referring to FIGS. 27 to 29, a fourth embodiment of the present invention will be described hereunder. FIG. 27 is a cross-sectional view of a solid electrolytic capacitor according to this embodiment. FIG. 28 shows the solid electrolytic capacitor of FIG. 27, viewed in a direction indicated by an arrow XXVIII in FIG. 27. FIG. 29 is a bottom view of the solid electrolytic capacitor shown in FIG. 27.

The solid electrolytic capacitor A4 shown in these drawings is different from the solid electrolytic capacitor A1 essentially in not including the pillow electrode 4, and in that the anode mounting terminal 51 and the cathode mounting terminal 52 each have an L-shaped cross-section.

The anode wire 12 is exposed from the resin package 3. The anode wire 12 includes the facet 12a exposed from the resin package 3.

The anode mounting terminal 51 includes the mounting surface 513 and a facet 517. The mounting surface 513 and the facet 517 are both exposed from the resin package 3. The mounting surface 513 and the facet 517 are of a rectangular shape. As shown in FIG. 28, the facet 517 according to this embodiment is of a trapezoidal shape. The facet 517 is flush with the facet 12a of the anode wire 12. The anode mounting terminal 51 is formed by bending a single piece of plate-shaped member having a plated surface. Accordingly, the mounting surface 513 and the facet 517 are both plated. Such a structure allows the solder 89 to be stuck to both the mounting surface 513 and the facet 517 for bonding to the circuit substrate S1a, in the process of mounting thereon the solid electrolytic capacitor A4. Therefore, the solder fillet that provides high visibility can be obtained.

The cathode mounting terminal 52 includes the mounting surface 523 and a facet 527. The mounting surface 523 and the facet 527 are exposed from the resin package 3. The mounting surface 523 and the facet 527 are of a rectangular shape. The cathode mounting terminal 52 is formed, as the anode mounting terminal 51, by bending a single piece of plate-shaped member having a plated surface. Accordingly, the mounting surface 523 and the facet 527 are both plated, for example with copper. Such a structure allows the solder 89 to be stuck to both the mounting surface 523 and the facet 527 for bonding to the circuit substrate S1a, in the process of mounting thereon the solid electrolytic capacitor A4. Therefore, the solder fillet that provides high visibility can be obtained.

Hereunder, advantages of this embodiment will be described.

In the solid electrolytic capacitor A4, the insulating layer 14 is formed by melting the plurality of granular particles 81. Such a method assures that the insulating layer 14 achieves close contact with the anode wire 12. Accordingly, in the step S4 of forming the solid electrolyte layer 15, the aqueous solution 87 can be suppressed from spreading up through between the anode wire 12 and the insulating layer 14 due to capillary action.

In the solid electrolytic capacitor A4 according to this embodiment, the insulating layer 14 is formed by melting the granular particles 81, which eliminates the need to employ a washer for preventing the upward spreading of the aqueous solution 87. Thus, the solid electrolytic capacitor A4 can avoid the drawback arising from employing the washer, as described with reference to the first embodiment.

The solid electrolytic capacitor A4 is advantageous for increasing the capacitance and reducing the size thereof, for the same reason mentioned with reference to the solid electrolytic capacitor A1.

Figure 30:
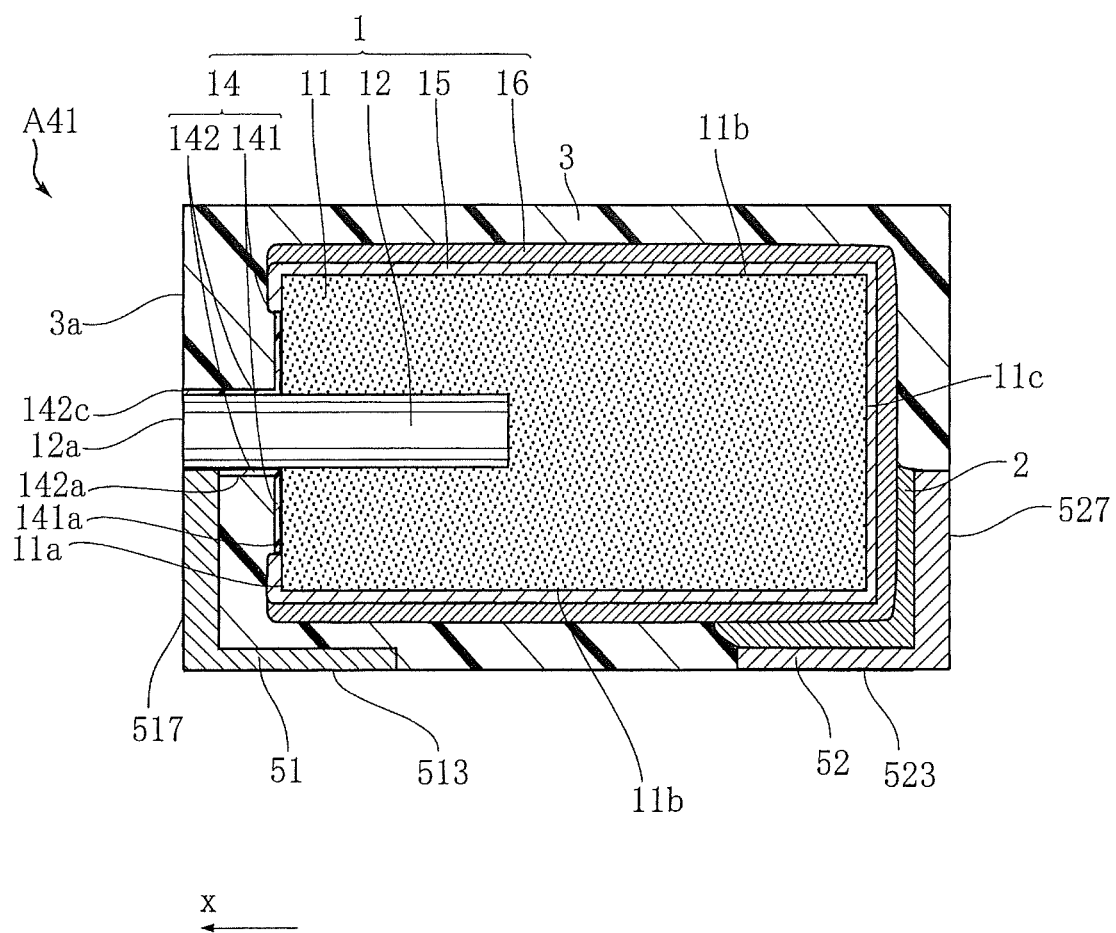
FIG. 30 is a cross-sectional view of a solid electrolytic capacitor according to a first variation of the fourth embodiment.
Figure 31:
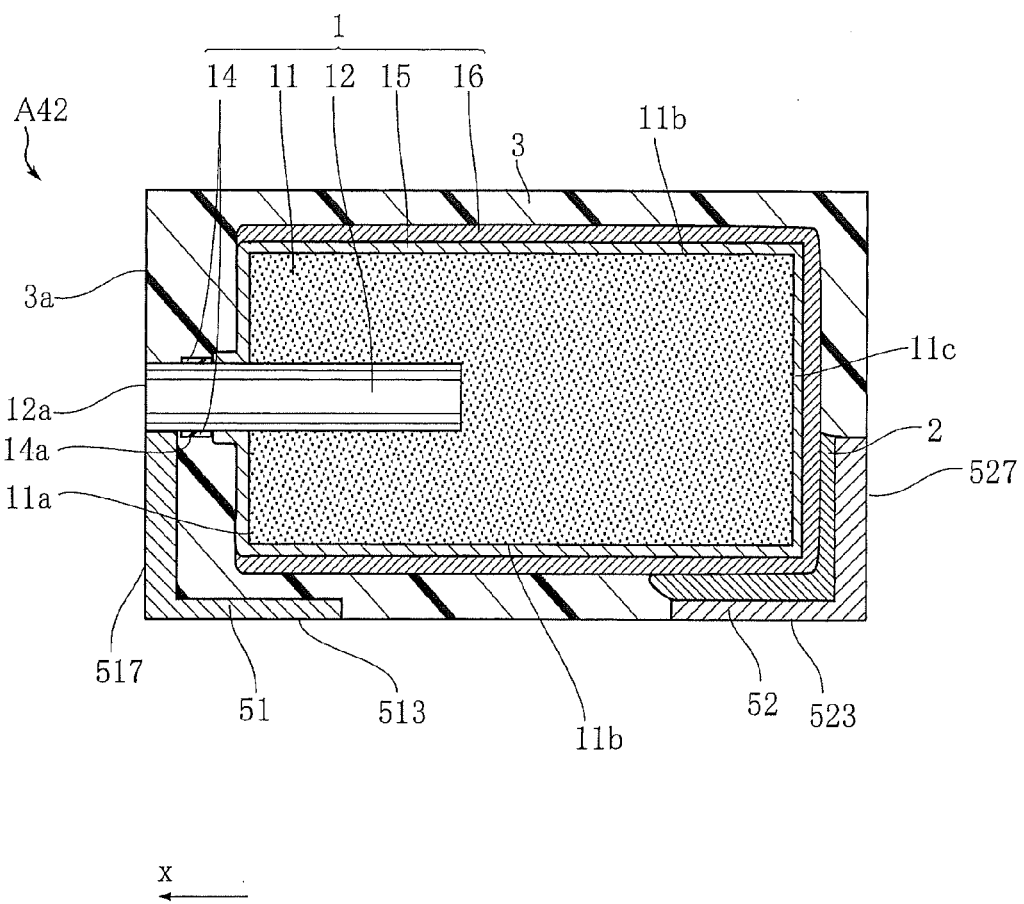
FIG. 31 is a cross-sectional view of a solid electrolytic capacitor according to a second variation of the fourth embodiment.
Figure 32:
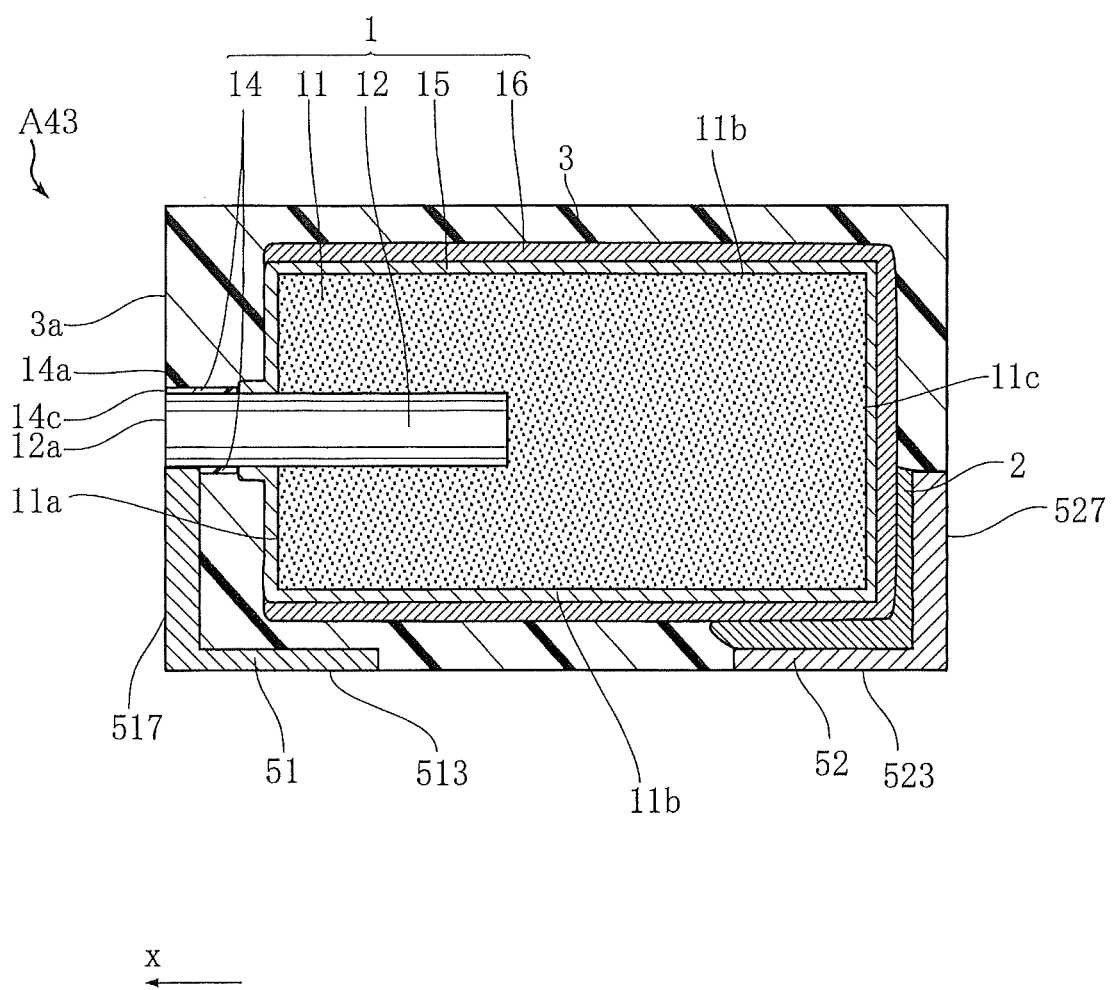
FIG. 32 is a cross-sectional view of a solid electrolytic capacitor according to a third variation of the fourth embodiment.

FIGS. 30 to 32 are cross-sectional views respectively showing variations of the fourth embodiment of the present invention. The solid electrolytic capacitors A41, A42, and A43 shown in these drawings correspond to the foregoing solid electrolytic capacitors A12, A2, and A22, respectively. The solid electrolytic capacitors A41, A42, and A43 are generally the same as the solid electrolytic capacitors A12, A2, and A22 except that the anode mounting terminal 51, not the pillow electrode 4, is connected to the anode wire 12. Accordingly, description of these variations of this embodiment will be omitted.

Fifth Embodiment

Figure 33:
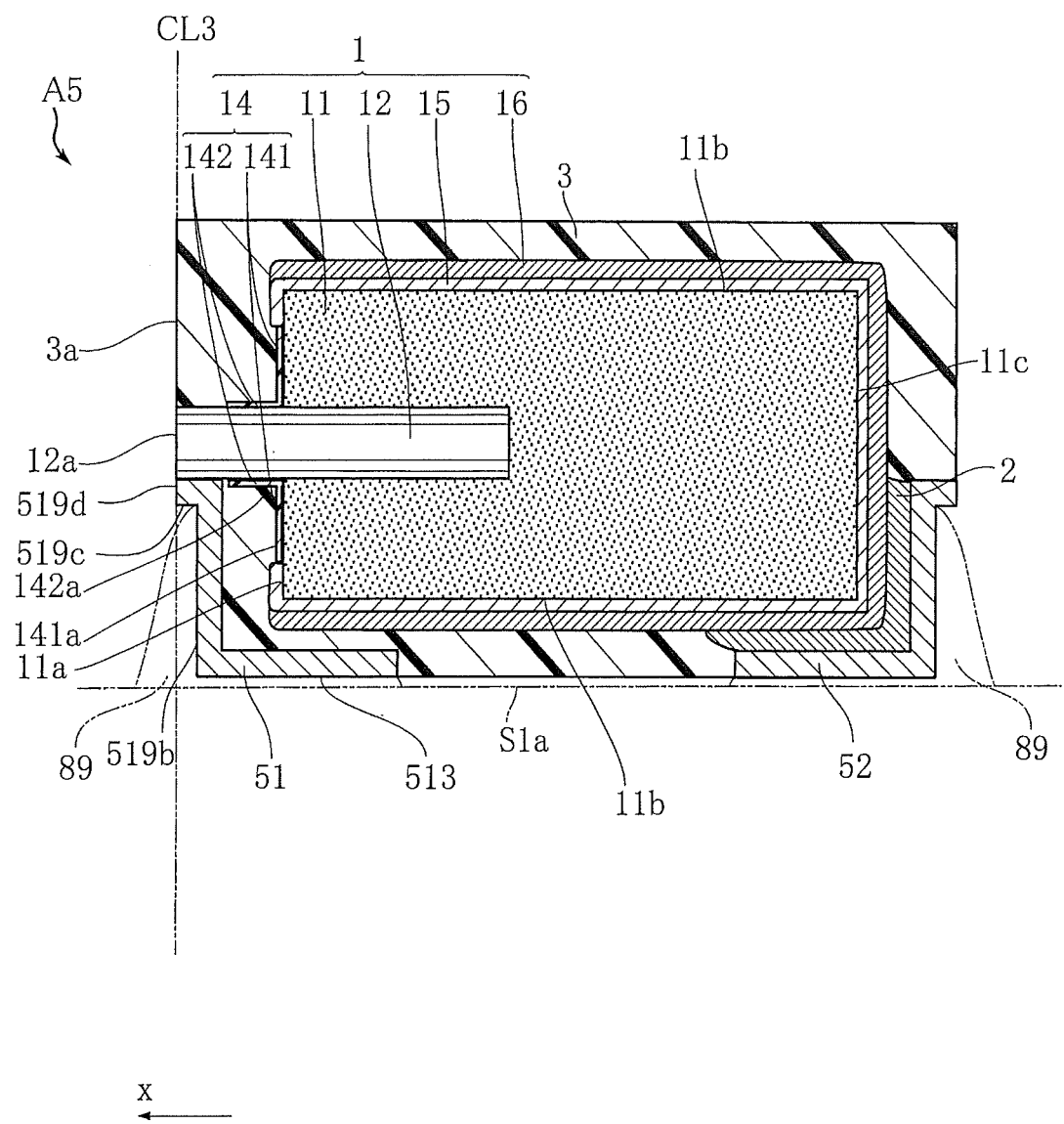
FIG. 33 is a cross-sectional view of a solid electrolytic capacitor according to a fifth embodiment of the present invention.

FIG. 33 is a cross-sectional view of a solid electrolytic capacitor according to a fifth embodiment of the present invention. The solid electrolytic capacitor A5 shown therein is different from the solid electrolytic capacitor A4 in the shape of the anode mounting terminal 51 and the cathode mounting terminal 52.

In this embodiment also, the anode mounting terminal 51 is connected to the anode wire 12. The anode mounting terminal 51 includes the mounting surface 513, exposed surfaces 519b, 519c, and a facet 519d. The mounting surface 513 extends in the x-direction. The exposed surface 519b extends from the mounting surface 513, and oriented in the x-direction. The exposed surface 519c extends from the exposed surface 519b in the x-direction. The facet 519d extends from the exposed surface 519c, and is flush with the facet 12a of the anode wire 12. The cathode mounting terminal 52 has the same shape as the anode mounting terminal 51.

The solid electrolytic capacitor A5 thus configured can be obtained by cutting along a cutting line CL3. Also, the anode mounting terminal 51 is formed by bending a single piece of plate-shaped member having a plated surface. Accordingly, the mounting surface 513 and the exposed surface 519b, 519c are plated, for example with copper. Such a structure allows the solder 89 to be stuck to the exposed surface 519b, 519c in addition to the mounting surface 513, for bonding to the circuit substrate S1a, in the process of mounting thereon the solid electrolytic capacitor A5. Therefore, the solder fillet that provides high visibility can be formed on the anode mounting terminal 51. For the same reason, such highly visible solder fillet can also be formed on the cathode mounting terminal 52.

Hereunder, advantages of this embodiment will be described.

In the solid electrolytic capacitor A5, the insulating layer 14 is formed by melting the plurality of granular particles 81. Such a method assures that the insulating layer 14 achieves close contact with the anode wire 12. Accordingly, in the step S4 of forming the solid electrolyte layer 15, the aqueous solution 87 can be suppressed from speading up through between the anode wire 12 and the insulating layer 14 due to capillary action.

In the solid electrolytic capacitor A5 according to this embodiment, the insulating layer 14 is formed by melting the granular particles 81, which eliminates the need to employ a washer for preventing the upward spreading of the aqueous solution 87. Thus, the solid electrolytic capacitor A5 can avoid the drawback arising from employing the washer, as described with reference to the first embodiment.

The solid electrolytic capacitor A5 is advantageous for increasing the capacitance and reducing the size thereof, for the same reason mentioned with reference to the solid electrolytic capacitor A1.

Figure 34:
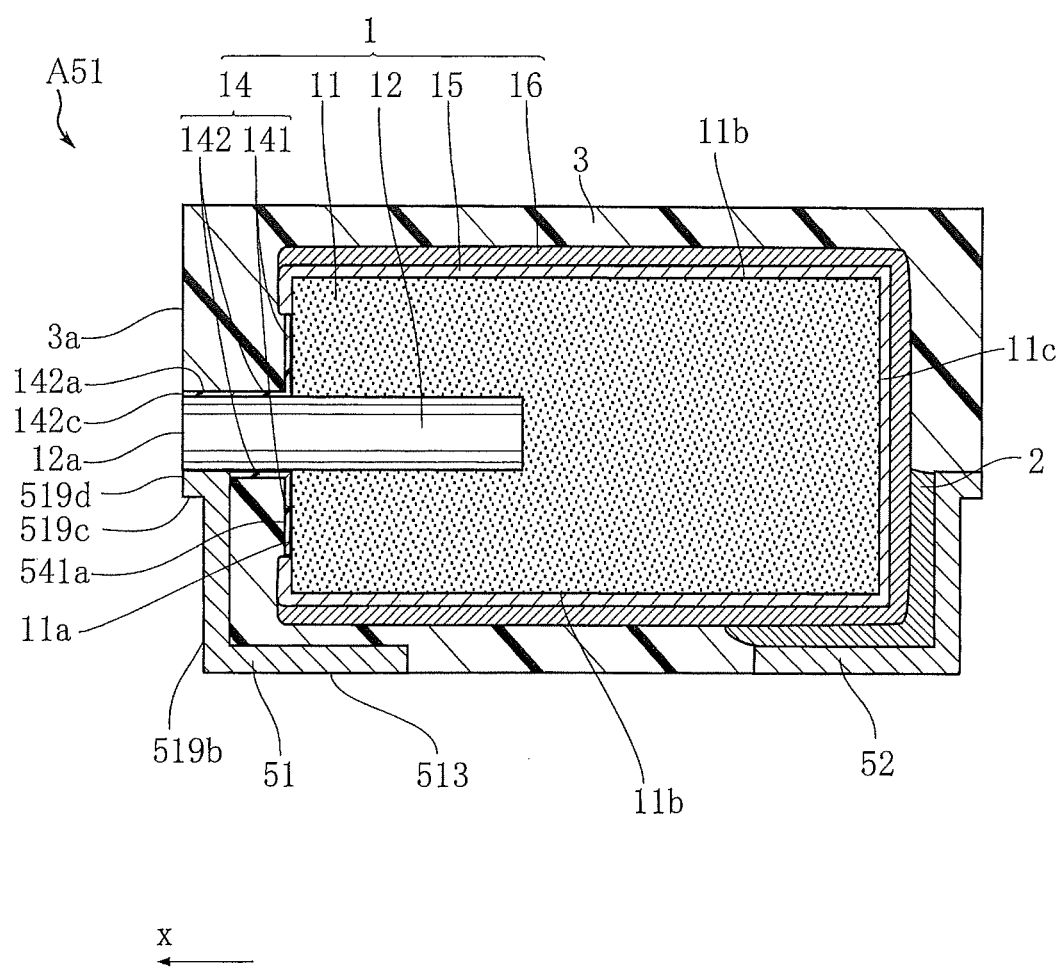
FIG. 34 is a cross-sectional view of a solid electrolytic capacitor according to a first variation of the fifth embodiment.
Figure 35:
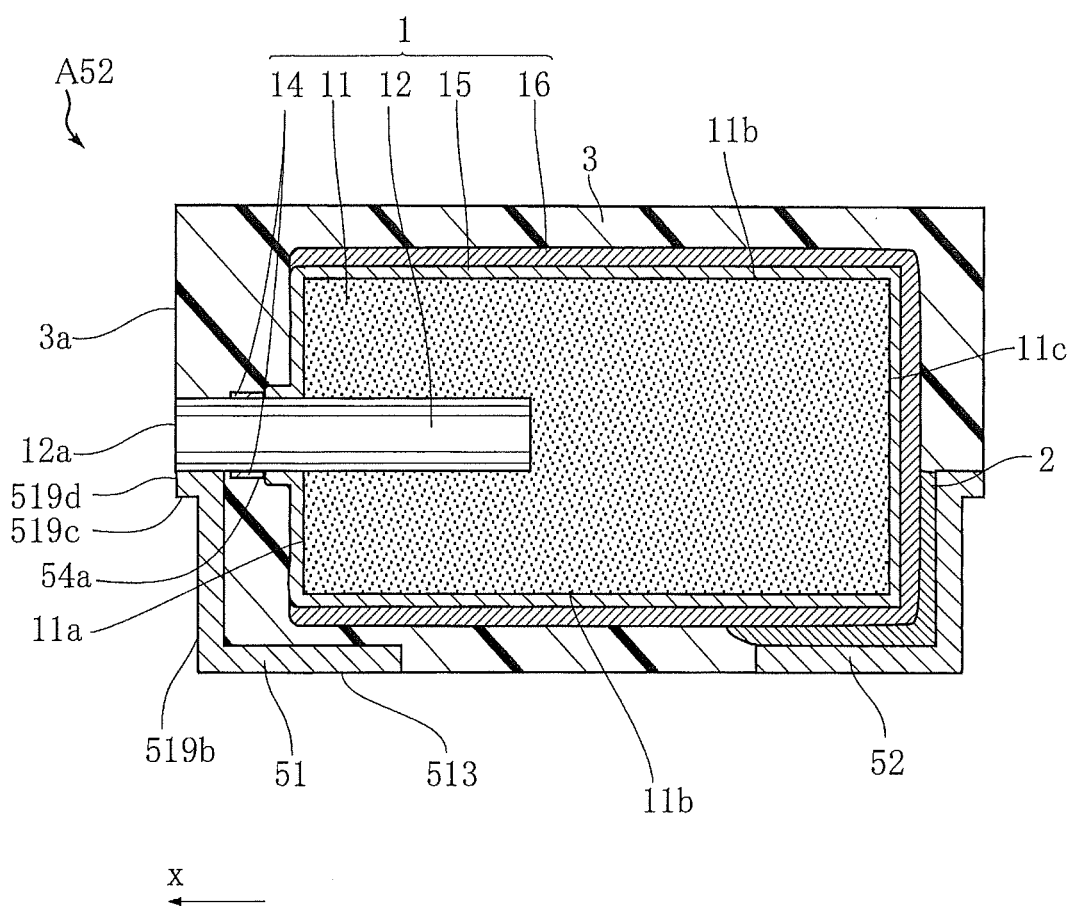
FIG. 35 is a cross-sectional view of a solid electrolytic capacitor according to a second variation of the fifth embodiment.
Figure 36:
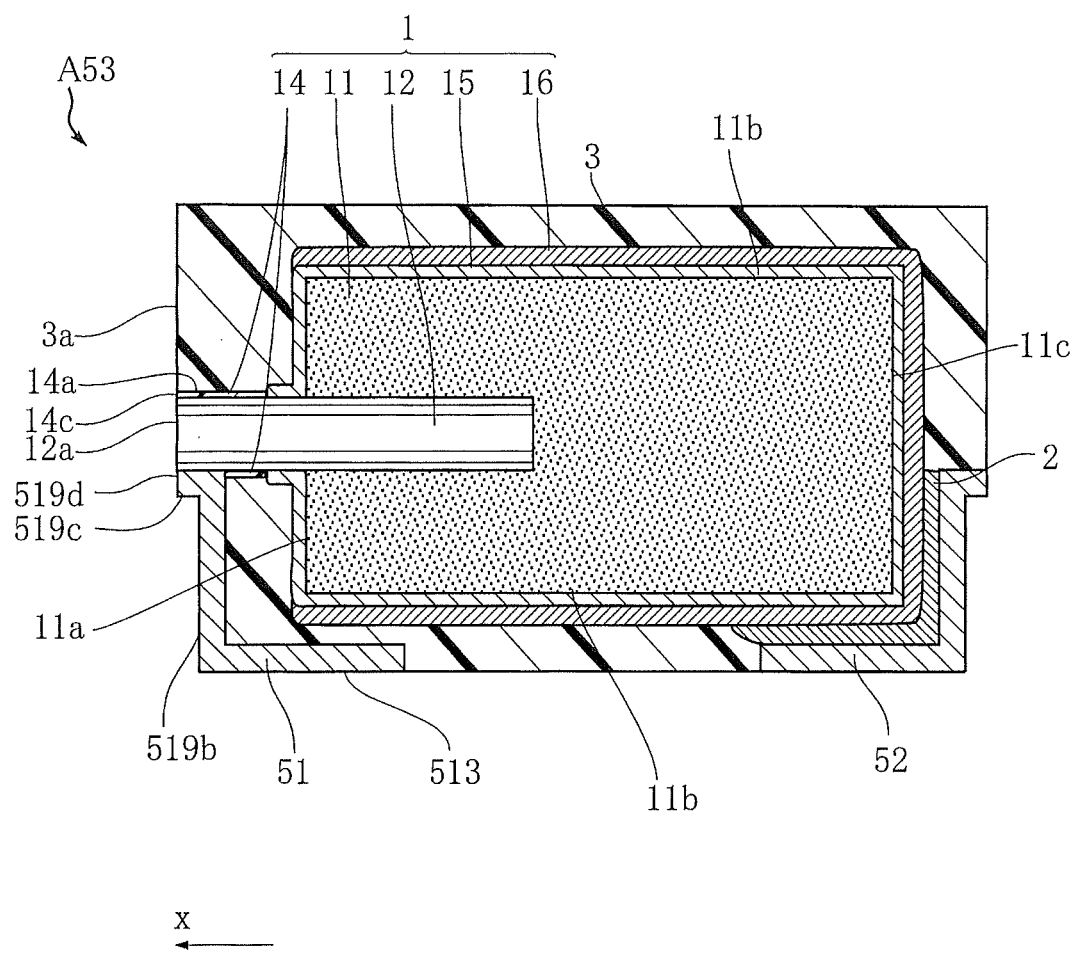
FIG. 36 is a cross-sectional view of a solid electrolytic capacitor according to a third variation of the fifth embodiment.

FIGS. 34 to 36 are cross-sectional views respectively showing variations of the fifth embodiment of the present invention. The solid electrolytic capacitors A51, A52, and A53 shown in these drawings correspond to the foregoing solid electrolytic capacitors A12, A2, and A22, respectively. The solid electrolytic capacitors A51, A52, and A53 are generally the same as the solid electrolytic capacitors A12, A2, and A22 except that the anode mounting terminal 51, not the pillow electrode 4, is connected to the anode wire 12. Accordingly, description of these variations of this embodiment will be omitted.

Sixth Embodiment

Figure 37:
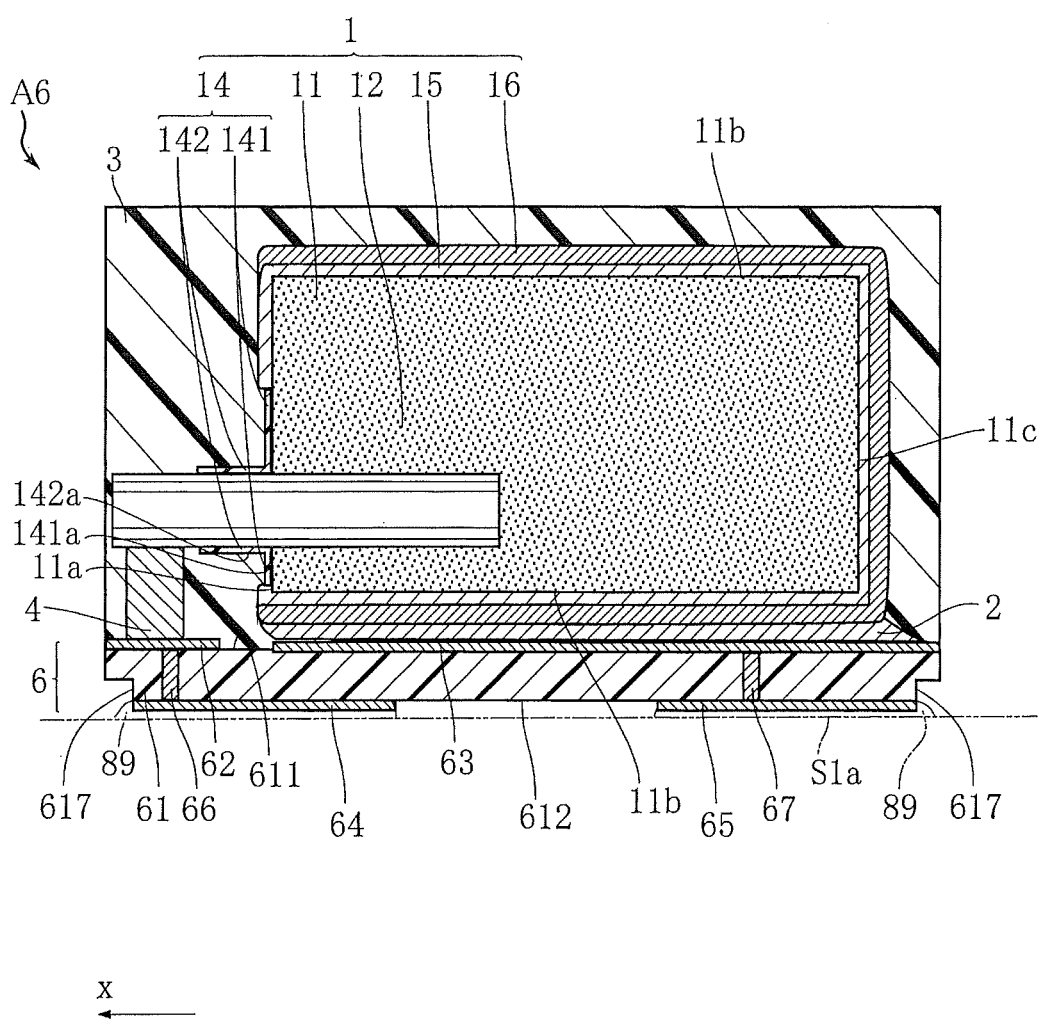
FIG. 37 is a cross-sectional view of a solid electrolytic capacitor according to a sixth embodiment of the present invention.

FIG. 37 is a cross-sectional view of a solid electrolytic capacitor according to a sixth embodiment of the present invention.

The solid electrolytic capacitor A6 shown therein is different from the solid electrolytic capacitor A1 according to the first embodiment essentially in not including the anode mounting terminal 51 and the cathode mounting terminal 52, and in including a printed circuit board 6. Here, the anode wire 12 of the solid electrolytic capacitor A6 is not located at the center of the surface 11a of the porous sintered body 11, but at a position deviated from the center thereof.

The printed circuit board 6 includes a base member 61, a surface anode layer 62, a surface cathode layer 63, a mounting anode layer 64, a mounting cathode layer 65, and through hole electrodes 66, 67.

The base member 61 is made of, for example, a glass epoxy resin. The base member 61 includes a first surface 611 oriented to the anode wire 12, and a second surface 612 on the opposite side of the first surface 611. The base member 61 includes a stepped portion 617. The stepped portion 617 is recessed from the second surface 612 toward the first surface 611, at a front end portion of the second surface 612 in the x-direction.

A material that constitutes the surface anode layer 62, the surface cathode layer 63, the mounting anode layer 64, and the mounting cathode layer 65 may be selected from conductive materials such as Cu, Au, Ag, Al, and Ni.

The surface anode layer 62 and the surface cathode layer 63 are both provided on the first surface 611. In this embodiment, the surface anode layer 62 supports the pillow electrode 4. Accordingly, the surface anode layer 62 is electrically connected to the anode wire 12 through the pillow electrode 4.

The surface cathode layer 63 is bonded to the conductive layer 16 by means of the conductive adhesion layer 2. Accordingly, the surface cathode layer 63 is electrically connected to the conductive layer 16 and the solid electrolyte layer 15 through the conductive adhesion layer 2. The surface cathode layer 63 is provided over a majority of the first surface 611. Such a configuration is advantageous for improving ESR.

The mounting anode layer 64 and the mounting cathode layer 65 are provided on the second surface 612. The mounting anode layer 64 is electrically connected to the surface anode layer 62 through the through hole electrode 66 formed in the base member 61. Accordingly, the mounting anode layer 64 is electrically connected to the anode wire 12. The mounting cathode layer 65 is electrically connected to the surface cathode layer 63 through hole electrode 67 formed in the base member 61. Accordingly, the mounting cathode layer 65 is electrically connected to the conductive layer 16 and the solid electrolyte layer 15. Upon bonding the mounting anode layer 64 and the mounting cathode layer 65 to the circuit substrate S1a by means of the solder 89, the solid electrolytic capacitor A6 is mounted on the circuit substrate S1a.

Hereunder, advantages of this embodiment will be described.

In the solid electrolytic capacitor A6, the insulating layer 14 is formed by melting the plurality of granular particles 81. Such a method assures that the insulating layer 14 achieves close contact with the anode wire 12. Accordingly, in the step S4 of forming the solid electrolyte layer 15, the aqueous solution 87 can be suppressed from speading up through between the anode wire 12 and the insulating layer 14 due to capillary action.

In the solid electrolytic capacitor A6 according to this embodiment, the insulating layer 14 is formed by melting the granular particles 81, which eliminates the need to employ a washer for preventing the upward spreading of the aqueous solution 87. Thus, the solid electrolytic capacitor A6 can avoid the drawback arising from employing the washer, as described with reference to the first embodiment.

As shown in FIG. 37, in the process of mounting the solid electrolytic capacitor A6 on the circuit substrate S1a, the solder 89 is not stuck to the base member 61, but only to the mounting anode layer 64 and the mounting cathode layer 65. Also, the base member 61 includes the stepped portion 617. Accordingly, a solder fillet can be formed in a region overlapping the base member 61 and the resin package 3 in the x-direction, in the solid electrolytic capacitor A6. Such a configuration contributes to improving adhesion of the solid electrolytic capacitor A6 to the circuit substrate S1a. Further, the solid electrolytic capacitor A6 is advantageous for increasing the capacitance and reducing the size thereof, for the same reason mentioned with reference to the solid electrolytic capacitor A1. Therefore, the solid electrolytic capacitor A6 contributes to reducing the size of an electronic device in which it is incorporated.

The configuration of the solid electrolytic capacitor A6 is also applicable to the foregoing solid electrolytic capacitors A11, A12, A2, A21, and A22.

Seventh Embodiment

Figure 38:
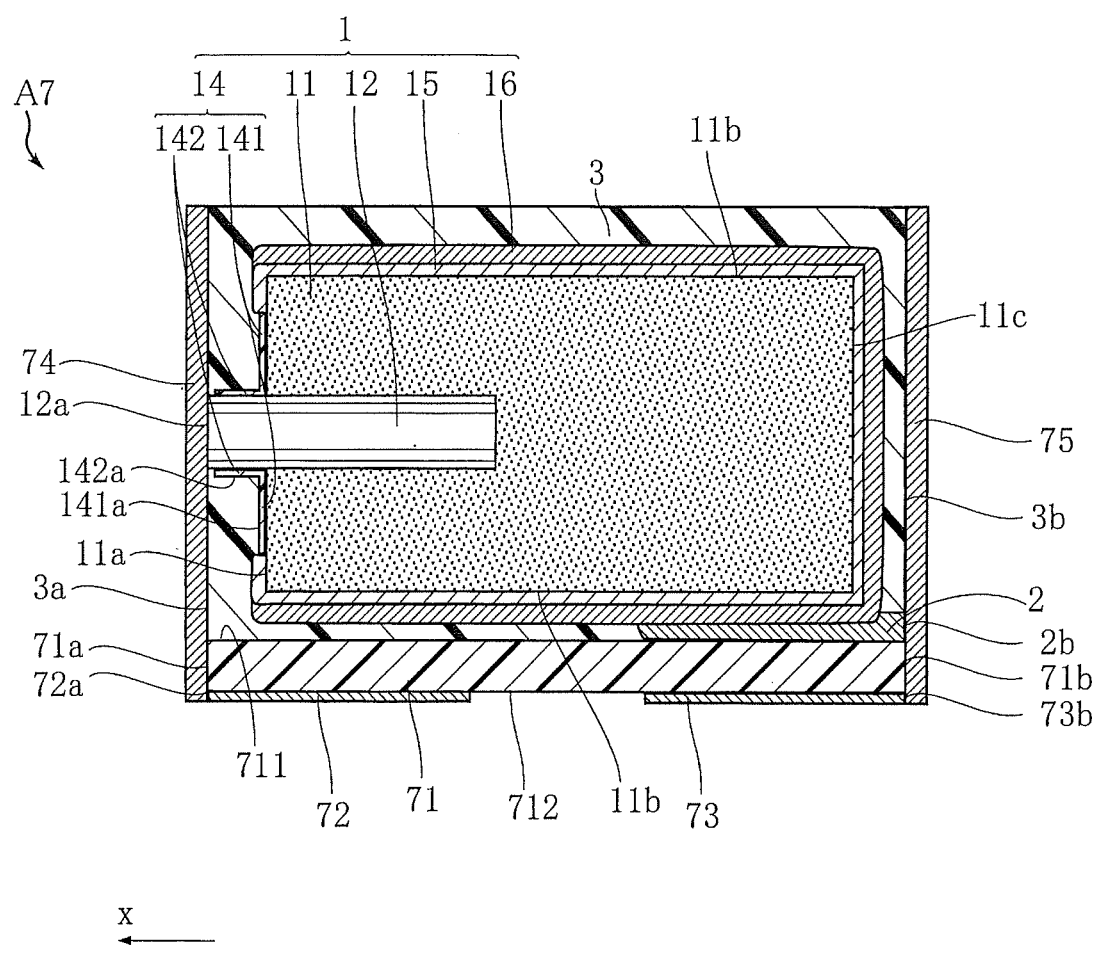
FIG. 38 is a cross-sectional view of a solid electrolytic capacitor according to a seventh embodiment of the present invention.
Figure 39:
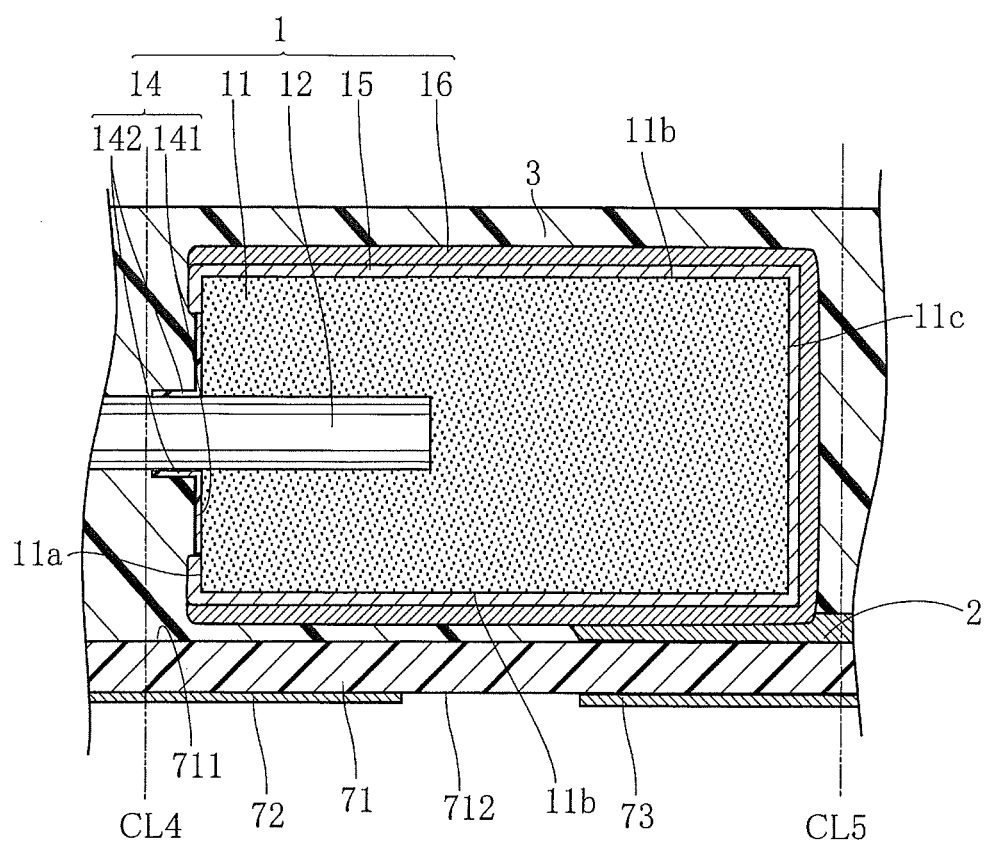
FIG. 39 is another cross-sectional view for explaining a manufacturing process of the solid electrolytic capacitor according to the seventh embodiment.

Referring to FIGS. 38 and 39, a seventh embodiment of the present invention will be described. FIG. 38 is a cross-sectional view of a solid electrolytic capacitor according to this embodiment.

The solid electrolytic capacitor A7 shown therein includes the capacitor element 1, the conductive adhesion layer 2, the resin package 3, a base member 71, a mounting anode layer 72, a mounting cathode layer 73, a lateral anode layer 74, and a lateral cathode layer 75. The structure of the capacitor element 1 and the conductive adhesion layer 2 of the solid electrolytic capacitor A7 is generally the same as that of the solid electrolytic capacitor A1, and hence the description thereof will not be repeated.

The base member 71 is made of, for example, a glass epoxy resin. The base member 71 has a thickness of, for example, 50 μm. The base member 71 does not include a through hole electrode. The base member 71 includes a first surface 711 oriented to the anode wire 12, and a second surface 712 on the opposite side of the first surface 711. The first surface 711 is bonded to the conductive layer 16 by means of the conductive adhesion layer 2.

The mounting anode layer 72 and the mounting cathode layer 73 are both provided on the second surface 712. A material that constitutes the mounting anode layer 72 and the mounting cathode layer 73 may be selected from conductive materials such as Cu, Au, Ag, Al, and Ni.

The facet 12a of the anode wire 12, the facet 3a of the resin package 3, a facet 71a of the base member 71, and a facet 72a of the mounting anode layer 72 are flush with each other. Likewise, a facet 3b of the resin package 3, a facet 2b of the conductive adhesion layer 2, a facet 71b of the base member 71, and a facet 73b of the mounting cathode layer 73 are flush with each other.

The lateral anode layer 74 covers the facets 12a, 3a, 71a, and 72a. The lateral anode layer 74 is disposed in contact with both of the anode wire 12 and the mounting anode layer 72. Accordingly, the mounting anode layer 72 is electrically connected to the anode wire 12 though the lateral anode layer 74.

The lateral cathode layer 75 covers the facets 3b, 2b, 71b, and 73b. The lateral cathode layer 75 is disposed in contact with both of the conductive adhesion layer 2 and the mounting cathode layer 73. Accordingly, the mounting cathode layer 73 is electrically connected to the conductive layer 16 and the solid electrolyte layer 15, though the lateral cathode layer 75 and the conductive adhesion layer 2.

Referring now to FIG. 39, a method of manufacturing the solid electrolytic capacitor A7 will be briefly described.

First, the capacitor element 1 shown therein is formed by a method similar to that employed in the first embodiment. Then the capacitor element 1 is bonded to the base member 71 on which the mounting anode layer 72 and the mounting cathode layer 73 are provided, be means of the conductive adhesion layer 2. The capacitor element 1 is then covered with the resin package 3. At this stage, an intermediate product shown in FIG. 39 can be obtained. Thereafter, upon cutting the intermediate product along cutting lines CL4 and CL5, the facets 12a, 3a, 71a, and 72a, as well as the facets 3b, 2b, 71b, and 73b shown in FIG. 38, are formed. Then the lateral anode layer 74 and the lateral cathode layer 75 are formed by plating. Thus, the solid electrolytic capacitor A7 shown in FIG. 38 can be obtained.

Hereunder, advantages of this embodiment will be described.

In the solid electrolytic capacitor A7, the insulating layer 14 is formed by melting the plurality of granular particles 81. Such a method assures that the insulating layer 14 achieves close contact with the anode wire 12. Accordingly, in the step S4 of forming the solid electrolyte layer 15, the aqueous solution 87 can be suppressed from spreading up through between the anode wire 12 and the insulating layer 14 due to capillary action.

In the solid electrolytic capacitor A7 according to this embodiment, the insulating layer 14 is formed by melting the granular particles 81, which eliminates the need to employ a washer for preventing the upward spreading of the aqueous solution 87. Therefore, the solid electrolytic capacitor A7 can avoid the drawback arising from employing the washer, as described with reference to the first embodiment.

Further, the solid electrolytic capacitor A7 is advantageous for increasing the capacitance and reducing the size thereof, for the same reason mentioned with reference to the solid electrolytic capacitor A1.

Figure 40:
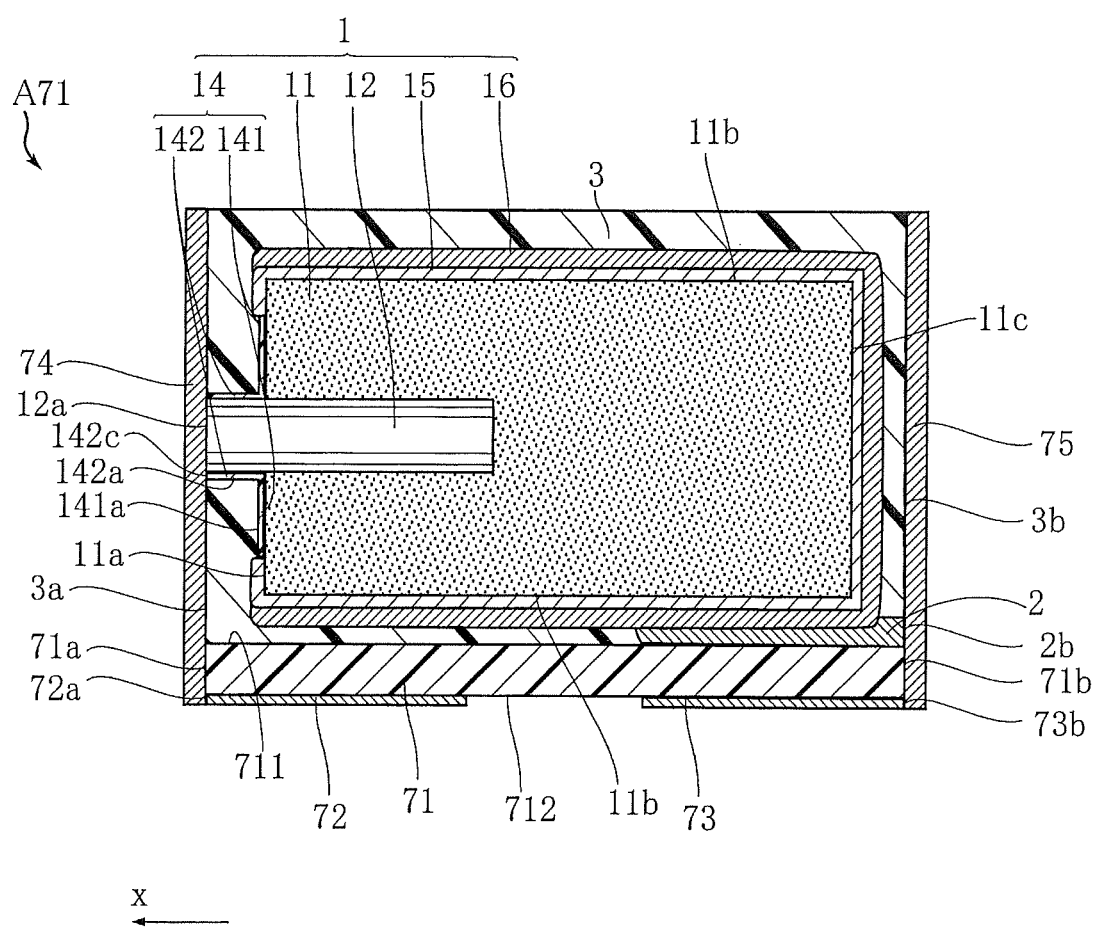
FIG. 40 is a cross-sectional view of a solid electrolytic capacitor according to a first variation of the seventh embodiment.
Figure 41:
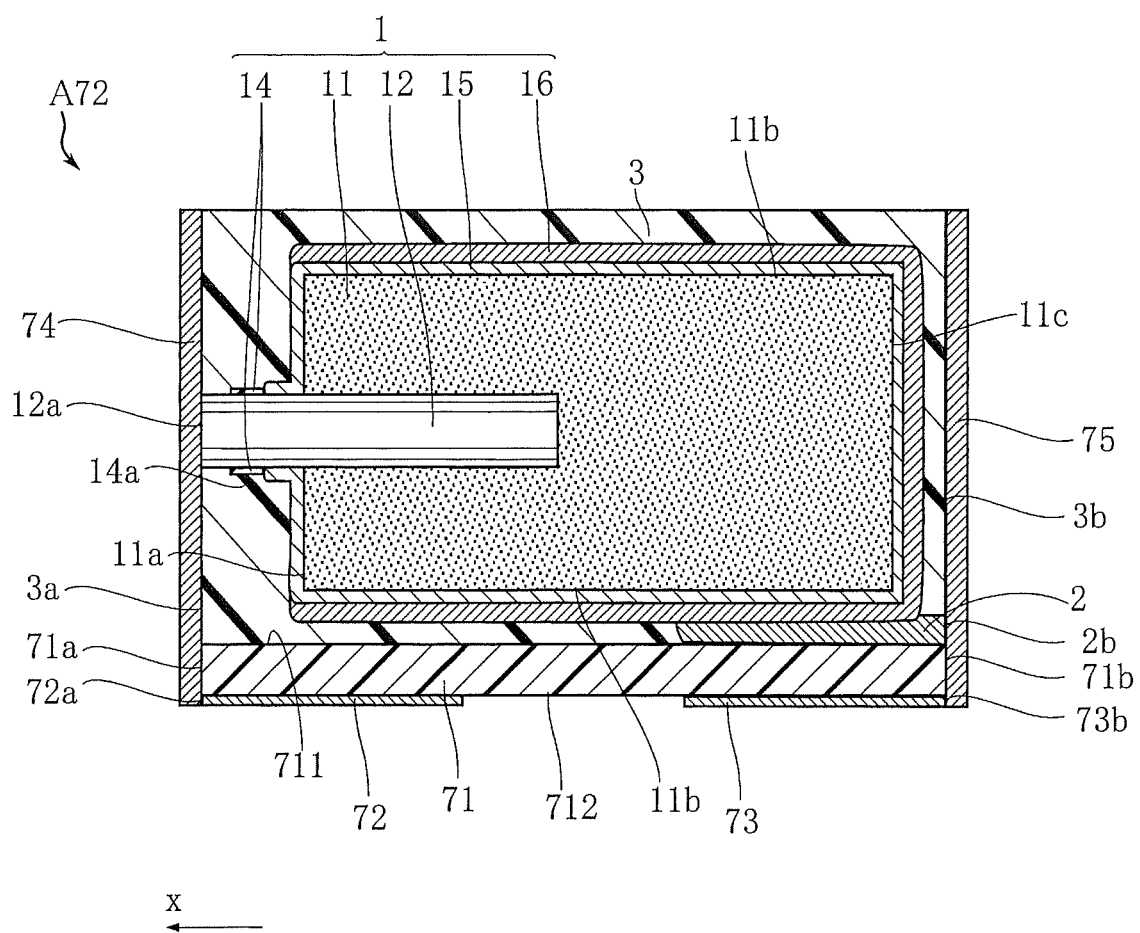
FIG. 41 is a cross-sectional view of a solid electrolytic capacitor according to a second variation of the seventh embodiment.
Figure 42:
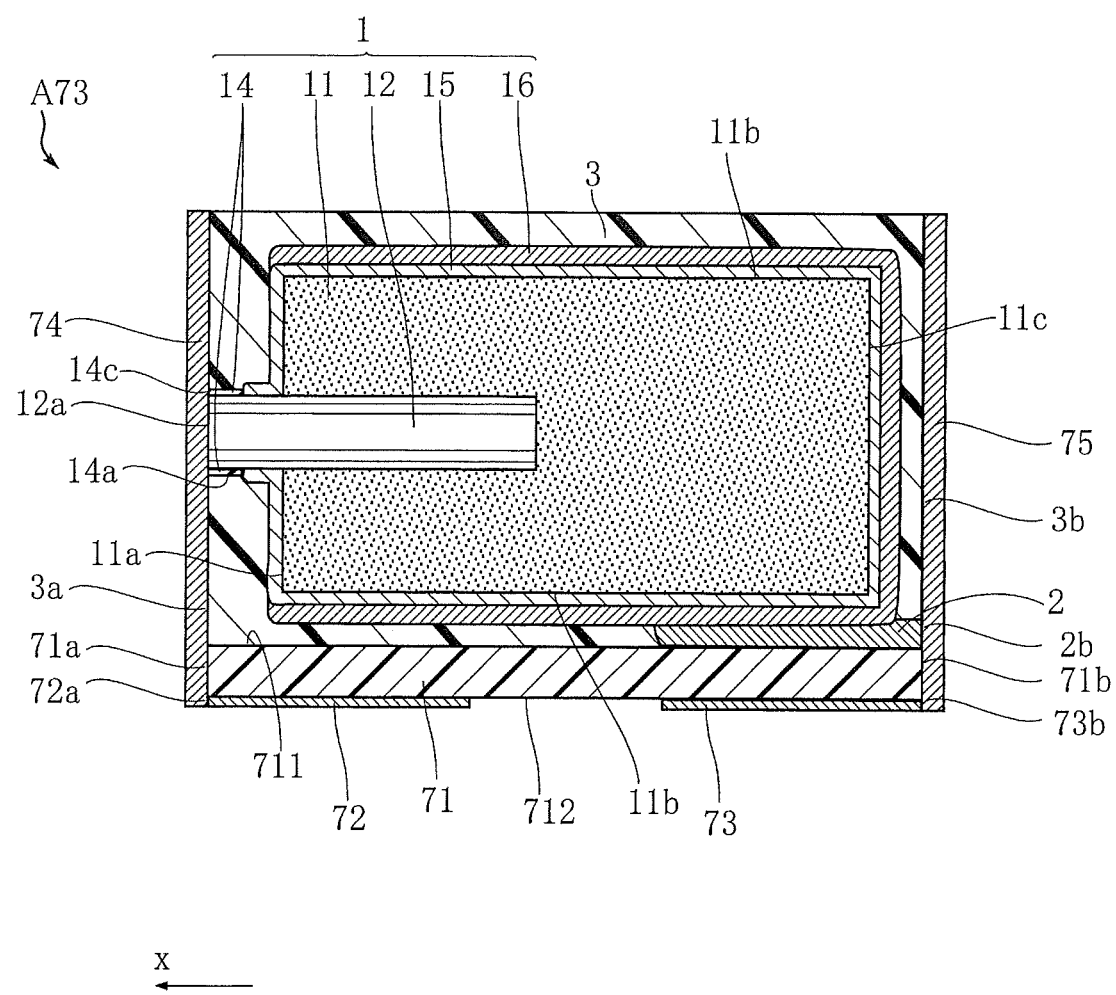
FIG. 42 is a cross-sectional view of a solid electrolytic capacitor according to a third variation of the seventh embodiment.

FIGS. 40 to 42 are cross-sectional views respectively showing variations of the seventh embodiment of the present invention. The solid electrolytic capacitors A71, A72, and A73 shown in these drawings correspond to the foregoing solid electrolytic capacitors A12, A2, and A22, respectively. The solid electrolytic capacitors A71, A72, and A73 are generally the same as the solid electrolytic capacitor A7 except that the insulating layer 14 is formed in a different shape. Accordingly, description of these variations of this embodiment will be omitted.

It is to be understood that the present invention is in no way limited to the foregoing embodiments. Specific design and structure of the constituents of the present invention may be modified in various manners.

The foregoing embodiments represent the case where the step S2 of forming the insulating layer 14 is followed by the step S3 of forming the dielectric layer 13, in order not to handle the element after completing the step S3 of forming the dielectric layer 13. Conversely, the step S3 of forming the dielectric layer 13 may be followed by the step S2 of forming the insulating layer 14. In this case also, the advantages offered by the foregoing embodiments can equally be obtained.

Eighth Embodiment

Figure 43:
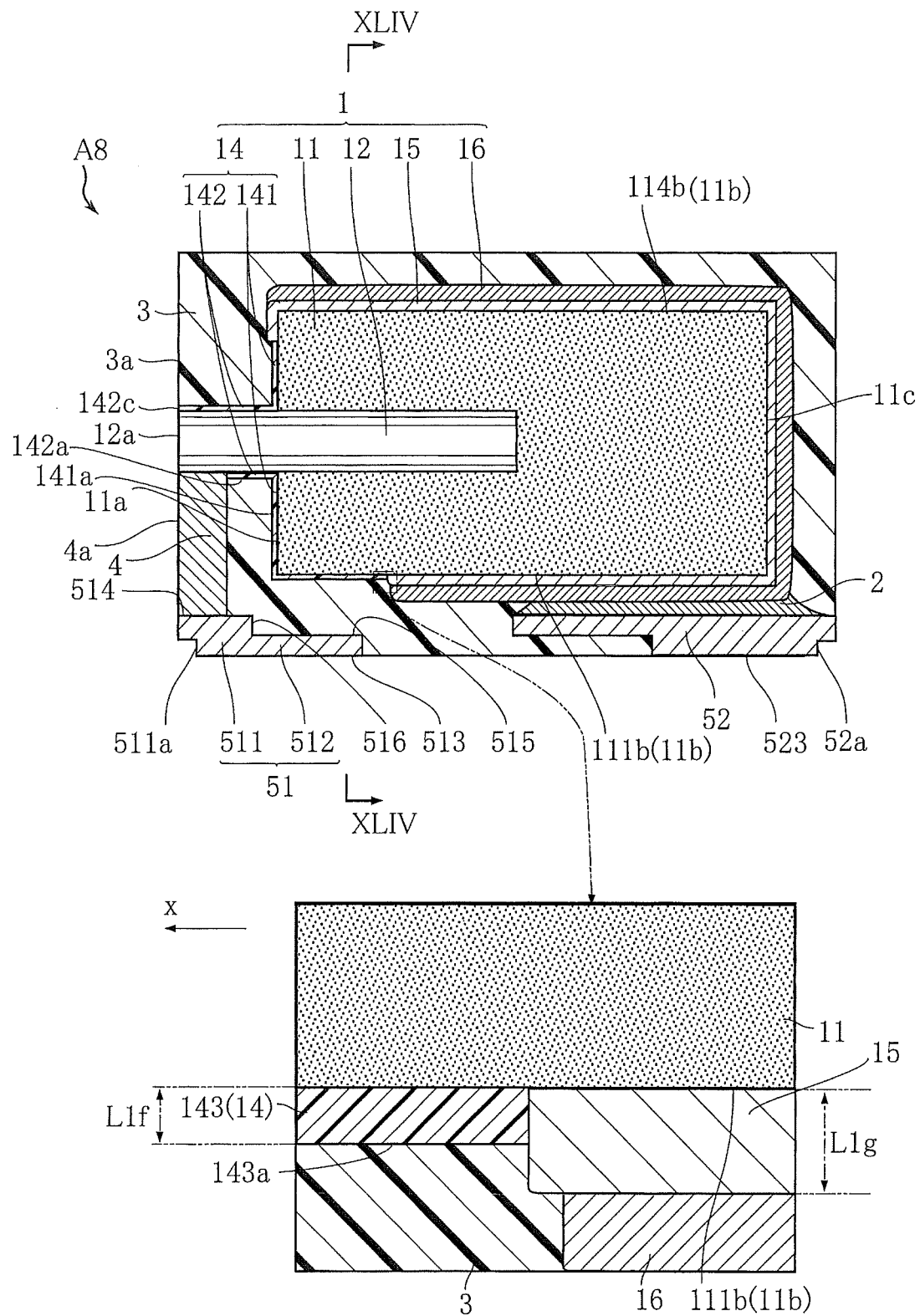
FIG. 43 is a cross-sectional view of a solid electrolytic capacitor according to an eighth embodiment of the present invention, including an enlarged fragmentary view thereof.
Figure 44:
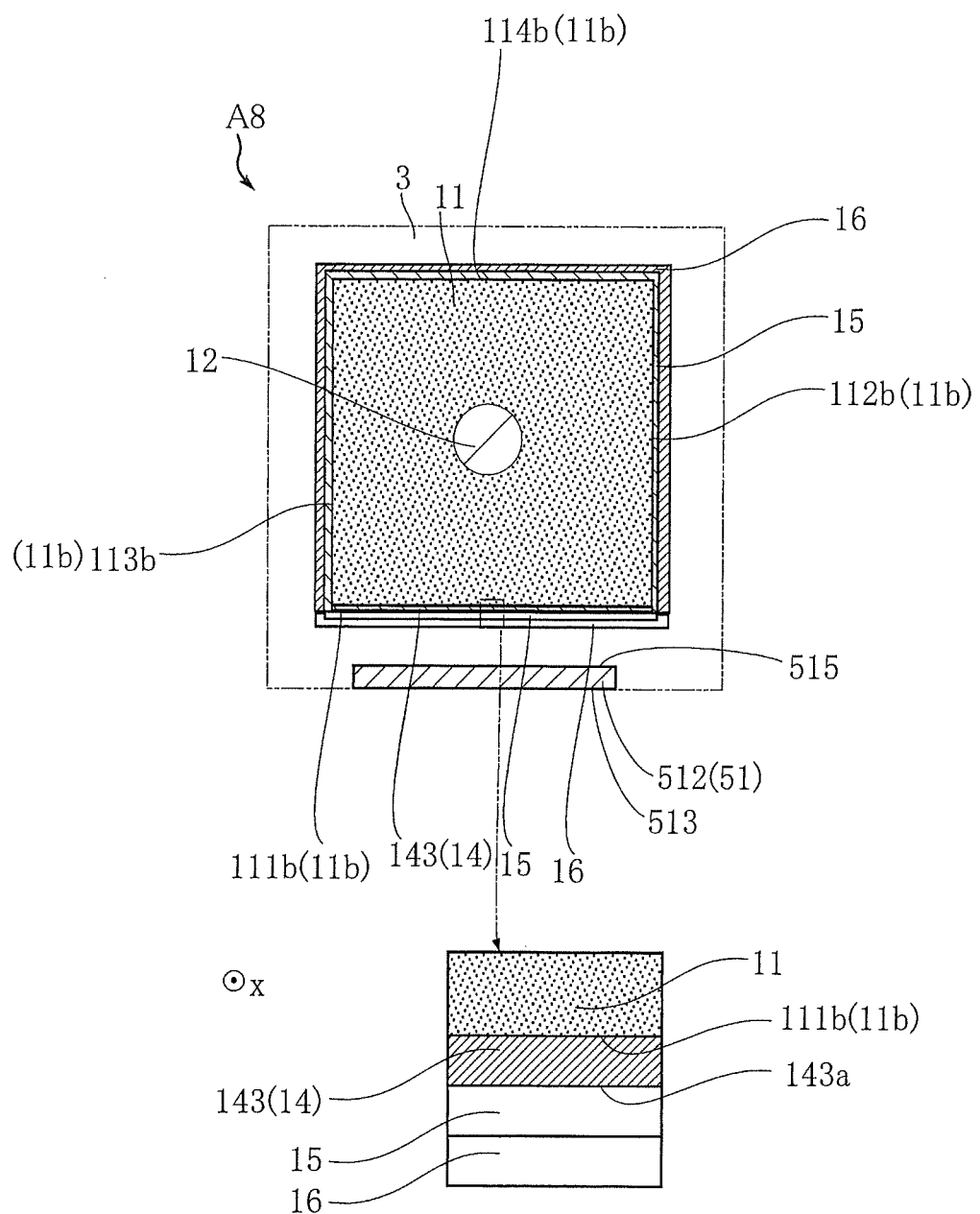
FIG. 44 is a cross-sectional view taken along a line XLIV-XLIV in FIG. 43, including an enlarged fragmentary view thereof.

FIG. 43 is a cross-sectional view of a solid electrolytic capacitor according to an eighth embodiment of the present invention. FIG. 44 is a cross-sectional view taken along a line XLIV-XLIV in FIG. 43. In FIG. 44, the resin package 3 is represented only by imaginary lines.

The solid electrolytic capacitor A8 shown in these drawings includes the capacitor element 1, the conductive adhesion layer 2, the resin package 3, the pillow electrode 4, the anode mounting terminal 51, and the cathode mounting terminal 52. The solid electrolytic capacitor A8 is generally the same as the solid electrolytic capacitor A12 except for the configuration of the capacitor element 1 and the anode mounting terminal 51, and hence the description of the remaining constituents will not be repeated.

The capacitor element 1 includes the porous sintered body 11, the anode wire 12, the dielectric layer 13, the insulating layer 14, the solid electrolyte layer 15, and the conductive layer 16. In this embodiment, the porous sintered body 11, the anode wire 12, and the dielectric layer 13 are generally the same as those of the solid electrolytic capacitor A12, and hence the description thereof will not be repeated. In this embodiment, the four surfaces 11b of the porous sintered body 11 are specified as a first lateral surface 111b, second lateral surfaces 112b, 113b, and a third lateral surface 114b. The first lateral surface 111b, the second lateral surfaces 112b, 113b, and the third lateral surface 114b are oriented in a direction perpendicular to the x-direction.

In this embodiment, the insulating layer 14 includes a first lateral film portion 143, in addition to the first film portion 141 and the second film portion 142. The first film portion 141 and the second film portion 142 are generally the same as those of the solid electrolytic capacitor A12, and hence the description thereof will not be repeated.

The first lateral film portion 143 covers the first lateral surface 111b of the porous sintered body 11. The first lateral film portion 143 is formed as an extension of the first film portion 141. As shown in an enlarged fragmentary view in FIG. 43, the first lateral film portion 143 includes a surface 143a oriented outward in a radial direction of the anode wire 12. The surface 143a is uniformly spaced from the first lateral surface 111b over the entirety of the surface 143a. In other words, the thickness L1f of the surface 143a is uniform over the entirety thereof. The thickness L1f may be, for example, 50 μm or less, and is 2 μm to 4 μm in this embodiment. The thickness L1f herein referred to is defined as a distance between the surface 143a and the first lateral surface 111b. Here, the thickness L1b of the first lateral film portion 143 may be the same as the thickness L1a of the first film portion 141 (see FIG. 1).

Referring again to the enlarged fragmentary view in FIG. 43, the solid electrolyte layer 15 includes a portion elevated from the first lateral film portion 143 in a radial direction of the anode wire 12 (orthogonal to the x-direction). A maximum thickness L1g of such an elevated portion of the solid electrolyte layer 15 is, for example, 10 μm to 100 μm. The maximum thickness L1g herein referred to is defined as a distance in the radial direction between the first lateral surface 111b and a most elevated portion of the solid electrolyte layer 15. In the solid electrolytic capacitor A8, the second lateral surfaces 112b, 113b and the third lateral surface 114b are not covered with the insulating layer 14. The entirety of the second lateral surfaces 112b, 113b and the third lateral surface 114b is covered with the solid electrolyte layer 15.

The conductive layer 16 covers the solid electrolyte layer 15, but none of the first film portion 141, the second film portion 142, and the first lateral film portion 143. The conductive layer 16 has a layered structure including, for example, a graphite layer and a silver layer.

The anode mounting terminal 51 is generally the same as that of the solid electrolytic capacitor A12. That is, the anode mounting terminal 51 according to this embodiment is configured as follows. As shown in FIG. 43, the anode mounting terminal 51 is offset from the anode wire 12 in a direction in which the first lateral surface 111b faces. The anode mounting terminal 51 overlaps the first lateral film portion 143 in the x-direction. The anode mounting terminal 51 is disposed so as to oppose the first lateral film portion 143 across a part of the resin package 3. The anode mounting terminal 51 is spaced from the respective front end portions of the solid electrolyte layer 15 and the conductive layer 16 in the x-direction. In other words, the anode mounting terminal 51 is located ahead of those end portions of the solid electrolyte layer 15 and the conductive layer 16, in the x-direction. As shown in FIG. 44, in a cross-section orthogonal to the x-direction, a maximum size of the anode mounting terminal 51 in a direction orthogonal to both the x-direction and the direction in which the first lateral surface 111b is oriented (size in a horizontal direction in FIG. 44) is smaller than a maximum size of the porous sintered body in the direction orthogonal to both the x-direction and the direction in which the first lateral surface 111b is oriented.

Hereunder, a method of manufacturing the solid electrolytic capacitor A8 will be briefly described.

Figure 45:
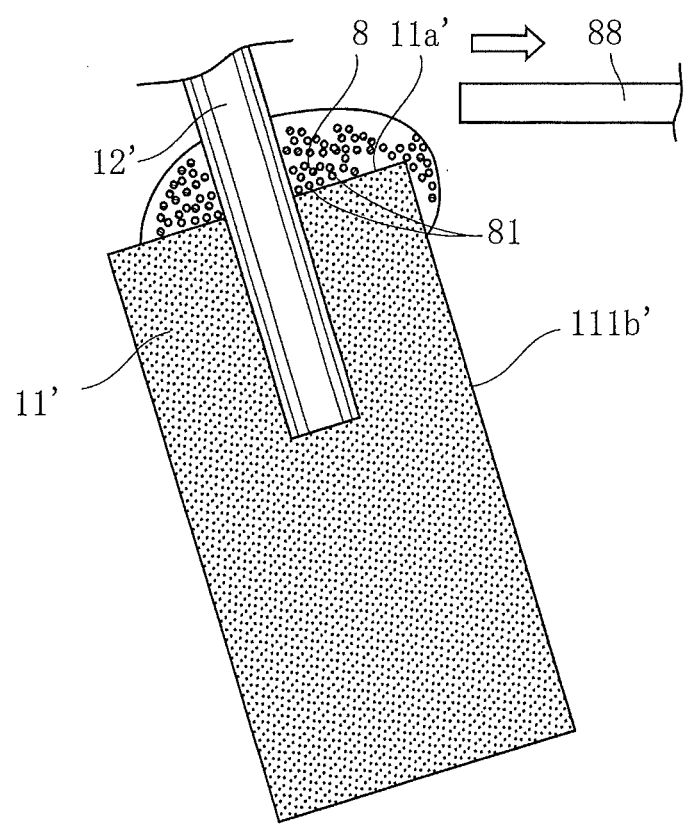
FIG. 45 is a cross-sectional view for explaining a manufacturing process of the solid electrolytic capacitor according to the eighth embodiment of the present invention.

First, the step S1 is performed in which the porous sintered body 11' shown in FIG. 45 is formed.

Figure 46:
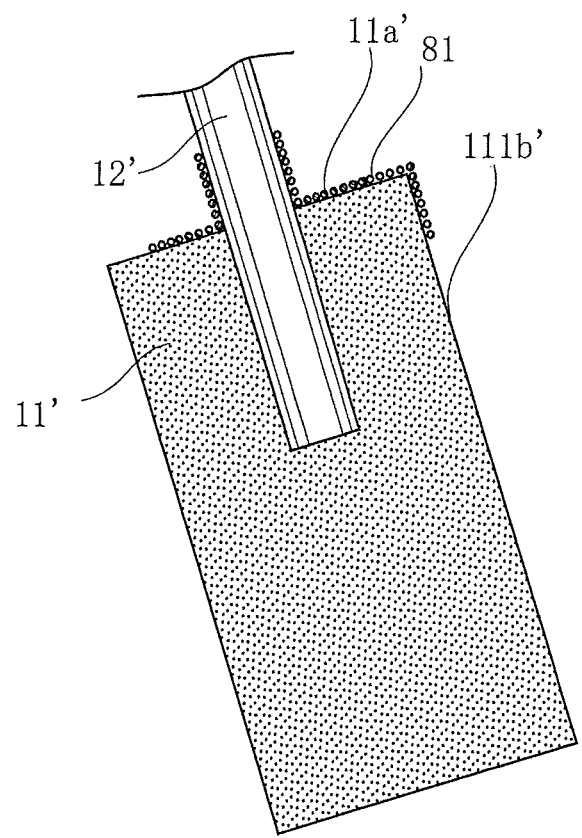
FIG. 46 is another cross-sectional view for explaining a manufacturing process of the solid electrolytic capacitor according to the eighth embodiment.
Figure 47:
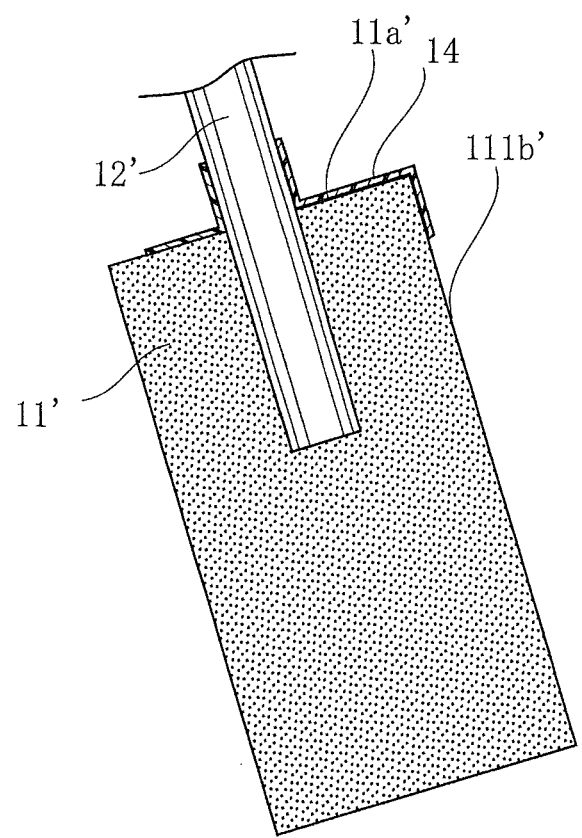
FIG. 47 is still another cross-sectional view for explaining a manufacturing process of the solid electrolytic capacitor according to the eighth embodiment.

Then the step S2 is performed in which the insulating layer 14 (see FIG. 47) is formed, as shown in FIGS. 45 to 47. In this embodiment, the retention member 88 is employed so as to apply the aqueous dispersion 8 to the anode wire 12' and the surface 11a' and the first lateral surface 111b' of the porous sintered body 11', as shown in FIG. 45. To apply the aqueous dispersion 8, the anode wire 12' is slightly tilted with respect to a vertical direction. As a result, the plurality of granular particles 81 is deposited to the anode wire 12', the surface 11a', and the first lateral surface 111b' as shown in FIG. 46. The step S21 of depositing the granular particles 81 to the anode wire 12' is thus performed. Proceeding to FIG. 47, the step S22 is performed in which the granular particles 81 are heated thus to be molten. At this stage, the insulating layer 14 is obtained.

The foregoing is followed by the step S3 of forming the dielectric layer 13 and the step S4 of forming the solid electrolyte layer 15 are performed, as in the first embodiment. Then the step S5 of forming the conductive layer 16 is performed. Further, upon forming the pillow electrode 4, the anode mounting terminal 51, the cathode mounting terminal 52, and the resin package 3, the solid electrolytic capacitor A8 shown in FIG. 43 can be obtained.

Hereunder, advantages of this embodiment will be described.

In the solid electrolytic capacitor A8, the insulating layer 14 is formed by melting the plurality of granular particles 81. Such a method assures that the insulating layer 14 achieves close contact with the anode wire 12. Accordingly, in the step S4 of forming the solid electrolyte layer 15, the aqueous solution 87 can be suppressed from spreading up through between the anode wire 12 and the insulating layer 14 due to capillary action.

In the solid electrolytic capacitor A8 according to this embodiment, the insulating layer 14 is formed by melting the granular particles 81, which eliminates the need to employ a washer for preventing the upward spreading of the aqueous solution 87. Thus, the solid electrolytic capacitor A8 can avoid the drawback arising from employing the washer, as described with reference to the first embodiment.

In this embodiment, the step S21 of depositing the granular particles 81 to the anode wire 12' is performed through applying the aqueous dispersion 8 to the anode wire 12'. The granular particles 81 are dispersed in the aqueous dispersion 8. Therefore, the method according to this embodiment is advantageous for depositing the granular particles 81 to the anode wire 12' in the dispersed state.

In the solid electrolytic capacitor A8, the insulating layer 14 includes the first lateral film portion 143 covering the first lateral surface 111b and extending to the first film portion 141. The insulating layer 14 is normally not covered with the solid electrolyte layer 15 and the conductive layer 16. Accordingly, the respective front end portions of the solid electrolyte layer 15 and the conductive layer 16 covering the first lateral surface 111b can be located farther backward in the x-direction. Such a configuration can prevent the anode mounting terminal 51 from contacting the solid electrolyte layer 15 or the conductive layer 16 provided on the first lateral surface 111b, even in the case where, as in the solid electrolytic capacitor A8, the anode mounting terminal 51 is disposed at a position offset from the anode wire 12 in a direction in which the first lateral surface 111b faces.

Figure 48:
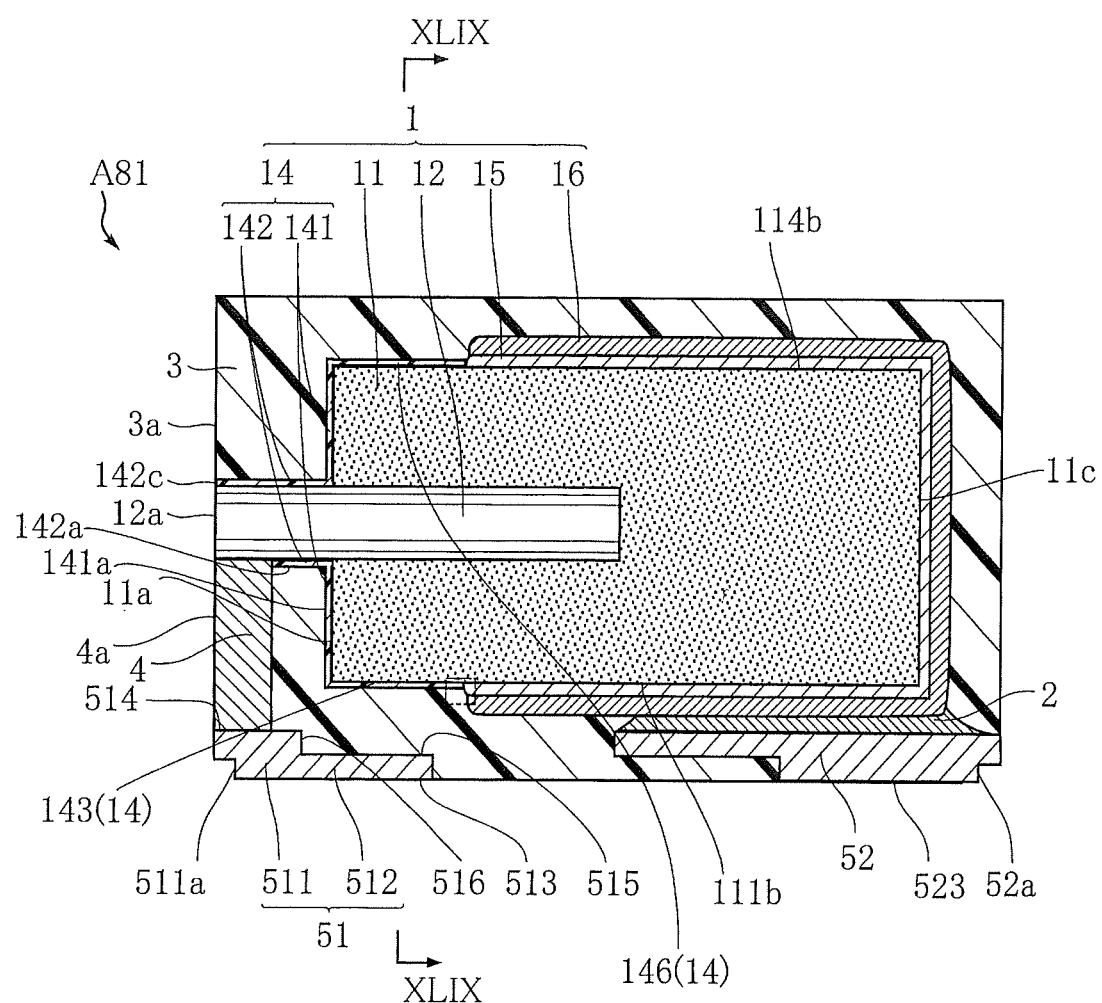
FIG. 48 is a cross-sectional view of a solid electrolytic capacitor according to a first variation of the eighth embodiment.
Figure 49:
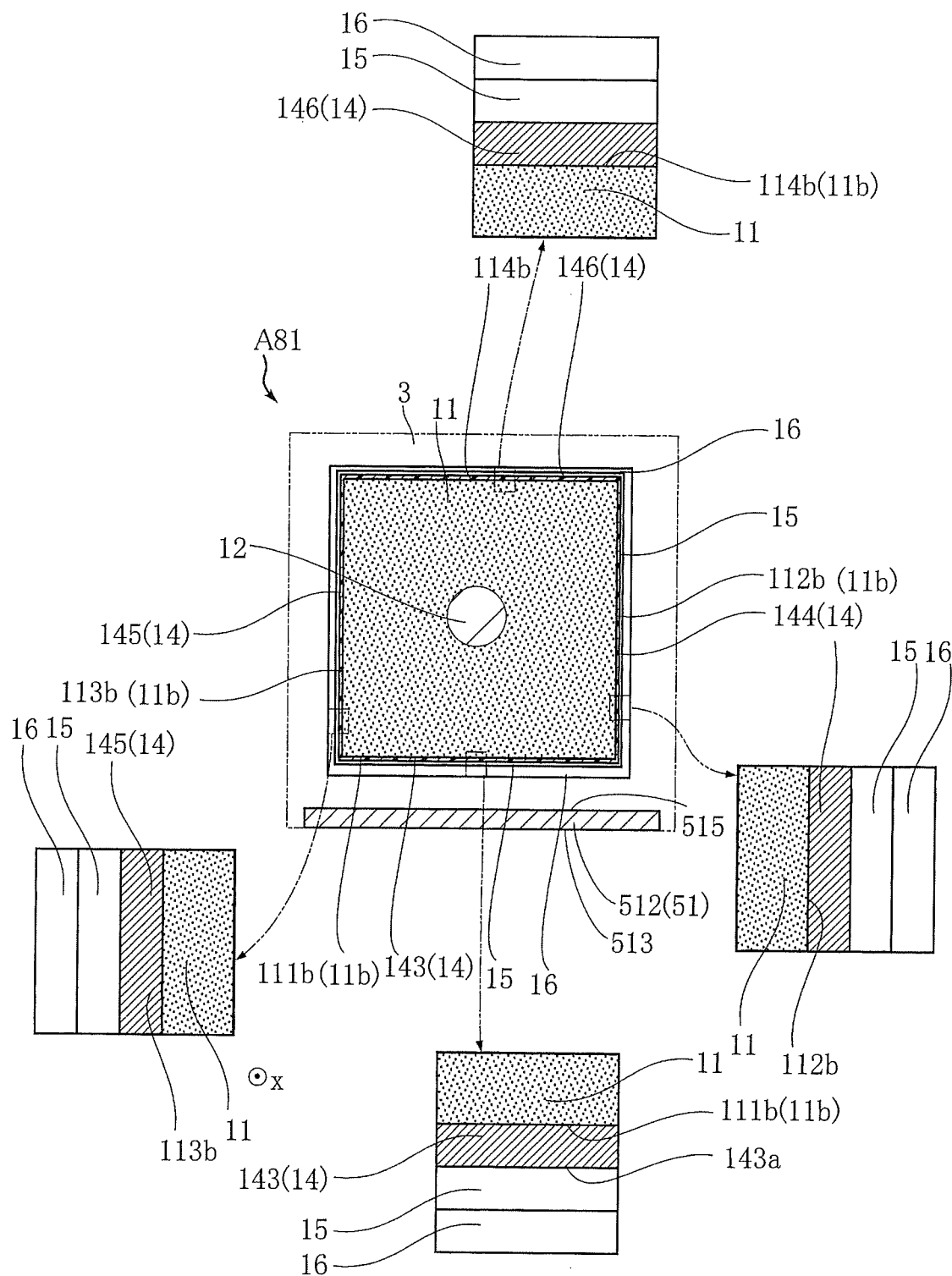
FIG. 49 is a cross-sectional vies taken along a line XLIX-XLIX in FIG. 48, including enlarged fragmentary views thereof.

Referring now to FIGS. 48 and 49, a first variation of the eighth embodiment will be described. FIG. 48 is a cross-sectional view of a solid electrolytic capacitor according to the first variation of the eighth embodiment. FIG. 49 is a cross-sectional vies taken along a line XLIX-XLIX in FIG. 48.

In FIG. 49, the resin package 3 is represented only by imaginary lines.

The solid electrolytic capacitor A81 shown in these drawings is different from the solid electrolytic capacitor A8 in that the insulating layer 14 includes second lateral film portions 144, 145 and a third lateral film portion 146. The second lateral film portion 144 covers the second lateral surface 112b, and the second lateral film portion 145 covers the second lateral surface 113b. The second lateral film portions 144, 145 extend to both the first film portion 141 and the first lateral film portion 143. The third lateral film portion 146 extends to the first film portion 141 and the second lateral film portions 144, 145. The entirety of the surface 11a is covered with the first film portion 141, but not with the solid electrolyte layer 15. Further, as shown in FIG. 49, the solid electrolytic capacitor A81 is different from the solid electrolytic capacitor A8 in that, in a cross-section orthogonal to the x-direction, a maximum size of the porous sintered body 11 in a direction orthogonal to both the x-direction and the direction in which the first lateral surface 111b is oriented (size in a horizontal direction in FIG. 49) is smaller than a maximum size of the anode mounting terminal 51 in the direction orthogonal to both the x-direction and the direction in which the first lateral surface 111b is oriented.

With such a configuration, in the case where the second lateral surface 112b is not covered with the second lateral film portion 144 but with the solid electrolyte layer 15 over the entirety of the second lateral surface 112b, the anode mounting terminal 51 and the solid electrolyte layer 15 covering the second lateral surface 112b may contact each other. In this embodiment, however, the second lateral surface 112b is covered with the second lateral film portion 144.

Accordingly, as mentioned with reference to the solid electrolytic capacitor A8, the anode mounting terminal 51 can be prevented from contacting the solid electrolyte layer 15 or the conductive layer 16 provided on the second lateral surface 112b. Likewise, the anode mounting terminal 51 can be prevented from contacting the solid electrolyte layer 15 or the conductive layer 16 provided on the second lateral surface 113b.

Figure 50:
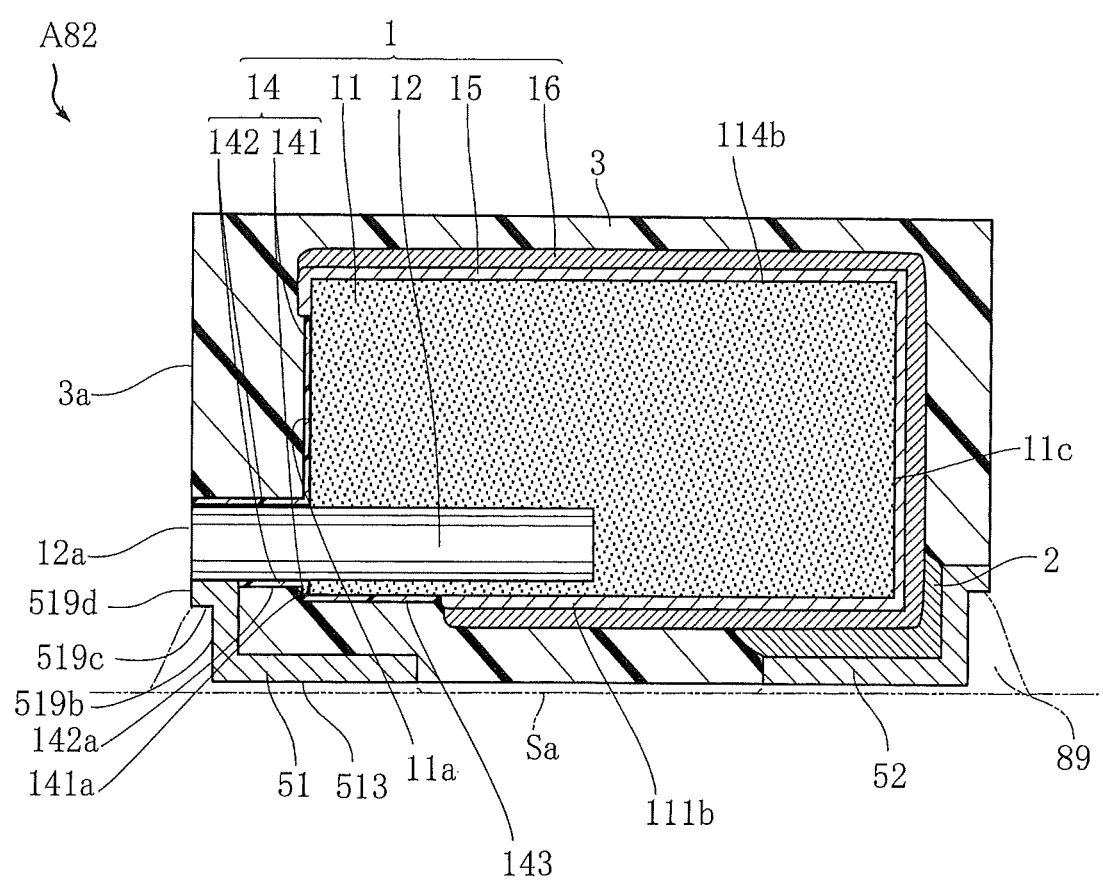
FIG. 50 is a cross-sectional view of a solid electrolytic capacitor according to a second variation of the eighth embodiment.

Referring to FIG. 50, a second variation of the eighth embodiment will be described. FIG. 50 is a cross-sectional view showing the second variation of this embodiment.

The solid electrolytic capacitor A8e shown in FIG. 50 is different from the solid electrolytic capacitor A8 in that the anode wire 12 is not located at the center of the surface 11a of the porous sintered body 11, but at a position deviated from the center of the surface 11a. Another difference of the solid electrolytic capacitor A82 from the solid electrolytic capacitor A8 is that the pillow electrode 4 is not provided, and that the anode mounting terminal 51 and the cathode mounting terminal 52 have a generally L-shaped cross-section. The anode mounting terminal 51 and the cathode mounting terminal 52 are generally the same as those of the solid electrolytic capacitor A5, and hence the description thereof will not be repeated.

The solid electrolytic capacitor A82 does not include a washer, which is a solid material. The insulating layer 14 in the solid electrolytic capacitor A82 is formed utilizing the aqueous dispersion 8 which is a liquid. Accordingly, even in the case where the anode wire 12 is located at a position deviated from the center of the surface 11a, there is no need to modify a component such as the washer for forming the insulating layer 14. Consequently, the design of the solid electrolytic capacitor A82 can be modified without incurring an increase in manufacturing cost.

The configuration of the solid electrolytic capacitor A82 can prevent, for the same reason mentioned with reference to the solid electrolytic capacitor A8, the anode mounting terminal 51 from contacting the solid electrolyte layer 15 or the conductive layer 16 provided on the first lateral surface 111b.

Also, in the process of applying the aqueous dispersion 8, which is a liquid, to the anode wire 12, the aqueous dispersion 8 tends to reside around the anode wire 12. Accordingly, in the case where the anode wire 12 is located at a position deviated from the center of the surface 11a, the aqueous dispersion 8 can be more easily applied to the lateral surface of the porous sintered body 11. Such an effect is advantageous for forming the structure including the first lateral film portion 143 to be formed on the first lateral surface 111b, one of the lateral surfaces of the porous sintered body 11.

Figure 51:
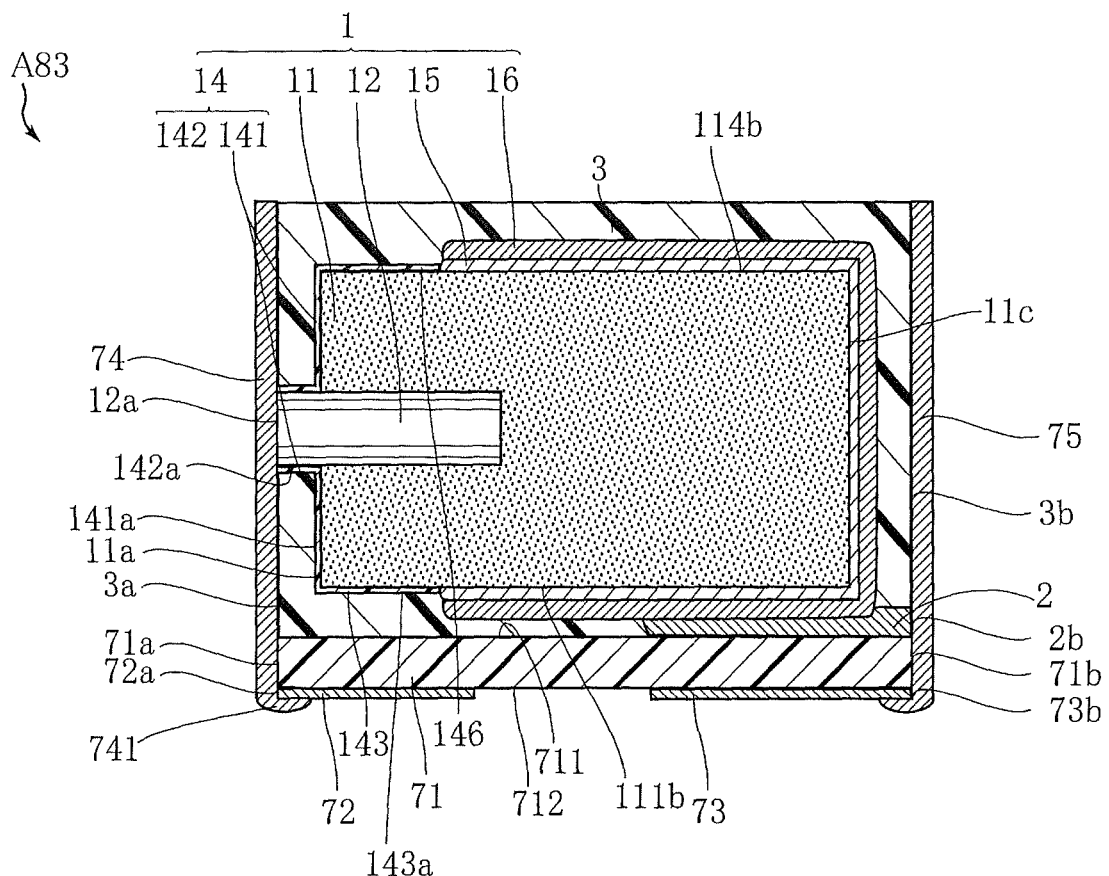
FIG. 51 is a cross-sectional view of a solid electrolytic capacitor according to a third variation of the eighth embodiment.

Referring to FIG. 51, a third variation of the eighth embodiment will be described. FIG. 51 is a cross-sectional view showing the third variation of this embodiment.

The solid electrolytic capacitor A83 shown in FIG. 51 includes the capacitor element 1, the conductive adhesion layer 2, the resin package 3, the base member 71, the mounting anode layer 72, the mounting cathode layer 73, the lateral anode layer 74, and the lateral cathode layer 75. The capacitor element 1 and the conductive adhesion layer 2 of the solid electrolytic capacitor A83 are generally the same as those of the solid electrolytic capacitor A81, and hence the description thereof will not be repeated. solid electrolytic capacitor A83における, The resin package 3, the base member 71, the mounting anode layer 72, the mounting cathode layer 73, the lateral anode layer 74, and the lateral cathode layer 75 are generally the same as those of the solid electrolytic capacitor A71, and hence the description thereof will not be repeated. In this embodiment, however, the lateral anode layer 74 includes a portion 741. The portion 741 covers a facet of the mounting anode layer 72 oriented in a direction opposite the anode wire 12. The lateral anode layer 74 thus configured can be formed by sputtering conductive particles to the resin package 3 in an oblique direction from a lower left position toward an upper right position in FIG. 51.

In this case, the surface 11a is not covered with the solid electrolyte layer 15, but the entirety of the surface 11a is covered with the first film portion 141. Accordingly, the lateral anode layer 74 can be prevented from contacting the solid electrolyte layer 15 or the conductive layer 16, even in the case where the lateral anode layer 74 is located close to the surface 11a.

In the solid electrolytic capacitor A83, the lateral anode layer 74 includes the portion 741 covering the facet of the mounting anode layer 72. Such a configuration increases the bonding area between the lateral anode layer 74 and the mounting anode layer 72. Accordingly, the solid electrolytic capacitor A83 more effectively prevents the lateral anode layer 74 from separating from the mounting anode layer 72.

Although it is preferable to perform the step S21 by applying the aqueous dispersion 8 to the anode wire 12' thereby depositing the plurality of granular particles 81 thereto, the granular particles 81 alone may be sprayed over the anode wire 12'.

The invention claimed is:

1. A method of manufacturing a solid electrolytic capacitor, the method comprising:
   forming a porous sintered body made of a valve metal and having an anode wire sticking out therefrom;
   forming an insulating layer made of a fluorine resin, so as to surround the anode wire;
   forming a dielectric layer on the porous sintered body; and
   forming a solid electrolyte layer on the dielectric layer, after forming the insulating layer;
   wherein the process of forming the insulating layer includes melting a resin material made of a fluorine resin.

2. The method according to claim 1, wherein the resin material includes a plurality of granular particles.

3. The method according to claim 2, wherein the process of forming the insulating layer further includes depositing the plurality of granular particles to the anode wire, before melting the resin material.

4. The method according to claim 3, wherein the process of forming the insulating layer further includes depositing the plurality of granular particles to the porous sintered body, at the same time as depositing the granular particles to the anode wire.

5. The method according to claim 3, wherein the process of depositing the plurality of granular particles to the anode wire includes depositing the granular particles only to a portion of the anode wire spaced from the porous sintered body.

6. The method according to claim 3, wherein the process of depositing the plurality of granular particles to the anode wire includes applying an aqueous dispersion containing the granular particles to the anode wire.

7. The method according to claim 1, wherein the process of forming the insulating layer is performed before forming the dielectric layer.

* * * * *